(12) United States Patent
Hatch et al.

(10) Patent No.: US 11,386,260 B2
(45) Date of Patent: Jul. 12, 2022

(54) SMART INTERFACE WITH FACILITATED INPUT AND MISTAKE RECOVERY

(71) Applicant: I.Q. JOE, LLC, Torrance, CA (US)

(72) Inventors: Jeffrey James Hatch, Wilmington, CA (US); Ashley Simpson, Irvine, CA (US)

(73) Assignee: I.Q. JOE, LLC, Torrance, CA (US)

( * ) Notice: Subject to any disclaimer, the term of this patent is extended or adjusted under 35 U.S.C. 154(b) by 0 days.

(21) Appl. No.: 17/302,672

(22) Filed: May 10, 2021

(65) Prior Publication Data

US 2022/0100949 A1    Mar. 31, 2022

Related U.S. Application Data

(63) Continuation of application No. 15/965,619, filed on Apr. 27, 2018, now Pat. No. 11,003,839.

(60) Provisional application No. 62/492,005, filed on Apr. 28, 2017.

(51) Int. Cl.
    *G06F 40/166*    (2020.01)
    *G10L 15/22*     (2006.01)
    *G06F 3/04886*   (2022.01)

(52) U.S. Cl.
    CPC ........ *G06F 40/166* (2020.01); *G06F 3/04886* (2013.01); *G10L 15/22* (2013.01); *G10L 2015/221* (2013.01)

(58) Field of Classification Search
    None
    See application file for complete search history.

(56) References Cited

U.S. PATENT DOCUMENTS

| | | | |
|---|---|---|---|
| 4,481,598 A | 11/1984 | Ishiwata | |
| 4,545,022 A | 10/1985 | Hughins | |
| 5,025,403 A | 6/1991 | Stephens | |
| 5,089,980 A | 2/1992 | Bunsen et al. | |
| 6,854,001 B2 | 2/2005 | Good et al. | |
| 8,074,172 B2 | 12/2011 | Kocienda et al. | |
| 8,232,973 B2 | 7/2012 | Kocienda et al. | |
| 8,504,600 B2 | 8/2013 | Hatch | |
| 8,788,548 B2 | 7/2014 | Hatch | |
| 8,904,309 B1 | 7/2014 | Zhai | |
| 2005/0179665 A1 | 8/2005 | Kuo | |
| 2008/0104153 A1* | 5/2008 | Hatch | G06F 3/0489 708/142 |

(Continued)

OTHER PUBLICATIONS

PCT International Search Report, App. No. PCT/US2009/032448, dated Jun. 22, 2009, in 3 pages.

(Continued)

*Primary Examiner* — Toan H Vu
(74) *Attorney, Agent, or Firm* — Knobbe Martens Olson & Bear LLP

(57) ABSTRACT

Systems, methods, and devices including smart interfaces with facilitated input and mistake recovery are described. For example, a smart interface system can identify one or more portions of user input as alterable decisions, and, for each of the one or more alterable decisions, store, in a memory, information about one or more alternative options for the alterable decision. The system can also identify one of the alterable decisions as the currently alterable decision, and upon receiving an input indicative of an actuation of the alteration key, alter the currently alterable decision to another of the one or more alternative options based on the stored information.

20 Claims, 56 Drawing Sheets

(56) References Cited

U.S. PATENT DOCUMENTS

| | | |
|---|---|---|
| 2008/0168366 A1 | 7/2008 | Kocienda |
| 2009/0024366 A1* | 1/2009 | Atkinson .............. G06F 40/205 |
| | | 703/2 |
| 2011/0202876 A1 | 8/2011 | Badger |
| 2013/0120267 A1 | 5/2013 | Pasquero |
| 2015/0100524 A1 | 4/2015 | Pantel |
| 2015/0177981 A1* | 6/2015 | Starner .............. G06F 3/04886 |
| | | 345/173 |
| 2016/0098098 A1 | 4/2016 | St. Clair |
| 2016/0188526 A1* | 6/2016 | Kai .................... G06F 15/0225 |
| | | 708/136 |
| 2017/0084201 A1* | 3/2017 | Dooley ............... G09B 21/003 |
| 2018/0210874 A1 | 7/2018 | Fuxman |

OTHER PUBLICATIONS http://web.archive.org/web/20040401164706/http://ftp.casio.co.jp/pub/world_manual/edu/en/fx115MS_991MS_E.pdf; CASIO Manual; Apr. 1, 2004; pp. 1-42.

http://web.archive.org/web/20010304195513/http://users.ece.gatech.edu/~bonnie/book/TUTORIAL/tut_1.html; MatLab Tutorial; Oct. 30, 2001.

FX-570es User's Guide, Casio, Dec. 31, 2009, http://support.casio.com/pdf/004/fx057ES_Eng.pdf, in 75 pages, See pp. E-8, E-21, E-22.

* cited by examiner

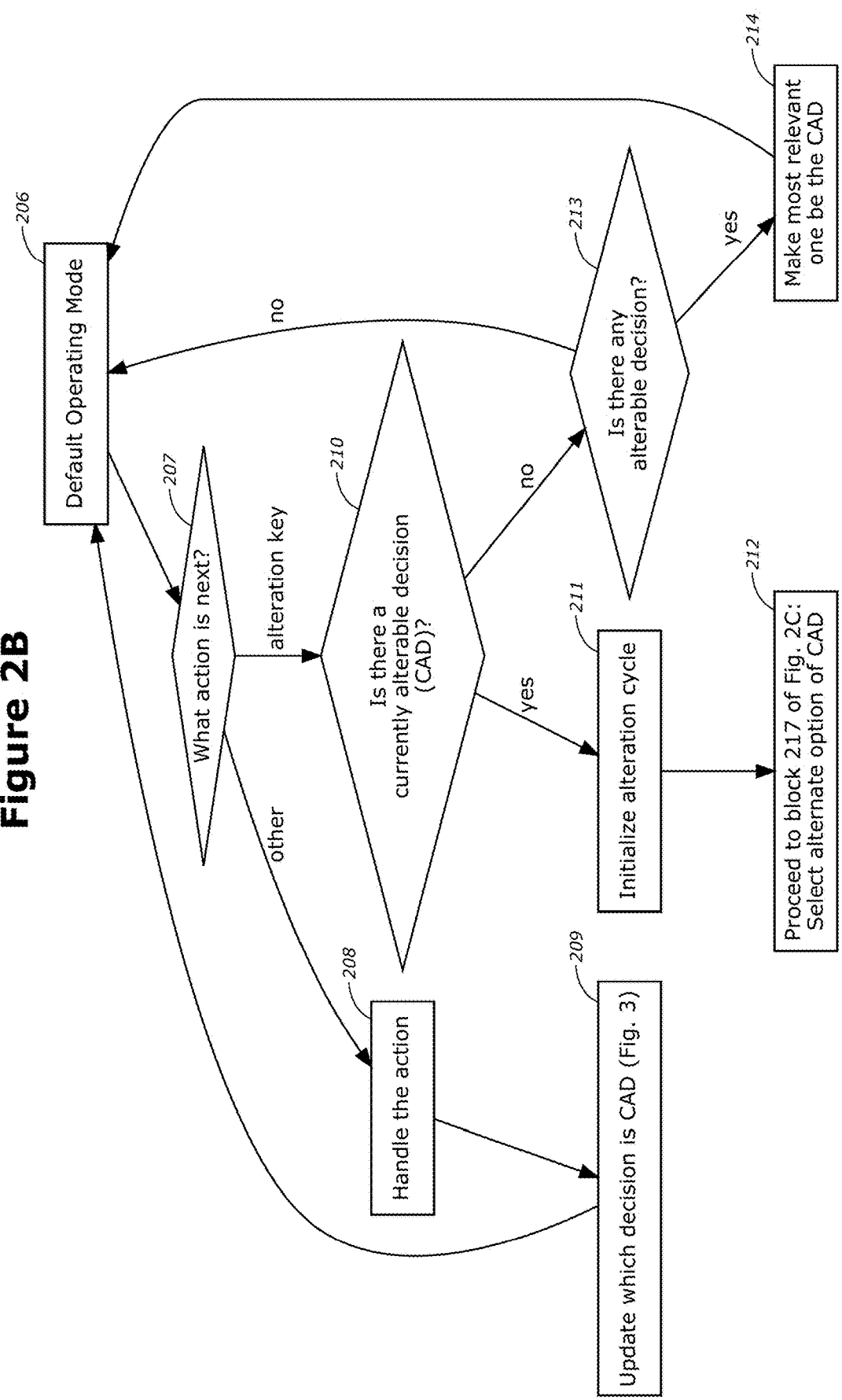

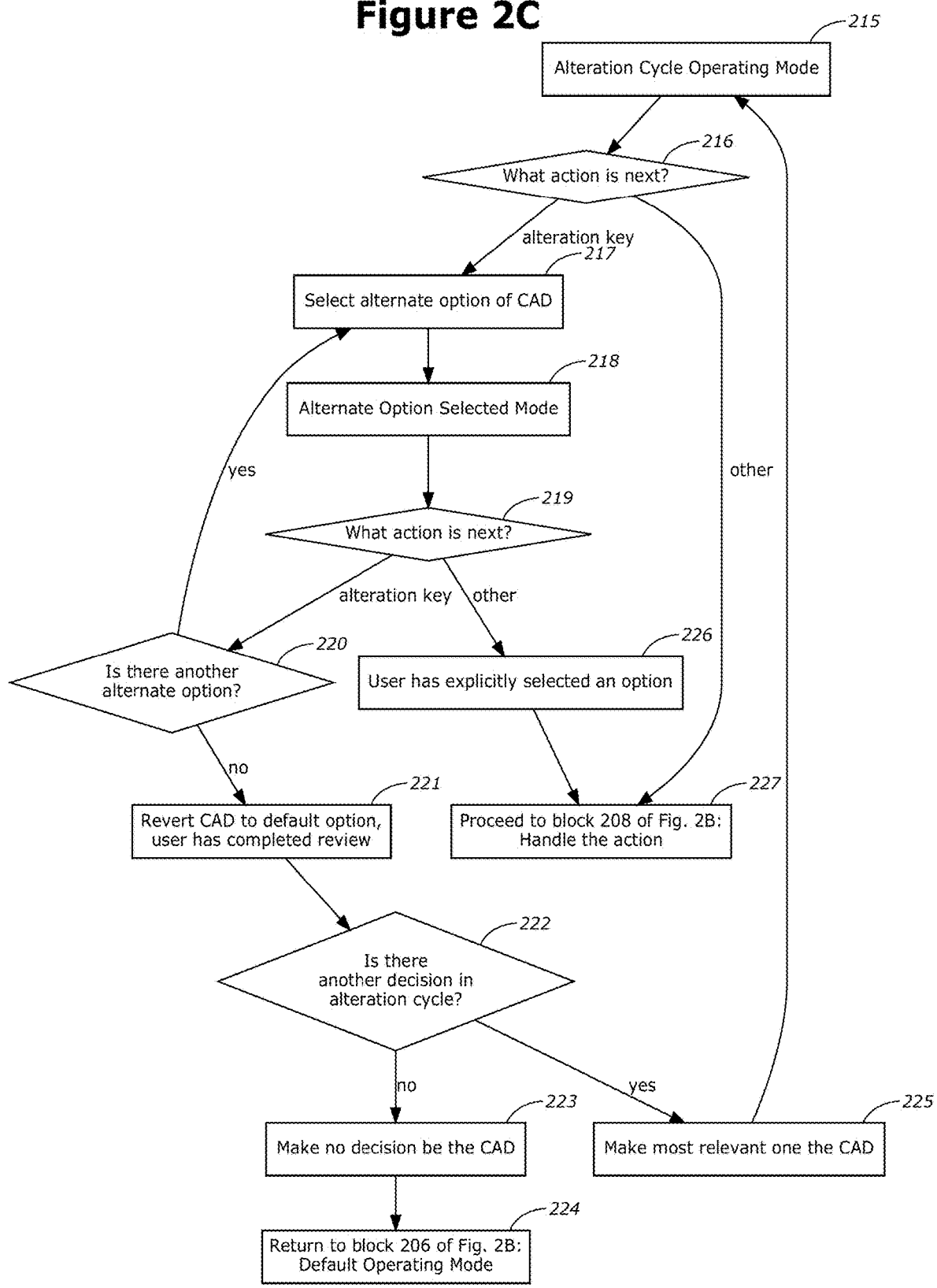

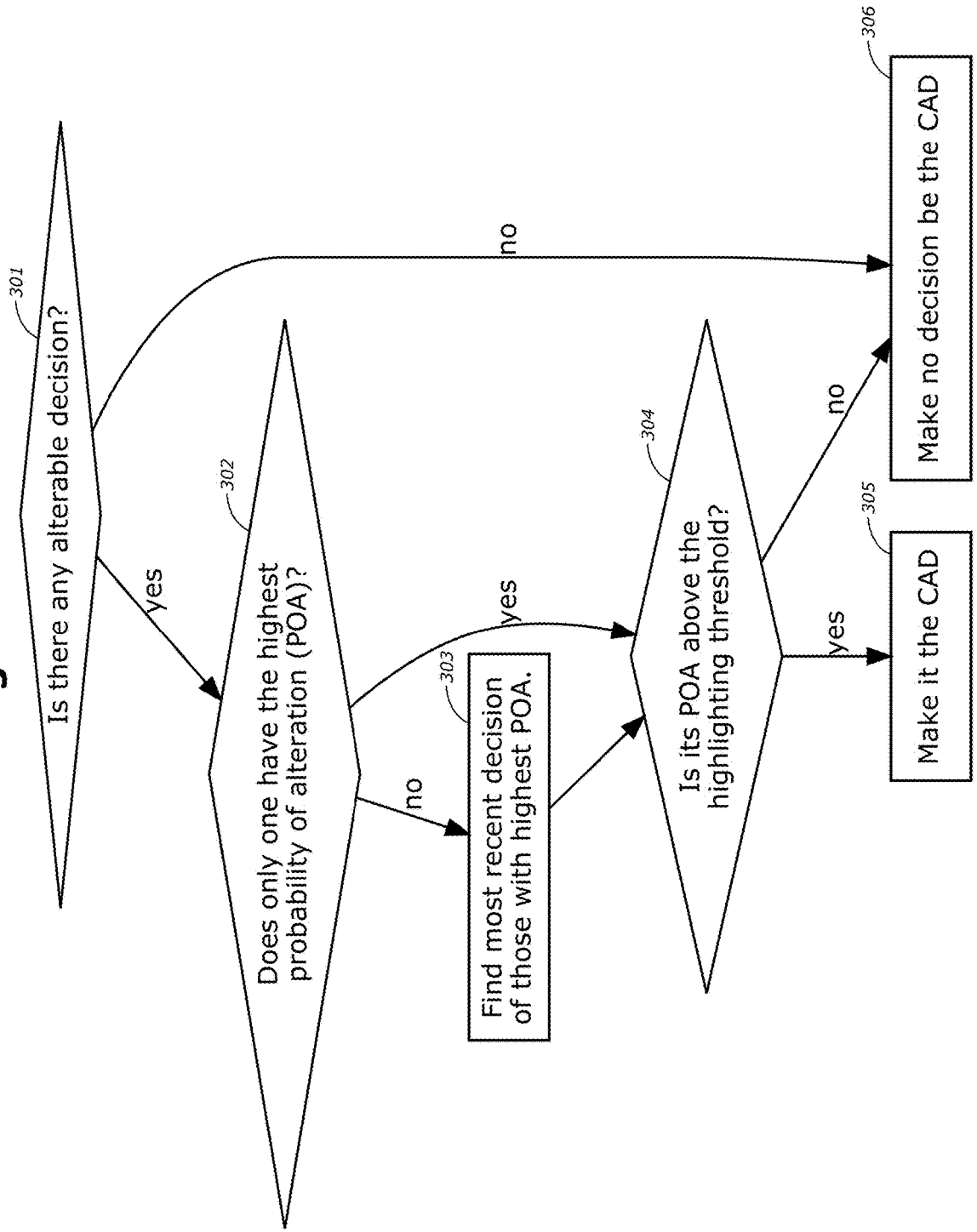

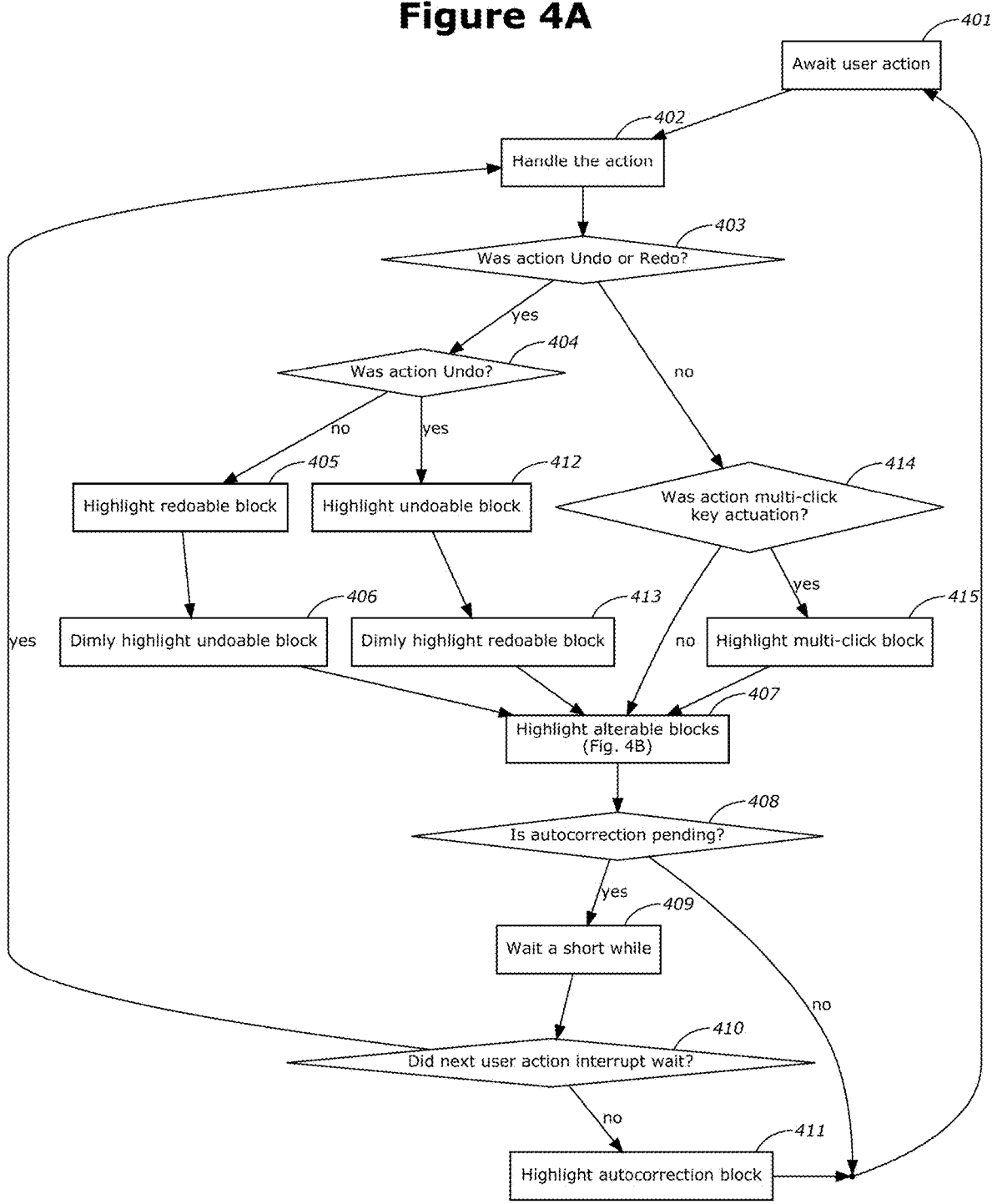

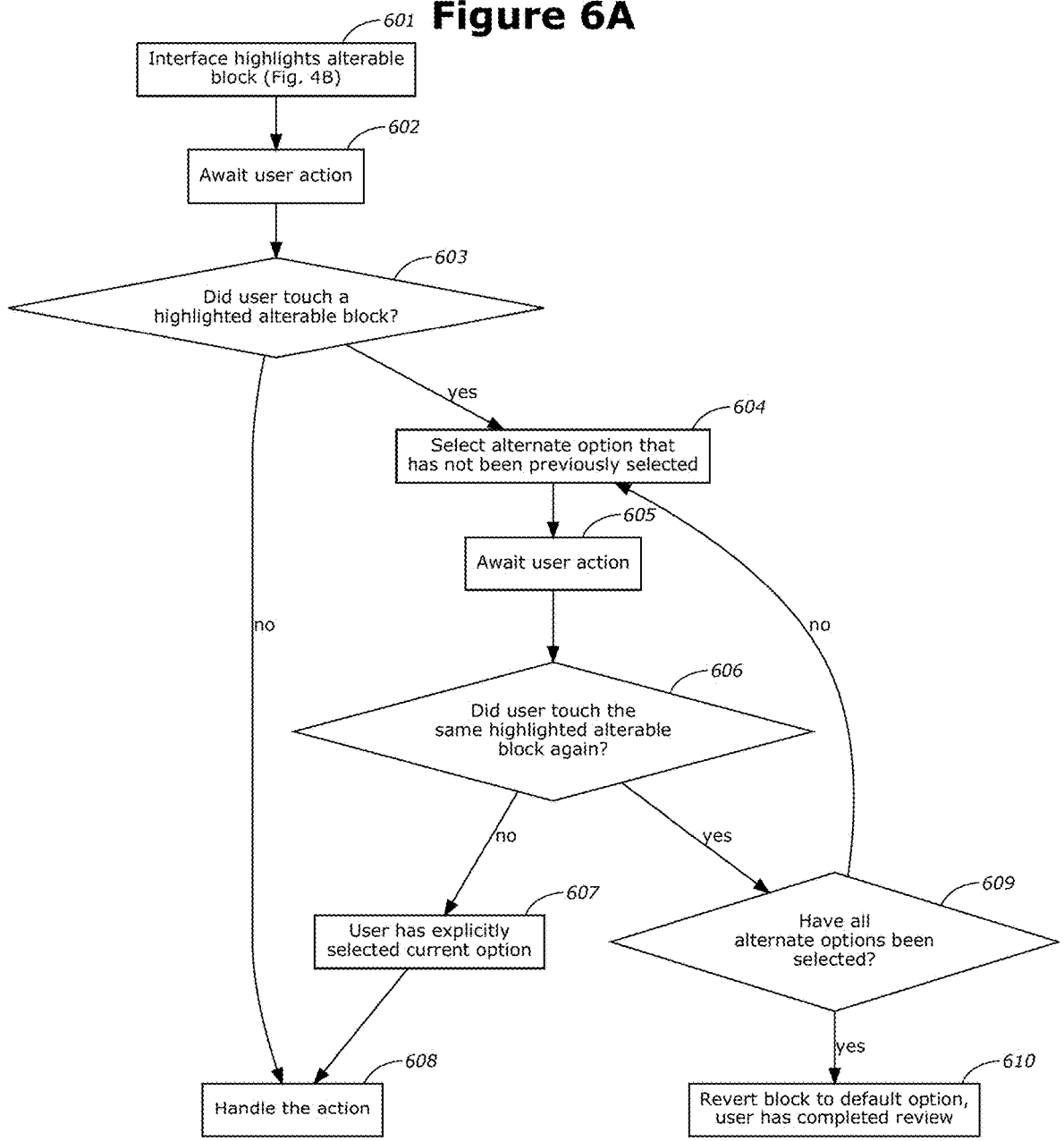

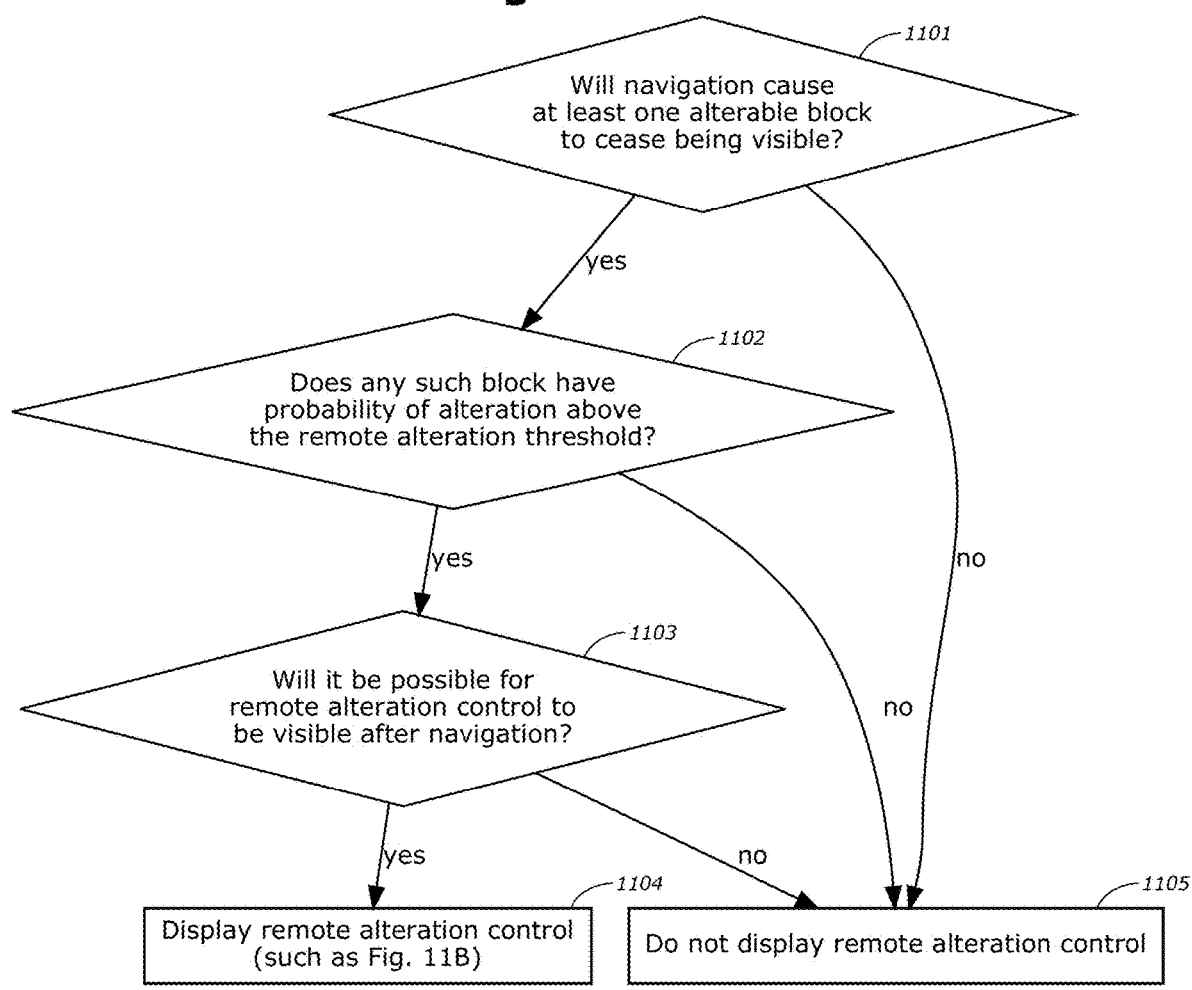

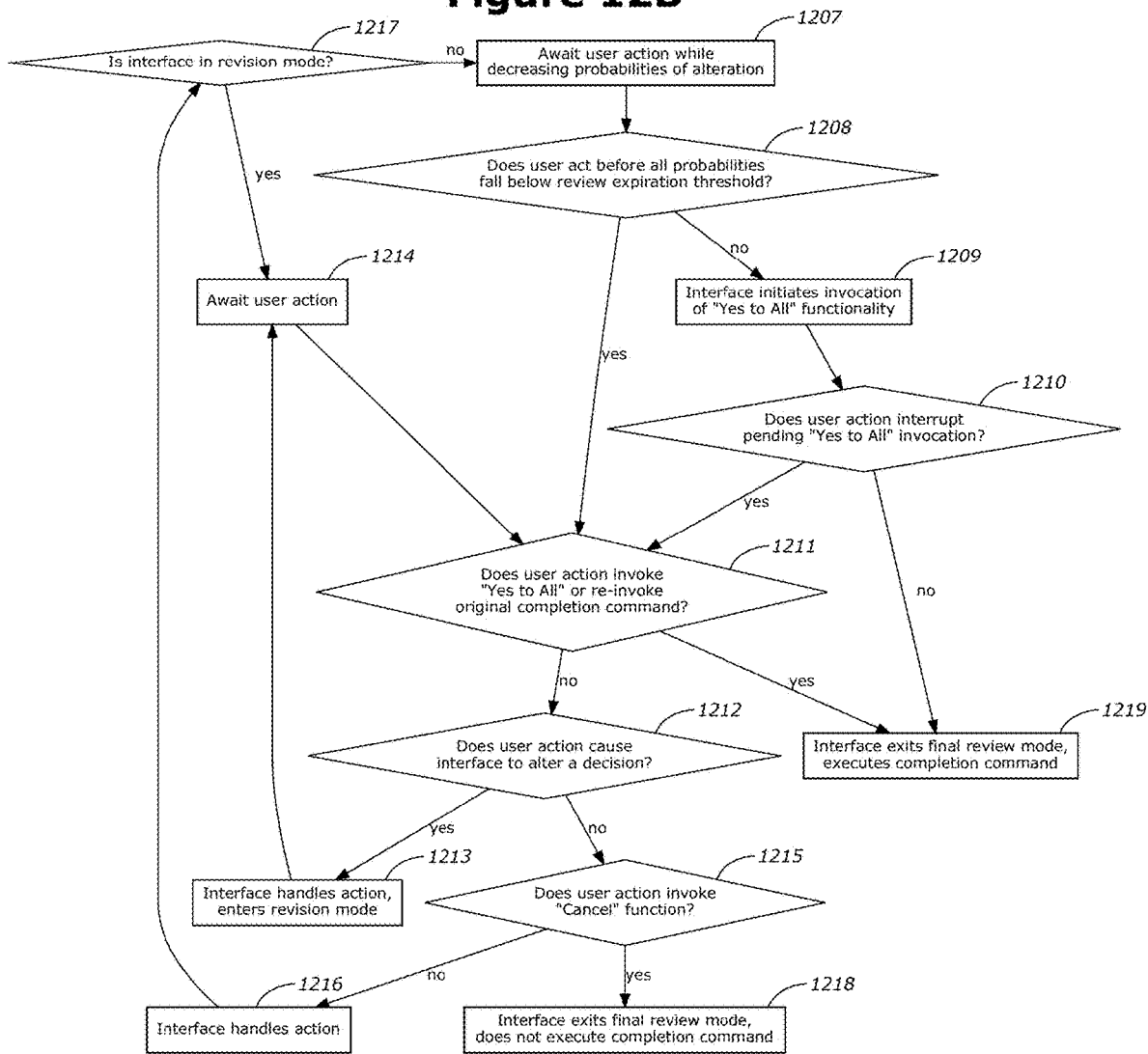

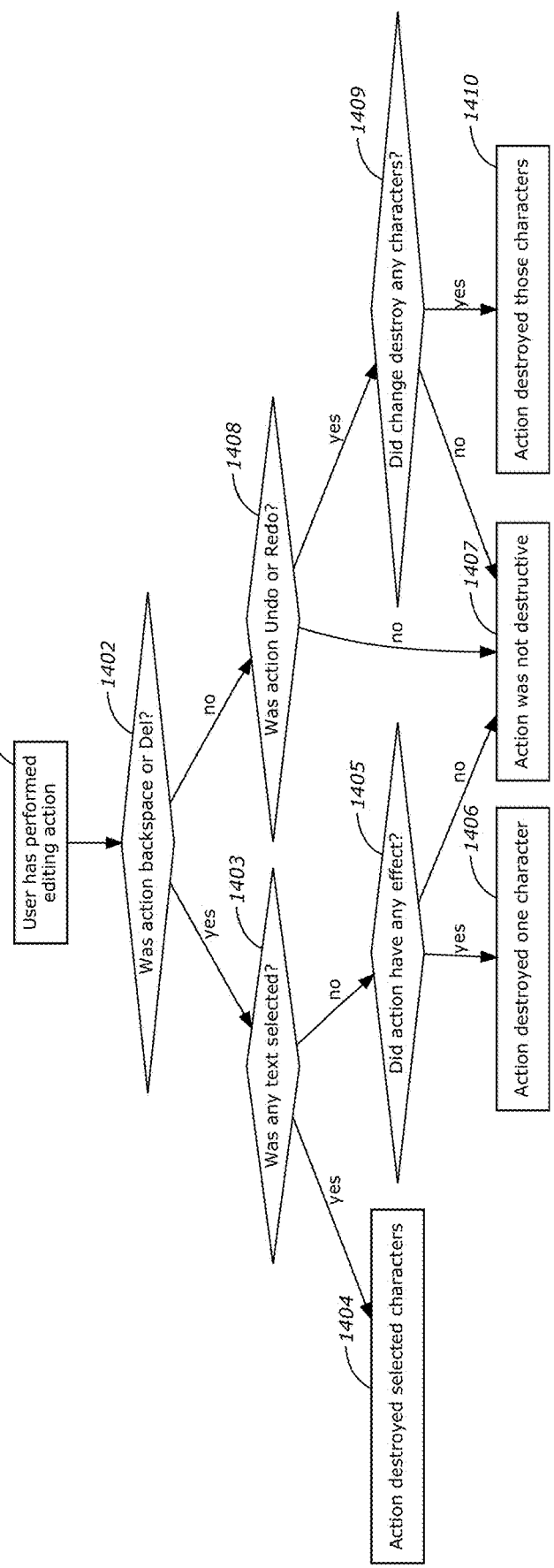

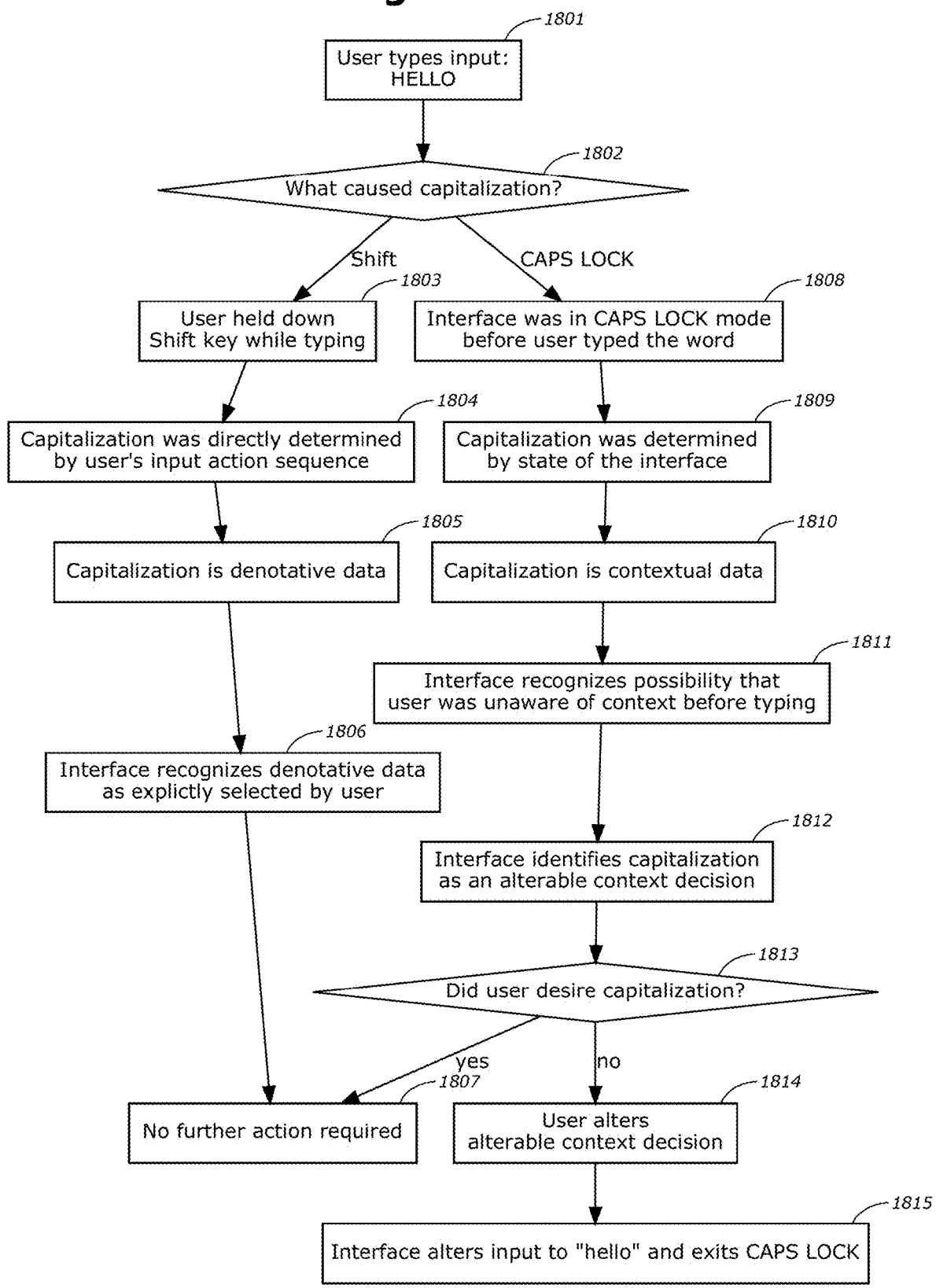

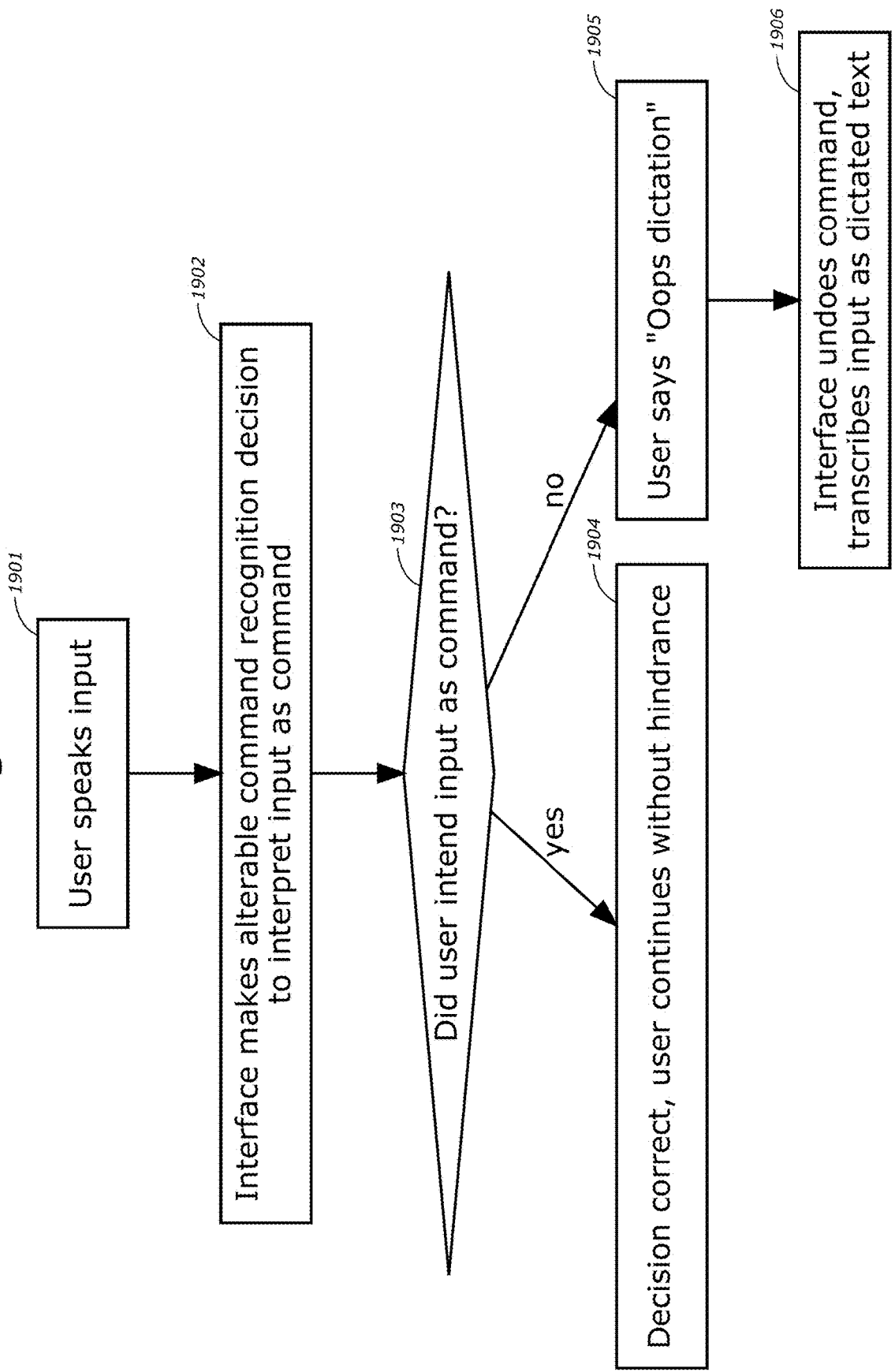

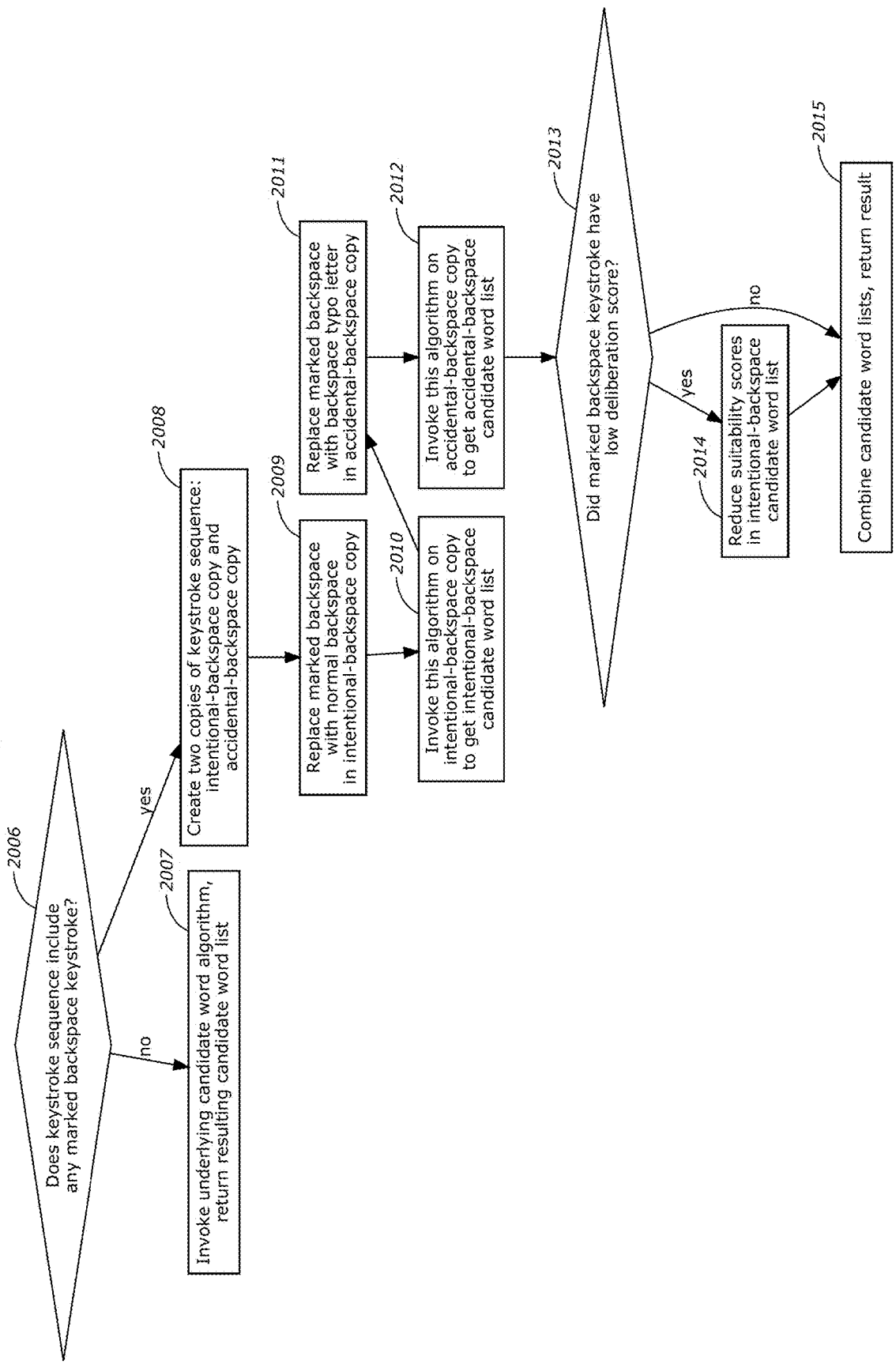

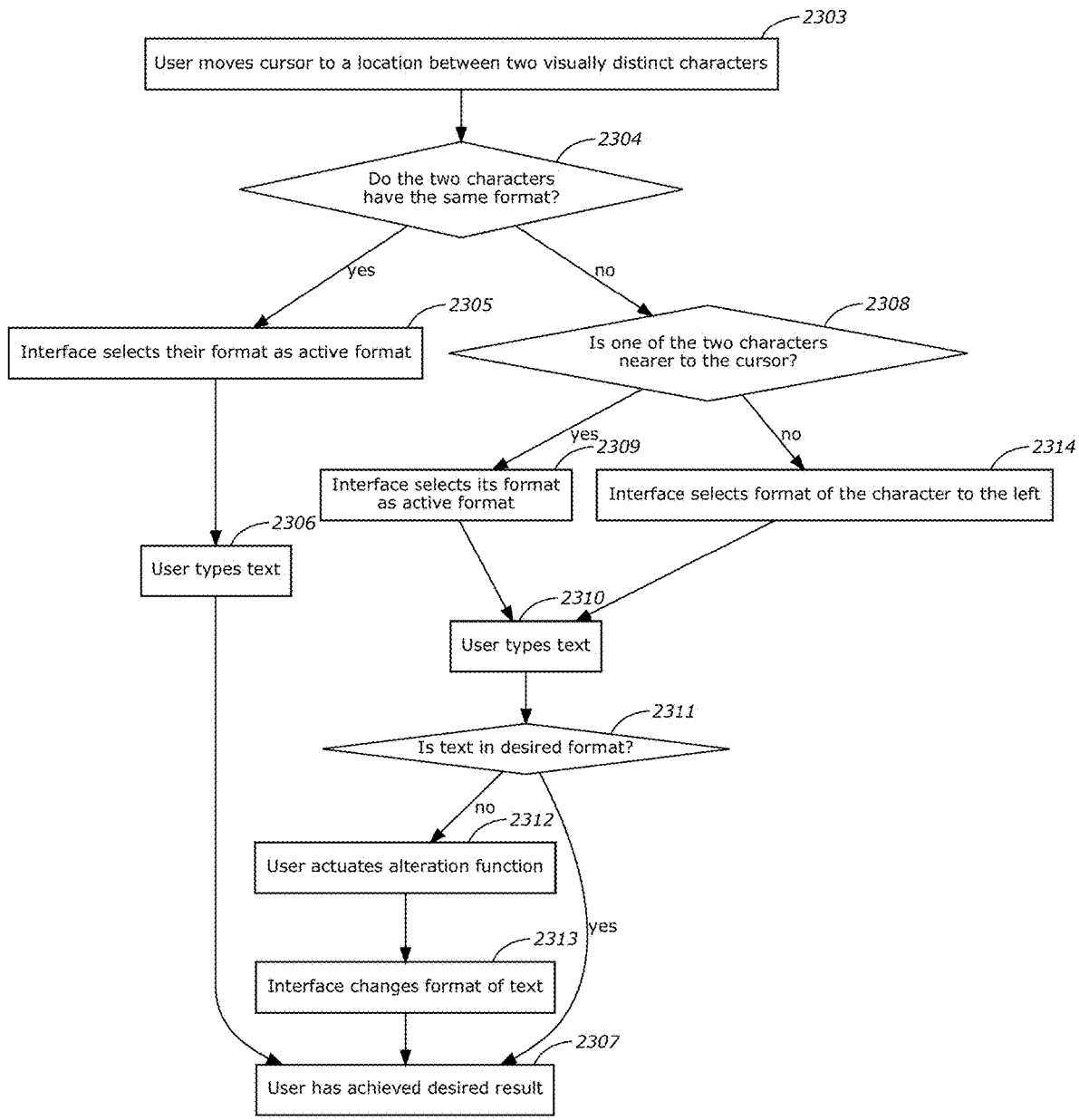

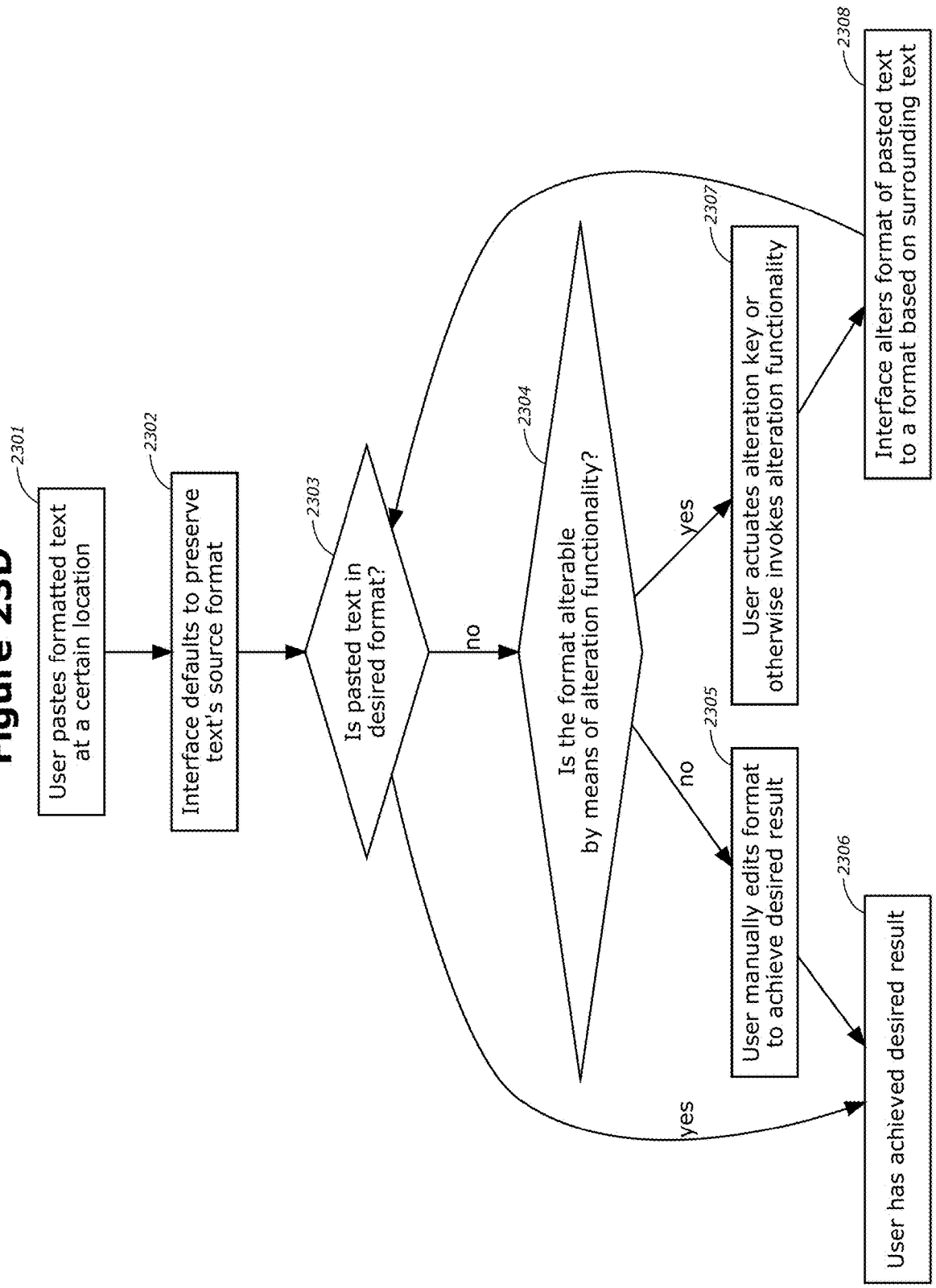

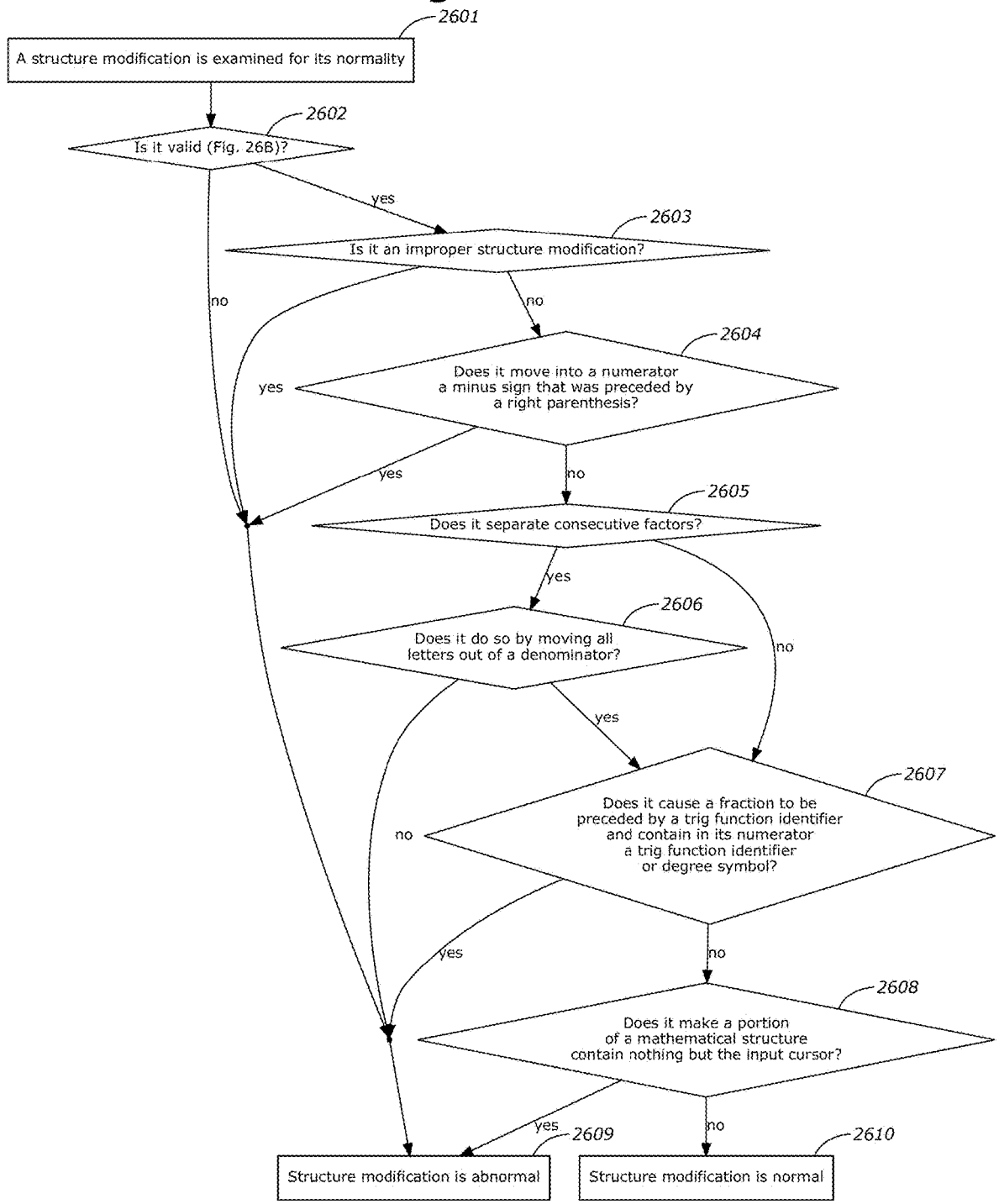

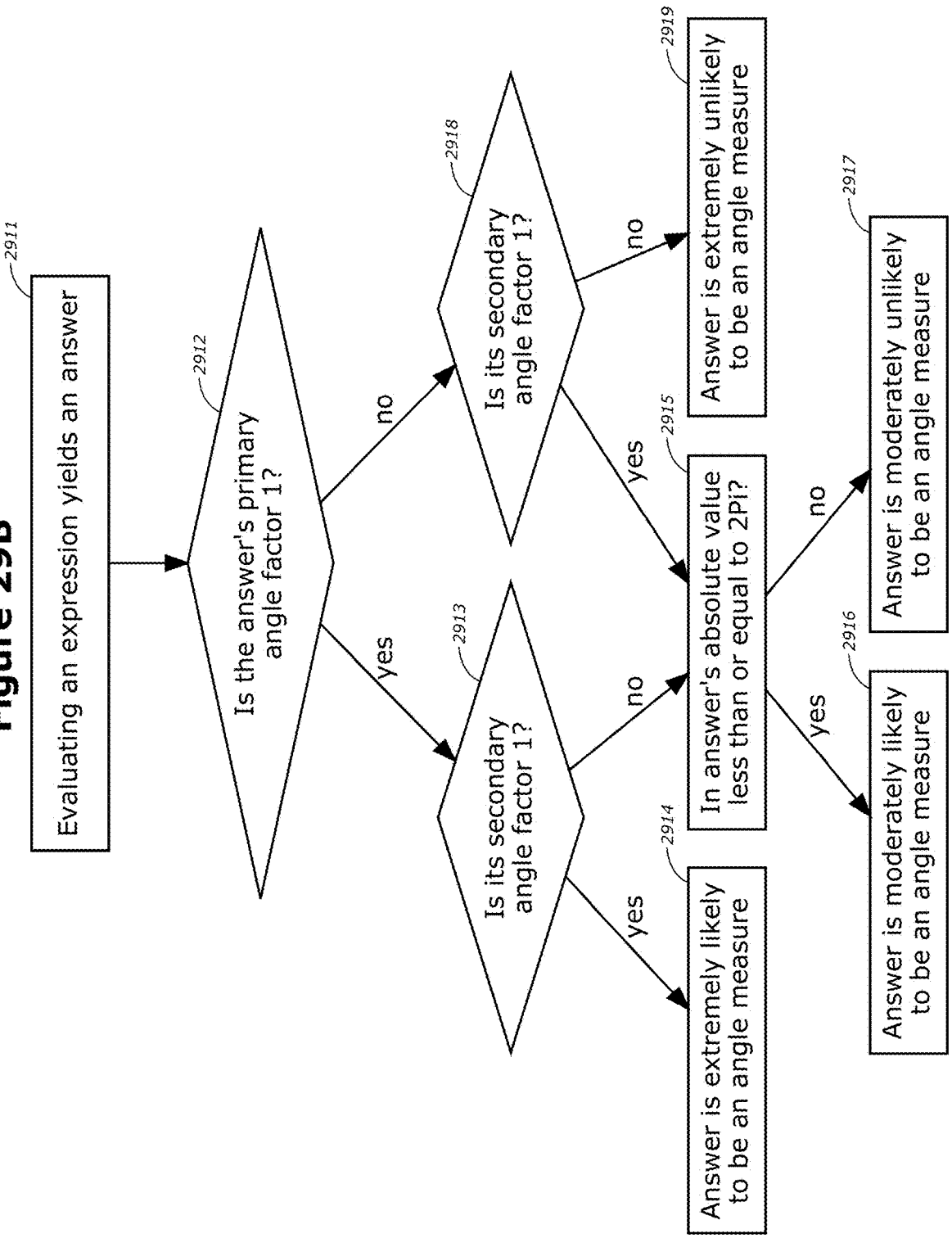

SMART INTERFACE WITH FACILITATED INPUT AND MISTAKE RECOVERY

INCORPORATION BY REFERENCE TO ANY PRIORITY APPLICATIONS

This application is a continuation of U.S. application Ser. No. 15/965,619, filed Apr. 27, 2018, which claims priority to U.S. Provisional Application No. 62/492,005, filed Apr. 28, 2017, which is incorporated herein by reference. Any and all applications for which a foreign or domestic priority claim is identified in the Application Data Sheet as filed with the present application are hereby incorporated by reference under 37 CFR 1.57. U.S. application Ser. No. 11/925,560, filed Oct. 26, 2007, now U.S. Pat. No. 8,788,548, and U.S. application Ser. No. 12/363,590, filed Jan. 30, 2009, now U.S. Pat. No. 8,504,600, which are incorporated herein by reference.

BACKGROUND

Field

This application relates to interfaces for electronic devices such as desktop computers, laptops, tablet computers, smartphones, or voice computers, among others. In particular, this application relates to smart interfaces with facilitated input and mistake recovery.

Description

Electronic devices commonly include interfaces that allow users to interact with the devices. Such interfaces often allow users to enter information into the devices and allow the devices to display information to the users. Commonly, interfaces include one or more input devices, for example, keyboards, touchscreens, etc., and a display device, such as a screen. The devices may also include a software component for controlling the interfaces.

SUMMARY

This application relates to systems, methods, and devices including smart interfaces with facilitated input and mistake recovery. For example, in an embodiment, a system having a smart interface can include an input device configured to receive user input from a user. The input device can include an alteration key, which can be implemented as a physical key or on a touchscreen. The system can also include a display for displaying information to the user. The system also includes at least one non-transitory computer readable medium having stored thereon executable instructions, and at least one processor in communication with the at least one non-transitory computer readable medium and configured to execute the instructions. When executed by the processor, the instructions cause the system to provide one or more of the interface functions described throughout this application. For example, the instructions can cause the system to: identify one or more portions of user input as one or more alterable decisions; for each of the one or more alterable decisions, store, in a memory, information about one or more alternative options for the alterable decision; identify one of the one or more alterable decisions as the currently alterable decision; upon receiving an input indicative of an actuation of the alteration key, alter the currently alterable decision to another of the one or more alternative options based on the stored information; and display, on the display, the altered currently alterable decision to the user. Other implementations and interface functionality are described in greater detail below.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIGS. 2B and 2C are flowcharts illustrating an embodiment of a method for a smart interface.

FIG. 3 is a flowchart that illustrates in detail how the currently alterable decision is determined, according to one embodiment.

FIGS. 4A and 4B illustrate an embodiment of a method for determining what to highlight after each user action.

FIG. 6A is a flowchart that illustrates the behavior of an embodiment of an interface that has a touch alteration feature.

FIG. 11A is a flowchart that illustrates an example decision-making process for determining whether to display a remote alteration control.

FIG. 12B is a flowchart that illustrates an example method for interface operation while in a final review mode.

FIG. 14A is a flowchart that illustrates an example method for determining whether or not an action was a destructive action, and what characters it destroyed.

FIG. 18 is a flowchart that illustrates a distinction between denotative and contextual data, and also shows how contextual data is associated with alterable decisions, according to an embodiment.

FIGS. 19A and 19B are flowcharts depicting example scenarios where alterable command recognition decisions may facilitate mistake correction.

FIGS. 20A and 20B are flowcharts that illustrate an example method that occurs when an enhanced typo-correcting candidate word algorithm is invoked, according to one embodiment.

FIGS. 23B and 23C illustrate features related to positional formatting.

FIG. 23D is a flowchart demonstrating interface use of contextual data to inform pasted text format determinations as alterable format decisions, according to an embodiment.

FIG. 26A is a flowchart that illustrates the process of evaluating a structure modification, according to an embodiment.

FIG. 29B illustrates an example classification system.

DETAILED DESCRIPTION

Figure 1A:
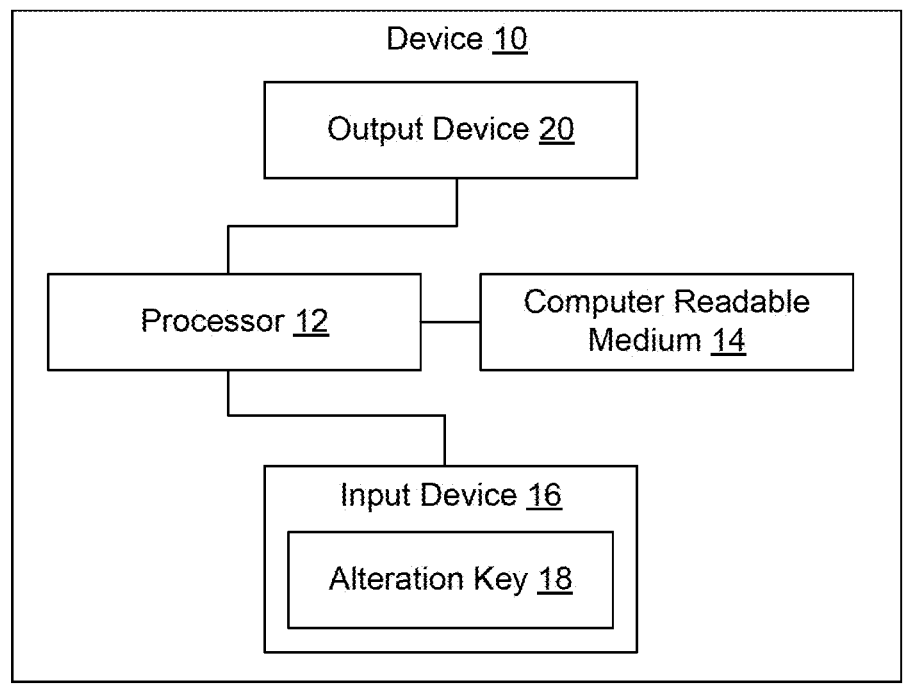
FIG. 1A is a block diagram of an embodiment of a device including an interface as described herein.
Figure 1B:
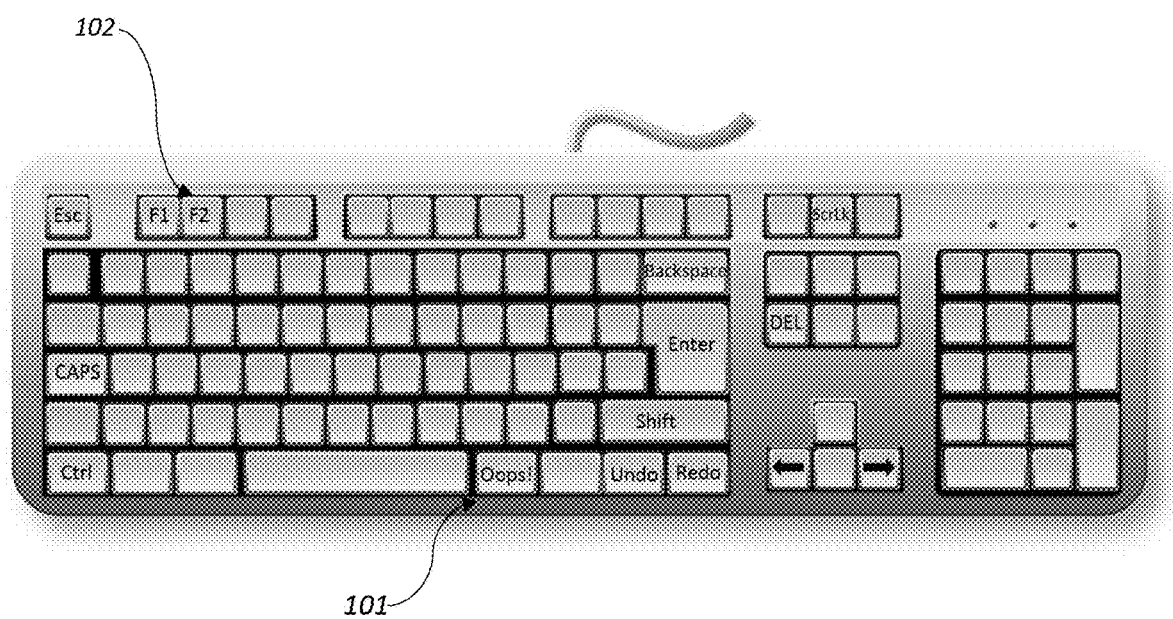
FIG. 1B illustrates an embodiment of a keyboard including an alteration key.
Figure 1C:
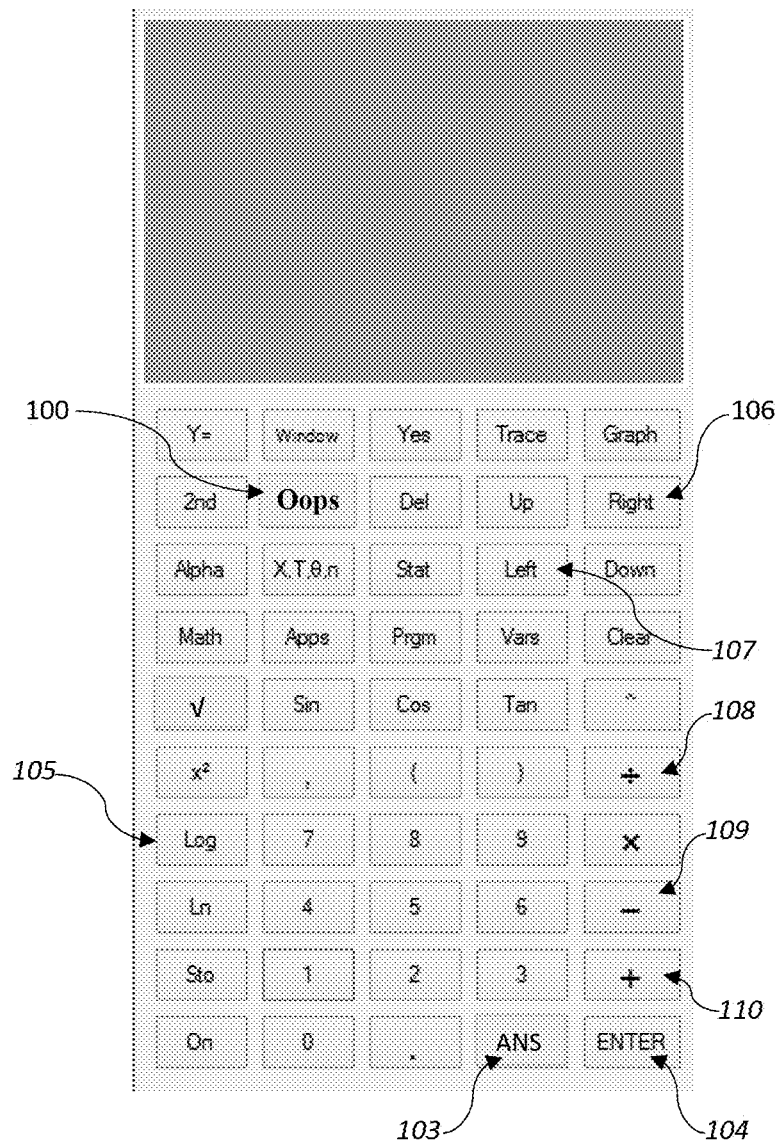
FIG. 1C illustrates an embodiment of a calculator including an alteration key.

This detailed description discusses features and advantages of systems and methods related to smart interfaces with facilitated input and mistake recovery in relation to certain described embodiments, some of which are illustrated in the figures. Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Introduction

An Embodiment May Be Described as a Device, Method, or Interface

In some embodiments, the invention that is disclosed herein comprises a computing device that has an improved user interface. Phrased another way, the invention that is disclosed herein comprises an improved method by which a computing device responds to user input actions. Phrased yet another way, the invention that is disclosed herein comprises an improved user interface for a computing device.

Various ways of characterizing some embodiments of the invention may simultaneously be equally valid. A programmer who reads the present specification may observe that the present specification describes an improved method by which a computing device will respond to user input actions;

if the programmer then programs a computing device accordingly, then the change that the programmer makes to the computing device will consist of an improvement of the user interface of the computing device; a user may then correctly perceive that the result is an improved computing device.

Embodiments of the invention will generally be described herein in terms of a detailed explanation of how "the interface" will behave in response to various user input actions in certain embodiments. Sufficient information about such interface behaviors will be provided that those of ordinary skill in the art will be able to configure a computing device to follow methods that cause its user interface to behave as described herein.

Various Embodiments Are Possible

It is possible for an embodiment to include nearly all the new interface behaviors that are disclosed herein, or to include only a few. Whenever the present specification begins a sentence or paragraph by saying "In an embodiment," this does not necessarily mean that the embodiment whose behavior is described in that sentence or paragraph does or does not include any of the other interface behaviors described elsewhere.

However, in some cases the present specification will describe two or more distinct and incompatible approaches to a particular situation. When the present specification begins a sentence or paragraph by saying, "In an alternative embodiment," in some cases this may mean that the behavior that is described for that alternative embodiment is incompatible with a behavior described prior to that sentence or paragraph. In such cases, this does not necessarily mean that the alternative embodiment is inferior to any such previously described embodiment: it only means that it may be incompatible.

A variety of computing devices may be improved by integrating various interface behaviors that are disclosed herein. For example, an embodiment may be a desktop computer, smartphone, or graphing calculator. However, some of the new interface behaviors that are disclosed herein may be more readily applicable to some computing devices than to others. For example, if a computing device has a touchscreen or mouse or some other means of quickly indicating a location on the display of the computing device, it will be relatively straightforward to implement a feature that is invoked by means of a "touch gesture" that requires the user to indicate a specific location on the display of the computing device. As another example, the present specification may suggest that a particular interface behavior may be applicable "in an embodiment that is a computing device that has a mouse" in order to indicate that the description of that particular interface behavior makes reference to a mouse, and that the behavior may be more readily implemented on a computing device that has a mouse. (Such phrasing emphasizes the configuration of the interface hardware for a particular embodiment, but the phrase "in an embodiment that is an interface that has mouse functionality" would have a substantially identical meaning, since it is equally valid to characterize the invention as an improved interface for a computing device as well as characterizing it as a computing device with an improved interface.)

Embodiment-Specific Terminology

In the discussion of specific features of certain embodiments of the present invention, many terms are defined. In some cases, a term is defined that is said to have a certain meaning "in an embodiment" or is said to pertain to a certain circumstance "in an embodiment," and the specification makes use of that term when describing a feature that is present in certain embodiments. In such cases, for purposes of any feature that is described using that term, that meaning of the term is applicable in at least one embodiment, but it is not necessarily applicable in all embodiments.

For example, the present specification details certain functionality pertaining to "significant interface interventions" in certain embodiments. The specification also says, "In an embodiment, for purposes of the following paragraphs, a 'significant interface intervention' is an alterable interface intervention that does not currently have its non-intervention option selected, and that has a probability of alteration that is above a certain 'undoable intervention threshold.'" It is to be understood that it may also be possible to create an alternative embodiment that still includes functionality pertaining to significant interface interventions, but uses a different definition for "significant interface interventions." (In fact, one such alternative embodiment is also described in the specification: "In an alternative embodiment, a 'significant interface intervention' is any alterable interface intervention that does not currently have its non-intervention option selected, regardless of its probability of alteration.")

Example Device or System

FIG. 1A is a block diagram of an embodiment of a device 10 including an interface as described herein. The device 10 can be any type of electronic or computing device including, for example, a desktop computer, a laptop, a tablet, a smartphone, a voice computer, or a calculator, among others. The interface allows a user to interact with the device 10. For example, the interface allows a user to input information into the device 10 and view or receive information from the device 10.

In the illustrated embodiment, the device 10 includes a processor 12 and a computer readable medium 14. The computer readable medium 14 can include instructions that, when executed by the processor 12, cause the device 10 to implement one or more of the many interface functions described herein. The computer readable medium 14 can also be used to store information, as necessary, for use by the interface.

As shown, the device 10 includes an input device 16. The input device 16 allows the user to input information into and interact with the device 10. Many types of input devices 16 are possible, including keyboards, mice, touchscreens, microphones (for voice commands), etc. The input device 16 can include an alteration key 18. The alteration key 18 can be used, for example, to alter an alterable decision made by the interface as described below, as well as for additional functionality as described throughout this application. In some embodiments, the alteration key 18 is a dedicated key or button. In some embodiments, the alteration key 18 is a soft-key implanted on a touch screen. In some embodiments, the alteration key 18 can be implemented by having a user click or press on an alterable decision to alter it. In some embodiments, the alteration key 18 can be a voice command. Additional examples of the alteration key 18 are found throughout this application.

The device 10 also includes an output device 20. The output device 20 can be configured to display or otherwise communicate information to a user. For example, the output device 20 can be a monitor or screen. In some embodiments, the output device 20 can comprise a speaker for audibly communicating information to the user.

As noted previously, the interface of the device 10 can be configured to implement one or more of the various interface functions described herein.

Alterable Decisions and the Alteration Key

An Alteration Key Example

Figure 2A:
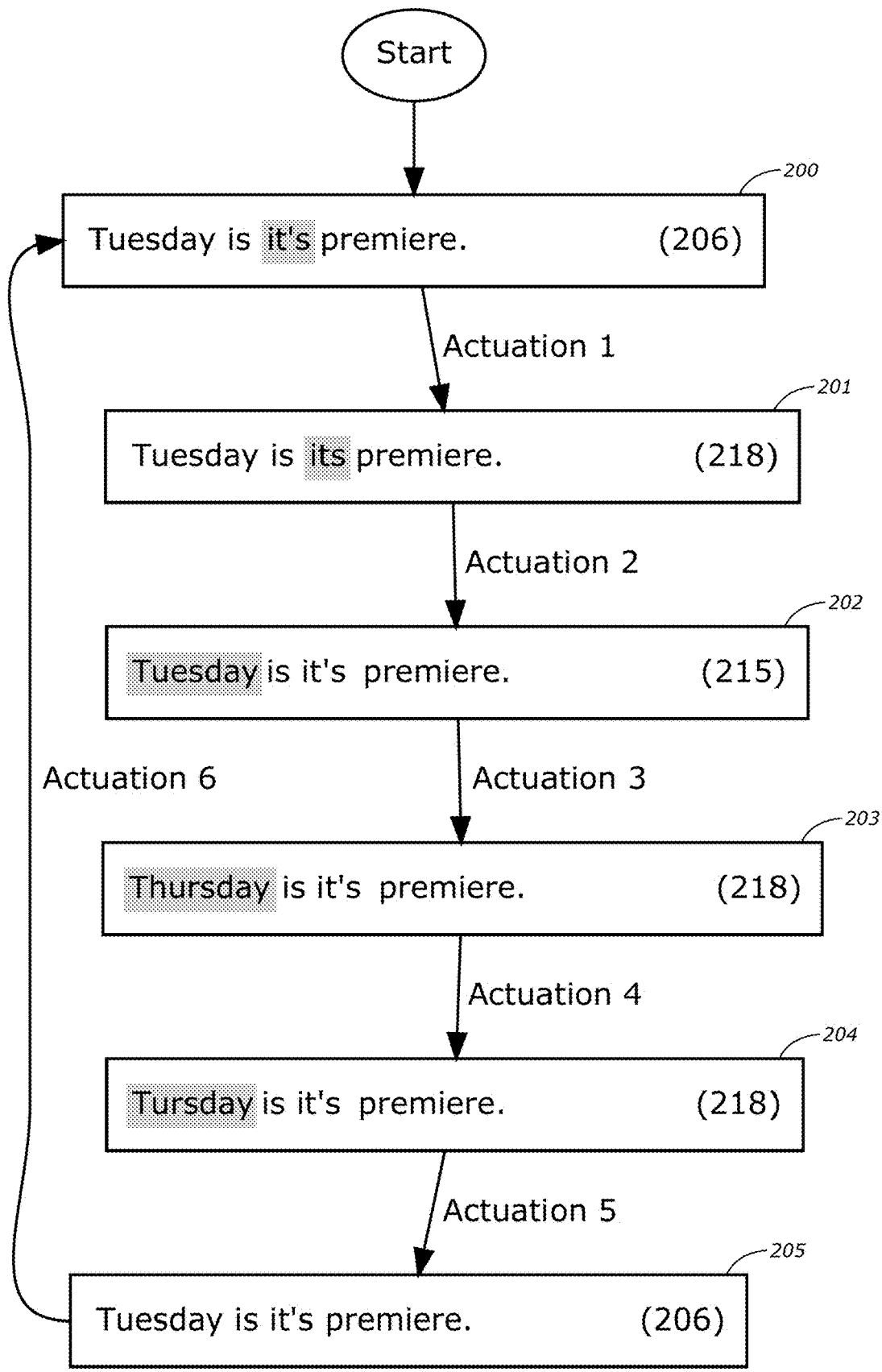
FIG. 2A is a flowchart illustrating repeated consecutive actuations of an alteration key, according to one embodiment.

FIG. 2A illustrates what may happen as a result of repeated consecutive actuations of the alteration key in an embodiment that has an alteration key as described below and in which additional consecutive actuations of the alteration key may have additional effects as described below. Each block of the figure illustrates what the user's input will be after a certain number of consecutive actuations of the alteration key. In each block, the text that the currently alterable decision pertains to is highlighted (if there is a currently alterable decision). In each block, the number in parentheses corresponds to an interface state from FIG. 2B, and thus indicates what state the interface is in at that point. The effect of each actuation can be seen by comparing the block above that actuation's arrow to the block below it.

At the beginning of the example in FIG. 2A, the user has typed "Tursday is its premiere" but the interface has made an alterable decision to autocorrect "Tursday" to read "Tuesday" and an alterable decision to autocorrect "its" to read "it's." The text thus reads "Tuesday is it's premiere," as shown in Block 200. The alterable decision pertaining to the word "it's" is the currently alterable decision. The interface is in default operating mode as shown in FIG. 2B, Block 206.

The user then actuates the alteration key a first time. The interface alters the currently alterable decision, yielding "Tuesday is its premiere," as shown in Block 201. The alterable decision pertaining to the word "its" is still the currently alterable decision. The interface is now in alternate option selected mode as shown in FIG. 2C, Block 218.

The user then actuates the alteration key a second consecutive time. The interface alters the currently alterable decision again and thus reverts it to its default option, yielding "Tuesday is it's premiere," as shown in Block 202. The interface then causes the alterable decision pertaining to the word "Tuesday" to become the currently alterable decision, as indicated by the highlighting of that word in Block 202. The interface is now in alteration cycle operating mode as shown in FIG. 2C, Block 215.

The user then actuates the alteration key a third consecutive time and a fourth consecutive time. This yields "Thursday is it's premiere" as shown in Block 203 and then "Tursday is it's premiere" as shown in Block 204. After these actuations, the alterable decision pertaining to the word "Thursday" or "Tursday" is the currently alterable decision, and the interface is in alternate option selected mode as shown in FIG. 2C, Block 218.

The user then actuates the alteration key a fifth consecutive time. The interface reverts the currently alterable decision to its default option, yielding "Tuesday is it's premiere" as shown in Block 205. There is now no currently alterable decision, as indicated by the lack of highlighting in Block 205. The interface has returned to default operating mode as shown in FIG. 2B, Block 206.

The user then actuates the alteration key a sixth consecutive time. Because there is no currently alterable decision, this actuation of the alteration key does not affect the user's input; instead, it causes the alterable decision pertaining to the word "it's" to become the currently alterable decision again. The arrow labeled "Actuation 6" that points from Block 205 to Block 200 indicates that this sixth consecutive actuation of the alteration key causes the interface to return to the same state it was in prior to the first of these consecutive actuations of the alteration key. Subsequently, a seventh consecutive actuation of the alteration key would again yield the result shown in Block 201, and an eighth consecutive actuation would again yield the result shown in Block 202, and so on.

An Alteration Key Algorithm

FIGS. 2B and 2C are flowcharts that illustrate one possible algorithm for an embodiment that has an alteration key as described below, and in which additional consecutive actuations of the alteration key may have additional effects as described below. This algorithm yields the interface behavior that is illustrated in FIG. 2A.

In an embodiment that behaves as indicated by these flowcharts, whenever the user's most recent action was not an actuation of the alteration key (and in certain other circumstances), the interface is in a "default operating mode" as shown in FIG. 2B, Block 206. While the interface is in default operating mode, each time the user performs an editing action (Block 207) other than an actuation of the alteration key, the interface will handle that action (Block 208) and remain in default operating mode. Whenever the interface handles an editing action other than an actuation of the alteration key, this may cause the interface to update which decision is the currently alterable decision or "CAD" (Block 209): in particular, if the interface makes an alterable decision in response to an editing action, then in certain circumstances this new alterable decision will become the currently alterable decision.

While the interface is in default operating mode (Block 206), if a user actuates the alteration key (Block 210) when there is no currently alterable decision (Block 213), this actuation of the alteration key will cause the most relevant alterable decision to become the currently alterable decision (Block 214) if there is any alterable decision, or will have no effect if there are no alterable decisions; in either case, the interface will remain in default operating mode and return to Block 206.

While the interface is in default operating mode (Block 206), if the user actuates the alteration key when there is a currently alterable decision (Block 210), then the interface will add the other alterable decisions to the alteration cycle (Block 211). The interface will then select an alternate option of the currently alterable decision (Block 212, leading to FIG. 2C, Block 217) and enter an "alternate option selected mode" (Block 218). While the interface is in alternate option selected mode, each time the user actuates the alteration key (Block 220), if the currently alterable decision is a multi-alternative decision and there is an alternate option that has not yet been selected, then the interface will select such an option (Block 217) and remain in alternate option selected mode (Block 218).

While the interface is in alternate option selected mode (Block 218), if the user performs an action other than an actuation of the alteration key, then the user has explicitly selected an alternate option of the currently alterable decision (Block 226), which has effects that are described in the specification. The interface will handle the action (Block 227) and revert to default operating mode (Block 206).

While the interface is in alternate option selected mode (Block 218), if the user actuates the alteration key (Block 219) when there is no alternate option (Block 220) for the currently alterable decision that has not yet been selected, the interface will revert the currently alterable decision to its default option (Block 221). The user has completed review of the currently alterable decision, which has effects that are described in the specification. The interface will then move on to the next decision in the alteration cycle (Block 222), as described in the following paragraphs.

When the interface moves on to the next decision in the alteration cycle, if any alterable decisions are remaining in the alteration cycle, then the most relevant such decision will be removed from the alteration cycle and will become the new currently alterable decision (Block 225). The interface will then enter an "alteration cycle operating mode" (Block 215). The alteration cycle operating mode (Block 215) and the default operating mode (Block 206) are quite similar, but when the interface is in the alteration cycle operating mode (Block 215) it already has an alteration cycle in mind, so if the user's next action is an actuation of the alteration key (Block 216) then the interface will not need to initialize the alteration cycle before proceeding to alter the currently alterable decision (Block 217) and enter alternate option selected mode (Block 218). When the interface is in the alteration cycle operating mode (Block 215), if the user's next action is not an actuation of the alteration key, the interface will handle the action (Block 227, leading to Block 208), update which decision is the CAD (Block 209), and revert to default operating mode (Block 206).

When the interface moves on to the next decision in the alteration cycle, if no alterable decisions are remaining in the alteration cycle, there will then be no currently alterable decision (Block 223) and the interface will revert to default operating mode (Block 224, leading to Block 206).

Other algorithms that implement the same interface behavior or similar behavior will be evident to those of ordinary skill in the art.

Altering Decisions

In the present specification, the "default option" of an alterable interface decision can be the actual initial outcome of that decision, and an "alternate option" can be some other outcome that the user might prefer for that decision, except as otherwise specified. For example, in an embodiment, if the interface has automatically corrected the spelling of a word that a user typed, and the interface's decision to correct this word's spelling is an alterable interface decision, then the corrected spelling is the default option and the user's original uncorrected spelling is an alternate option.

In an embodiment, when the interface makes an alterable decision, in addition to saving enough information for the interface to subsequently identify the portion of input that the decision pertained to, the interface will also save enough information about the alternate options of that decision that the interface can later determine what the user's input would then be if an alternate option were chosen instead of the default option. For example, in an embodiment, when the interface makes an alterable decision to automatically correct a word that a user typed, the interface will save enough information to later be able to determine what the user's input would then be if the user's original uncorrected spelling were restored retroactively.

Below, various embodiments are specified in which the interface will "alter an alterable interface decision" in certain circumstances. Except as otherwise specified, when the interface alters an alterable interface decision, it replaces that decision's default option with an alternate option, without prompting the user for any additional confirmation or clarification; however, various other ways that the interface may alter an alterable interface decision in certain circumstances are specified below. In an embodiment, when the interface alters an alterable interface decision, it will retain enough information to be able to subsequently revert that decision to its default option.

In an embodiment, after a user has caused the interface to alter a decision so that an alternate option of that decision is selected, if the user then performs some action that does not cause the interface to alter that decision, this constitutes "explicitly selecting an option" of that alterable interface decision. Unless otherwise specified, when the user's most recent action caused the interface to alter a decision, the user has not yet explicitly selected an option of that alterable interface decision—not until the user performs some other action.

In an embodiment, once a user has explicitly selected an alternate option of an alterable interface decision, if the decision is still alterable, then for purposes of the alteration functionality described herein, the interface will subsequently treat the option the user explicitly selected as the default option of that particular alterable decision and will treat the former default option of that decision as an alternate option. For example, in an embodiment, after the interface makes an alterable decision to automatically replace the word "goof" with the word "good" but then the user explicitly selects the alternate option "goof," if the decision is still alterable, then "goof" will subsequently be treated as the default option of that particular decision for purposes of alteration functionality and "good" will be treated as an alternate option. (This does not mean that explicitly selecting the alternate option "goof" necessarily has any effect on future interface decisions regarding whether or not to automatically replace the word "goof": it only means that "goof" will subsequently be treated as the default option of the alterable decision the interface already made.)

In the present specification, any mention of "alteration features" or "alteration functionality" may refer to features that are disclosed herein that are specifically designed to interact with alterable interface decisions. Any mention of "altering" an alterable interface decision generally refers only to altering such a decision by means of such alteration features, and generally does not refer to manual editing of the portion of the user's input that an alterable interface decision pertains to, unless otherwise specified. For example, if the interface has made an alterable decision to automatically insert an apostrophe in the word "its," then if the user manually deletes the apostrophe, the user will not be considered to have "altered" an alterable interface decision.

The Alteration Key

In an embodiment, in certain circumstances an alterable interface decision is the "currently alterable decision" for purposes of alteration functionality. In the specification, methods and systems are described for determining which alterable interface decision, if any, is the currently alterable decision at any given time. (In an embodiment, the currently alterable decision is often, but not always, the most recent alterable decision, as is explained in the specification. In an embodiment, it may be possible to alter an alterable decision by various means even when it is not the so-called currently alterable decision.)

In an embodiment, the computing device has an alteration key such that when the alteration key is actuated, if there is a currently alterable decision, then the interface will immediately alter that decision. For example, if the interface has made an alterable decision to automatically insert an apostrophe in the word "its" and that decision is the currently alterable decision, then actuating the alteration key will cause that apostrophe to be deleted, regardless of the input cursor's current location, without prompting the user for any additional confirmation or clarification. Such an alteration key will often enable a user to correct an undesired outcome of an interface decision with a single keystroke, without the need to go back and manually correct the interface decision.

In an embodiment, when the alteration key is actuated, if there is then no currently alterable decision but at least one alterable decision exists, then in response to that actuation of the alteration key the interface will cause the "most relevant decision" as defined in the specification to become the currently alterable decision, and no other effect will occur. (In such an embodiment, it may be particularly advantageous for the interface to then highlight the currently alterable decision, as is described in the specification, so that the user can see the effect of such an actuation of the alteration key.) This behavior is illustrated by Actuation 6 of FIG. 2A.

As is discussed in the specification, the alteration "key" need not necessarily be an individual key on a hardware keyboard, but may be any means of invoking the function that is specified above in the description of the alteration key. For example, in various embodiments, a key labeled "Oops" on a hardware keyboard may be the alteration key, or the F12 key may be the alteration key, or the key combination Ctrl-T may be the alteration key, or a specific virtual key on a virtual keyboard may be the alteration key, and so forth.

Multi-Alternative Decisions

In an embodiment, in certain circumstances, when the interface makes an alterable decision in which the interface selects among more than two relevant available options, the interface will save enough information to later replace the option that was selected with any of the plurality of options that were not selected. In such a case, the alterable decision will have more than one alternate option. In the present specification, an alterable interface decision that has more than one alternate option will be referred to as a "multi-alternative decision"; an alterable interface decision that has only one alternate option will be referred to as a "single-alternative decision." (These terms thus refer to the number of alternate options of an alterable decision, not counting the default option.)

In an embodiment, after the interface has made an alterable interface decision, in certain circumstances, the interface may later add more alternate options to that alterable interface decision or may later remove alternate options from that alterable interface decision. In such an embodiment, it may be possible for a single-alternative decision to later become a multi-alternative decision, or vice versa.

In an embodiment, when the interface first alters a multi-alternative decision, in addition to selecting an alternate option of the decision, the interface will create a list of alternate options of that decision that have been selected. In an embodiment, when the interface alters a multi-alternative decision that the interface has previously altered, if an alternate option currently exists that has not been selected, then interface will replace the selected alternate option with an alternate option that has not yet been selected and will then add the newly selected alternate option to the list of alternate options that have been selected. For example, in a certain embodiment, when a user types the word "Tursday" and presses the space bar key the interface may make a decision between three options: leaving the word as "Tursday," correcting the word to read "Tuesday," or correcting the word to read "Thursday"; if the interface initially decides to correct the word to read "Tuesday," such a correction may be a multi-alternative decision such that if the user then actuates the alteration key once the word will be changed to "Thursday" and if the user then actuates the alteration key a second consecutive time the word will be changed to "Tursday." This example corresponds to Actuations 3 and 4 of FIG. 2A. Thus, in such an embodiment, if the interface responds to a first actuation of the alteration key by selecting an alternate option that is not the particular alternate option a user desired, then the user can simply continue to actuate the alteration key repeatedly until the desired alternate option becomes selected.

Reverting Alterable Decisions

In an embodiment, when the interface alters a single-alternative decision, if the decision already has its alternate option selected, then the interface reverts that decision to its default option. For example, if the currently alterable decision is the interface's decision to insert an apostrophe in the word "it's," and if this decision is a single-alternative decision, then after the user actuates the alteration key once and thus causes the apostrophe to be deleted, actuating the alteration key a second consecutive time will cause the apostrophe to be inserted again, as is illustrated by Actuation 2 of FIG. 2A. Similarly, in an embodiment, when the interface alters a multi-alternative decision, if the decision has already been altered sufficiently many times that it is no longer possible for the interface to again replace the selected alternate option with a different alternate option that has not been selected yet, then the interface will instead revert that decision to its default option, as is illustrated by Actuation 5 of FIG. 2A. Thus, in such an embodiment, if in response to an actuation of the alteration key the interface actually introduces a new mistake by changing a decision that the user did not want to change, then the user can correct this mistake by continuing to actuate the alteration key repeatedly until the decision reverts to its default option.

In an embodiment, once a user causes the interface to alter an alterable decision sufficiently many times that the decision reverts to its default option, the user has "completed review" of that alterable interface decision. When a user causes the interface to alter an alterable decision sufficiently many times that every alternate option of that decision has been selected at some point, the user still has not "completed review" of that decision until the user causes that decision to revert to its default option.

In an embodiment, after the interface reverts a multi-alternative alterable decision to its default option, the interface will discard or empty its list of alternate options of that decision that have been selected, which means that the interface will subsequently regard each alternate option as though it had not been selected yet, and so continuing to repeatedly alter that particular decision will cause the interface to cycle through the various alternate options again.

The Alteration Cycle

In an embodiment, for purposes of the interface behaviors described in the following paragraphs, the alteration key is an "alteration-cycle-related key." Other alteration-cycle-related keys are described in the specification.

In an embodiment, except as otherwise specified, whenever the user's most recent action was not an actuation of an alteration-cycle-related key, the currently alterable decision is the "most relevant" alterable interface decision as defined below. (In an embodiment, the most relevant alterable decision is often, but not always, the most recent alterable decision, as is explained in the specification.)

In an embodiment, when a user actuates the alteration key or some other alteration-cycle-related key, if the user's most recent previous action was not an actuation of an alteration-cycle-related key, then the interface will determine an "alteration cycle" that initially includes every alterable decision other than the currently alterable decision. The interface will continue to remember this alteration cycle until the user performs an action that is not an actuation of an alteration-cycle-related key, except as otherwise specified below. (Once the user performs an action that is not an actuation of an alteration-cycle-related key this alteration cycle is no longer relevant, so after that, the next time the user actuates an alteration-cycle-related key, the interface will determine a new, updated alteration cycle.)

In an embodiment, when a user performs an actuation of the alteration key that causes the currently alterable decision to revert to its default option, the interface will "move on to the next decision in the alteration cycle." When the interface moves on to the next decision in the alteration cycle, this means that if any decisions remain in the alteration cycle, then the most relevant decision that is in the alteration cycle will be removed from the alteration cycle and will become the new currently alterable decision. This is illustrated by Actuation 2 of FIG. 2A, which not only causes an alterable decision to revert to its default option but also causes a different alterable decision to become the new currently alterable decision. Thus, in an embodiment, if a user does not notice that a particular alterable decision had an undesired outcome until after the interface has made other alterable decisions, then as long as that particular decision is still alterable, it is still possible for the user to correct the mistake by means of the alteration key: the user can repeatedly press the alteration key sufficiently many times to cycle past any more relevant alterable decisions (which are, in most cases, the more recent alterable decisions) and then press the alteration key again to alter the decision that had the undesired outcome.

In an alternative embodiment, when a user performs an actuation of the alteration key that causes the currently alterable decision to revert to its default option, if any decisions remain in the alteration cycle, then the interface will move on to the next decision in the alteration cycle as described in the preceding paragraph, and will also alter the new currently alterable decision (if any). (In such an embodiment, it may be particularly advantageous to have a No key or Escape key that can revert the currently alterable decision to its default option without affecting any other alterable decision, as is described in the specification.)

In an embodiment, if no decisions are in the alteration cycle when the interface moves on to the next decision in the alteration cycle, then there will cease to be a currently alterable decision and this alteration cycle will no longer be relevant, as is illustrated by Actuation 5 in FIG. 2A. In an embodiment, after this happens, if the user's next action is an actuation of the alteration key, then that actuation of the alteration key will have the same effect as though it were a nonconsecutive actuation of the alteration key: the most relevant alterable decision will become the currently alterable decision, and the interface will determine a new, updated alteration cycle. This behavior is illustrated by Actuation 6 in FIG. 2A, which returns the user's input to its initial state so that a seventh consecutive actuation of the alteration key would have the same effect that Actuation 1 had. Thus, in such an embodiment, by continuing to actuate the alteration key consecutively, a user may repeatedly cycle through alterable interface decisions.

In an alternative embodiment, if no decisions are in the alteration cycle when the interface moves on to the next decision in the alteration cycle, then there will cease to be a currently alterable decision, and any further consecutive actuations of the alteration key will have no effect: there will be no currently alterable decision until after the user performs an action that is not an actuation of an alteration-cycle-related key.

In another alternative embodiment, if no decisions are in the alteration cycle when the interface moves on to the next decision in the alteration cycle, then the most relevant alterable decision will become the new currently alterable decision (even if it was the previous currently alterable decision) and the interface will add every alterable decision other than that decision to the alteration cycle. In such an embodiment, by continuing to actuate the alteration key consecutively, a user may repeatedly cycle through alterable interface decisions without arriving at any intermediate state in which there is no currently alterable decision.

In an embodiment that behaves as described in the preceding paragraphs, when a user is actuating the alteration key repeatedly, the alteration cycle contains all the alterable decisions that have not yet become the currently alterable decision. It will be evident to those of ordinary skill in the art that alternative embodiments can be constructed where the interface behaves the same way as an embodiment that has an alteration cycle as described above, but where this interface behavior is achieved by a slightly different means. For example, in one alternative embodiment, instead of keeping track of an alteration cycle that contains all the alterable decisions that have not yet become the currently alterable decision, the interface keeps track of a "used decision list" of all the alterable decisions that have already become the currently alterable decision, and when the interface "moves on to the next decision in the alteration cycle," this means that first the currently alterable decision is added to the used decision list, and then if there are any remaining alterable decisions that are not in the used decision list then the most relevant remaining alterable decision becomes the new currently alterable decision.

Alteration Probability

Alteration Probability

In an embodiment, when the interface makes an alterable decision, the interface will assign to that decision a "probability of alteration" that reflects the approximate ratio of the mathematical probability that a user will wish to select the single most desirable alternate option of the decision to the mathematical probability that the user will wish the default option to remain selected, insofar as the interface is able to determine such a ratio. Such an embodiment will be said to have "the alteration probability feature."

(For most purposes, the probability of alteration of an alterable decision may be thought of as reflecting the approximate probability that a user will wish to alter that decision, insofar as the interface is able to determine such a probability. This is a simpler explanation of the probability of alteration than the one given in the preceding paragraph, and works out to be essentially the same thing except when there is a reasonably high probability that a user will wish to select an alternate option of the decision other than the most desirable alternate option of the decision.)

In an embodiment, the "most relevant" alterable interface decision is the alterable decision that has the highest probability of alteration; if more than one alterable decision is tied for the highest probability of alteration, the "most relevant" alterable interface decision is the most recent decision among the decisions that have the highest probability of alteration. In such an embodiment, an alterable decision is "more relevant" than another decision if it has a higher probability of alteration or if it has an equal probability of alteration and is more recent. Thus, in such an embodiment, if the embodiment has an alteration key, then a first actuation of the alteration key will alter the most recent alterable interface decision unless some other alterable interface decision currently has a higher probability of alteration.

In an alternative embodiment, the "most relevant" alterable interface decision is simply the most recent alterable decision, and an alterable decision is "more relevant" than another decision if it is more recent.

FIG. 3 is a flowchart that illustrates in detail how the currently alterable decision is determined, in an embodiment. Block 301 asks, "Is there any alterable decision?" If the answer is yes, then the algorithm proceeds to Block 302, which asks, "Does only one have the highest probability of alteration (POA)?" If more than one alterable decision is tied for the highest probability of alternation, then the answer is no, and the algorithm proceeds to Block 303, which states "Find most recent decision of those with highest POA." The most recent decision is then evaluated using the question in Block 304, "Is its POA above the highlight threshold?" If only one alterable decision has the highest probability of alteration, the answer to the question in Block 302 is yes, and that alterable decision is evaluated using the question in Block 304. If the answer to the question in Block 304 is yes, the alterable decision being considered becomes the currently alterable decision (Block 305). If the answer is no, then no decision will be the currently alterable decision (Block 306). Similarly, if there is no alterable decision initially, then the answer to the question in Block 301 is no and the algorithm proceeds directly to Block 306, which states, "Make no decision be the CAD."

Visuals for Interface-Specified Changes

Highlighting Blocks

In the following paragraph, and throughout the present specification, where appropriate, the word "input" should be understood to also refer to the software's output or to anything else that interface functionality may interact with; for example, in an embodiment where the interface makes an alterable decision whether to display the output of a calculation as a fraction or as a decimal, the "portion of input" that this alterable decision pertains to is actually the output of the calculation.

In the following paragraphs, a "highlighted block" is a portion of input that the interface distinctively highlights for some reason. For example, in an embodiment, when a user searches for a particular word within a document, the interface highlights each occurrence of that word in yellow, and each such highlighted word is thus a highlighted block.

In various embodiments, in certain circumstances, various portions of input will be distinctively highlighted for various reasons. Various such circumstances are described below. It is to be understood that various means of distinctively highlighting a portion of input will be evident to those of skill in the art; for example, a highlighted portion of input may be bold, or may be italicized, or may be underlined, or may have a different foreground color than the surrounding input, or may have a different background color than the surrounding input. Other means of distinctively highlighting a portion of input will be evident to those of ordinary skill in the art.

Highlighting Alterable Blocks

In an embodiment, in certain circumstances, an alterable interface decision will be "highlighted," which means that its alterable block will be distinctively highlighted in some way. In the present specification, the alterable block of such a decision will be referred to as a "highlighted alterable block." For example, when the interface has made an alterable decision to automatically convert the word "tuesday" to "Tuesday" and that decision is a highlighted alterable interface decision, the displayed word "Tuesday" is a highlighted alterable block.

In an embodiment, an alterable interface decision will be highlighted when its probability of alteration is above a certain "highlighting threshold." In an alternative embodiment, only the currently alterable decision will be highlighted. In another alternative embodiment, every alterable interface decision will be highlighted.

In an embodiment, an alterable interface decision that would otherwise be highlighted will not be highlighted if its highlighted alterable block overlaps the highlighted alterable block of a more relevant highlighted alterable interface decision. Of course, in such circumstances, the overlapping portion will appear highlighted because it is part of the highlighted alterable block of the other decision; however, even if the less relevant decision's entire alterable block consists of the overlapping portion, the less relevant decision still will not be treated as a highlighted alterable decision.

In an embodiment, when the currently alterable decision is highlighted, it will be distinctively highlighted in a different way than any other alterable decision. For example, the highlighting of its alterable block may have a clearly defined boundary while the highlighting of an alterable block of any other alterable decision has a boundary that gradually blends into the background, or the alterable block of the currently alterable decision may be displayed with a light green background color while the alterable block of any other highlighted alterable interface decision is displayed with an even lighter green background color that more closely resembles the white background color of non-highlighted input. Other means of distinctively highlighting the currently alterable decision in a different way than any other alterable decision will be evident to those of ordinary skill in the art. In an embodiment, whenever any special circumstances obtain such that actuating the alteration key would cause the interface to alter more than one alterable decision, each such decision will be distinctively highlighted as though it were the currently alterable decision. Thus, for example, in an embodiment where repeatedly actuating the alteration key may eventually cause the interface to cycle through various alternate options of a combination decision (as is described in the specification), distinctive highlighting will continue to indicate which alterable block or blocks will change the next time the user actuates the alteration key.

In an embodiment, when the currently alterable decision has a probability of alteration that is below the highlighting threshold, it will be highlighted nonetheless. However, in an embodiment, when the most relevant alterable decision has a probability of alteration that is below the highlighting threshold, there will be no currently alterable decision unless the user's most recent action pertained to alteration functionality. Thus, in such an embodiment, when the most relevant alterable decision has a probability of alteration that is below the highlighting threshold and the user's most recent action did not pertain to alteration functionality, if the user actuates the alteration key, then that actuation of the alteration key will not cause the interface to alter a decision, but will instead cause the most relevant alterable decision to become the currently alterable decision, which will cause the interface to highlight that decision; subsequently, if the user's next action is another actuation of the alteration key, then the interface will alter that decision.

In an embodiment, a highlighted alterable block will be displayed in a way that varies according to the magnitude of its "highlight intensity score," so that highlighting will be more intense for an alterable block that has a relatively high highlight intensity score, and more subtle for an alterable block that has a relatively low highlight intensity score; when an alterable block has a highlight intensity score of 0, it will not be highlighted. For example, in one embodiment, a highlighted alterable block that has a highlight intensity score of 5.0 will be highlighted a bright color, while a highlighted alterable block that has a highlight intensity score of 1.0 will be be highlighted a pastel color; as another example, in another embodiment, a highlighted alterable block that has a highlight intensity score of 5.0 will cycle rapidly through various bright colors, while a highlighted alterable block that has a highlight intensity score of 1.0 will cycle slowly through various pastel colors.

In an embodiment, in ordinary circumstances, the highlight intensity score of a highlighted alterable block is equal to a certain minimum amount plus the amount by which the probability of alteration of its alterable decision exceeds the highlighting threshold. (Below, special circumstances are described in which the interface may override this default behavior.) For example, in an embodiment, the maximum probability of alteration of an alterable decision is 5.0, the highlighting threshold equals 2.0, and the minimum highlight intensity score of a highlighted alterable block is 1.0. In such an embodiment, the highlight intensity score of a highlighted alterable block is equal to 1.0 plus the amount by which the probability of alteration of its alterable decision exceeds 2.0, so the maximum highlight intensity score of a highlighted alterable block equals 1.0 plus 5.0 minus 2.0, which equals 4.0; therefore, in such an embodiment, in ordinary circumstances, highlight intensity scores for highlighted alterable blocks will range from a minimum of 1.0 to a maximum of 4.0.

In an alternative embodiment, the highlight intensity score of a highlighted alterable block is simply equal to the probability of alteration of its alterable decision, except that if that probability of alteration is negative then the highlight intensity score is zero.

In an embodiment, whenever the user's most recent action caused the interface to alter a decision, if repeating the same action would cause the interface to alter the same decision again, then the proximate change is the change that will occur if the interface alters that decision again, and the proximate block is that decision's alterable block. In an embodiment, whenever the user's most recent action caused the interface to alter a decision, if repeating the same action would cause the interface to alter some other decision (such as because the user's most recent action was an actuation of the alteration key and a different alterable decision is now the currently alterable decision), then the proximate change is the change that will occur if the user repeats the same action, and the proximate block is that other decision's alterable block.

In an embodiment, while the proximate change is an alteration of some alterable interface decision (as described in the preceding paragraph), the interface will treat that decision as the most relevant alterable interface decision, and so that decision will be the currently alterable decision even if other decisions are more recent and/or have a higher probability of alteration. For example, in an embodiment, if a user alters a decision a first time by means of the touch alteration feature, then the decision that the user thus altered will become the currently alterable decision if it was not already the currently alterable decision, at least until the user performs some other action.

Touch Controls

Touch Changes

The interface behavior described in the following paragraph will be referred to as "the touch alteration feature" in the present specification.

In an embodiment, if a user touches a highlighted alterable block, then the interface will alter that particular alterable interface decision. Therefore, in such an embodiment, if alteration works as described in the specification, then the first time a user touches a highlighted alterable block that has not previously been altered, the interface will immediately alter that decision by replacing its default option with an alternate option, without prompting the user for any additional confirmation or clarification. In an embodiment, if after touching a highlighted alterable block the user's next action does not cause the interface to again alter that decision, then performing that next action constitutes "explicitly selecting an option" of that alterable interface decision. In an embodiment, if a user touches a highlighted alterable decision's alterable block more than once consecutively, then after any touch that caused the interface to select an alternate option, the next touch will cause the interface to select a different alternate option that was not selected yet if any such alternate option exists, or will cause the interface to revert the decision to its default option otherwise.

Figure 4B:
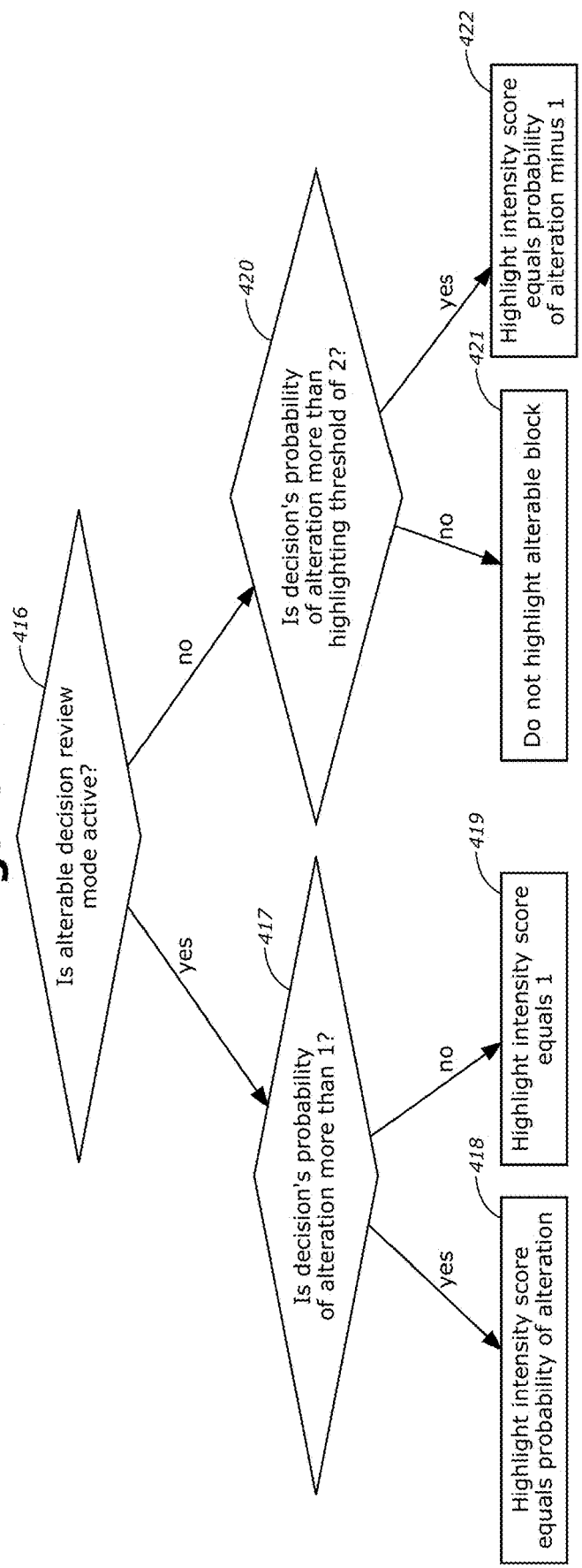
Figure 5:
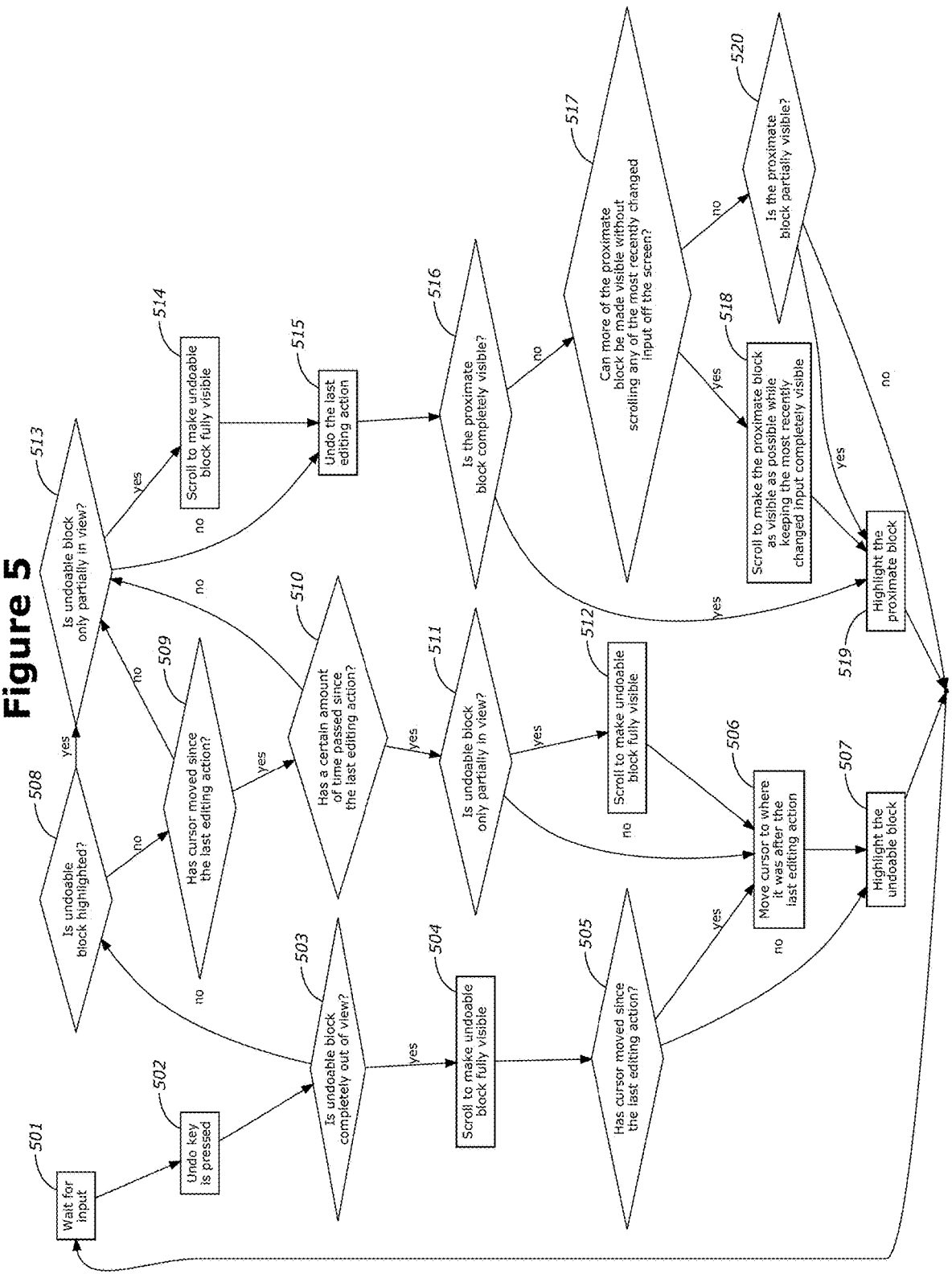
FIG. 5 is a flowchart that illustrates, according to one embodiment, how an interface will react when an Undo key is pressed, with particular attention to how the interface will attempt to make undo changes visible for the user.
Figure 6B:
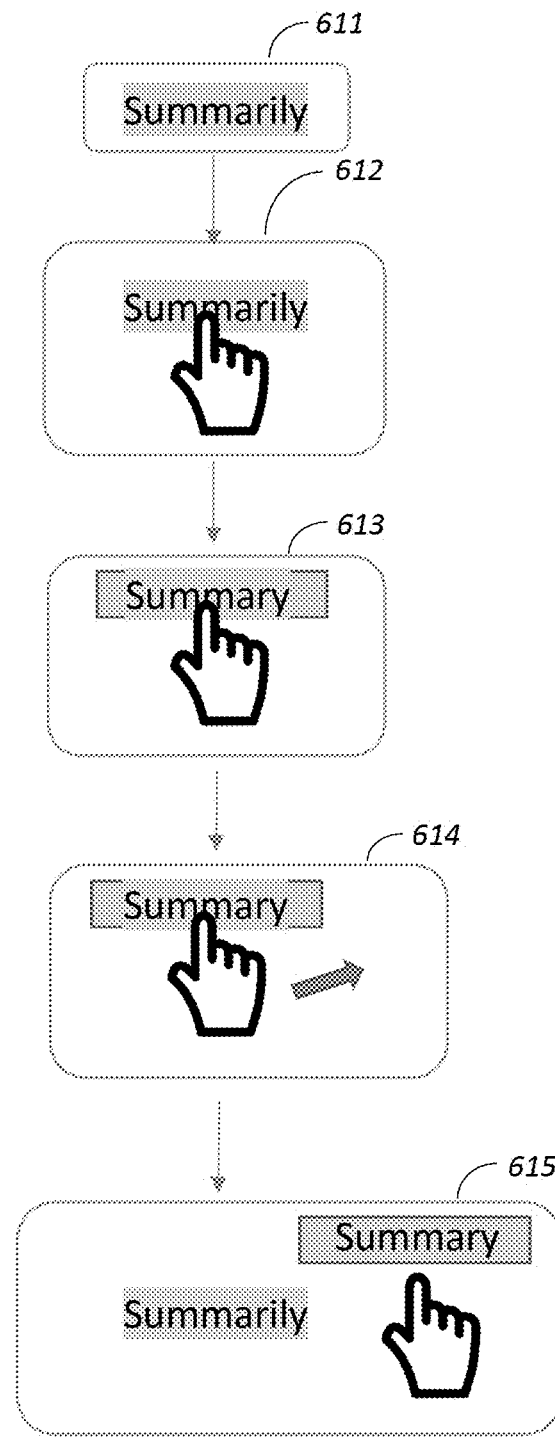
FIG. 6B illustrates an example of touch cancellation.
Figure 7A:
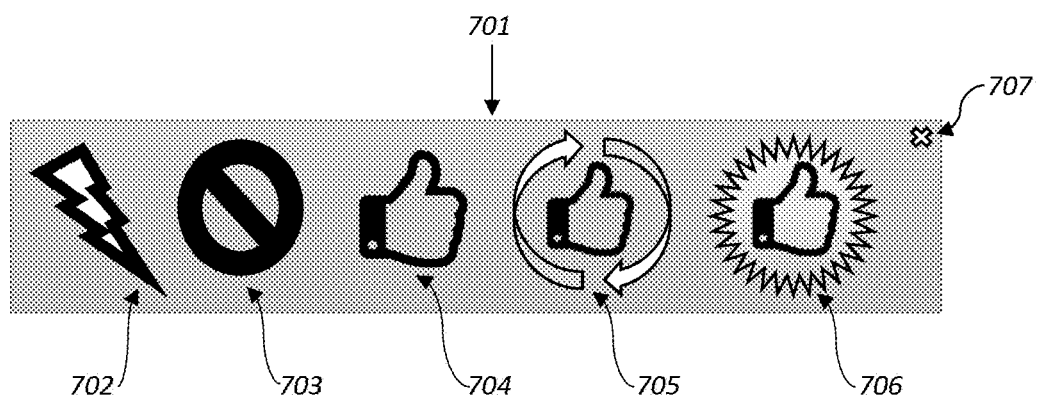
FIG. 7A illustrates an example of an alteration control panel.
Figure 7B:
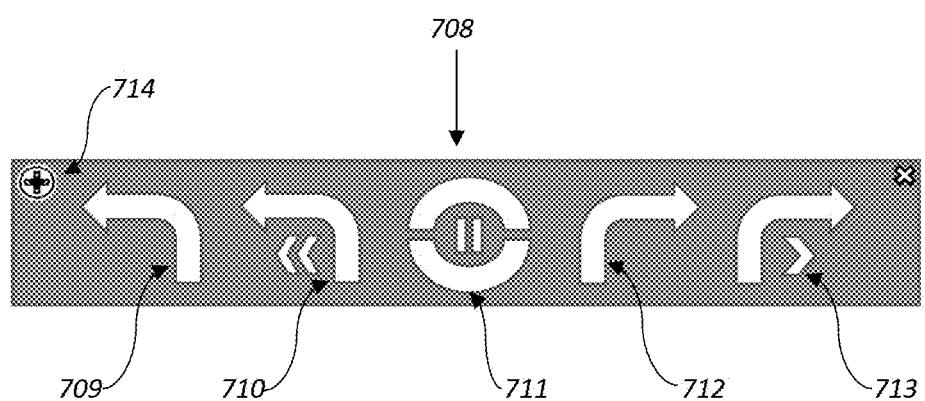
FIG. 7B illustrates an example of an undo control panel.
Figure 8A:
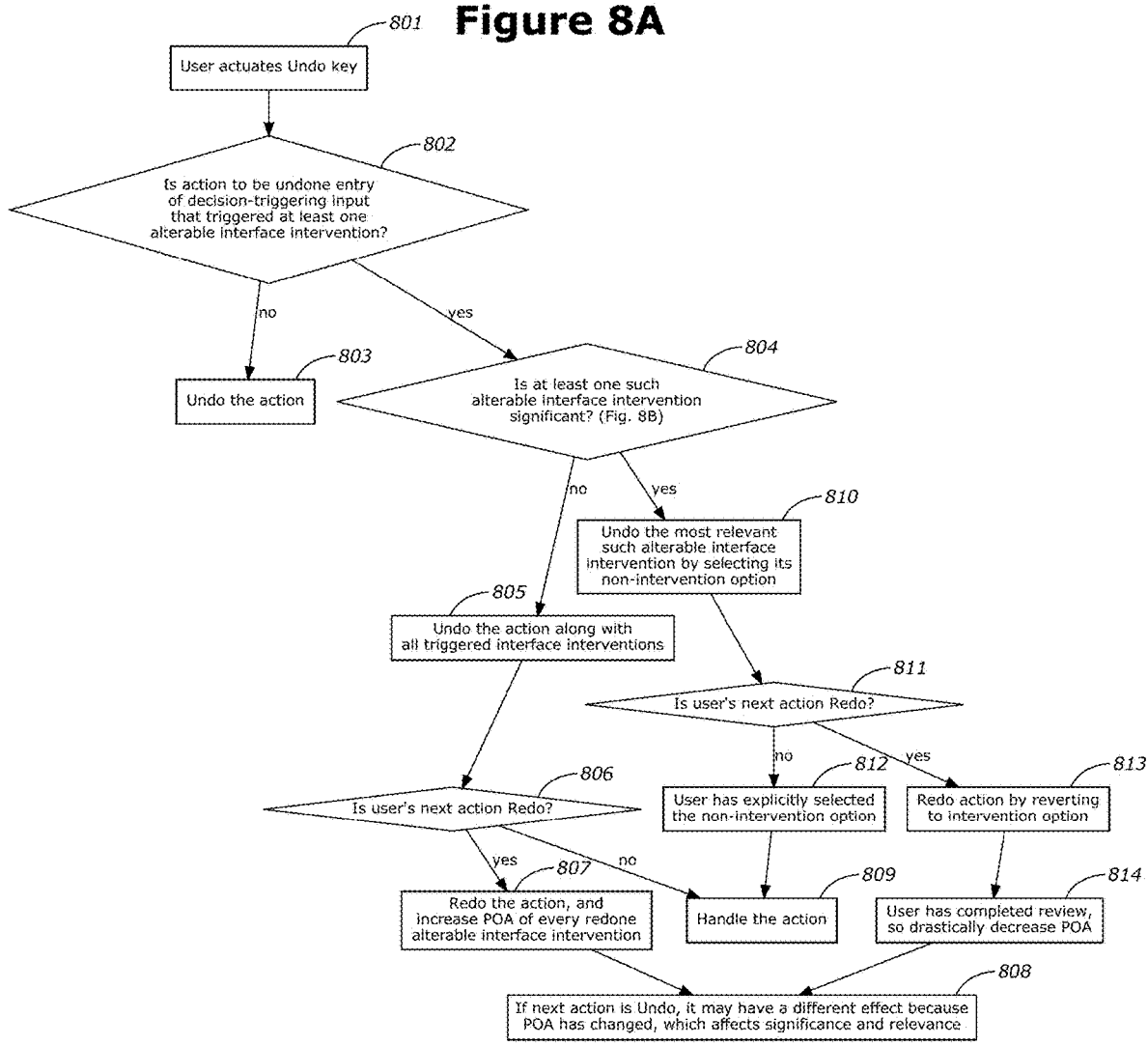
FIG. 8A is a flowchart that illustrates an example method for undo functionality.
Figure 8B:
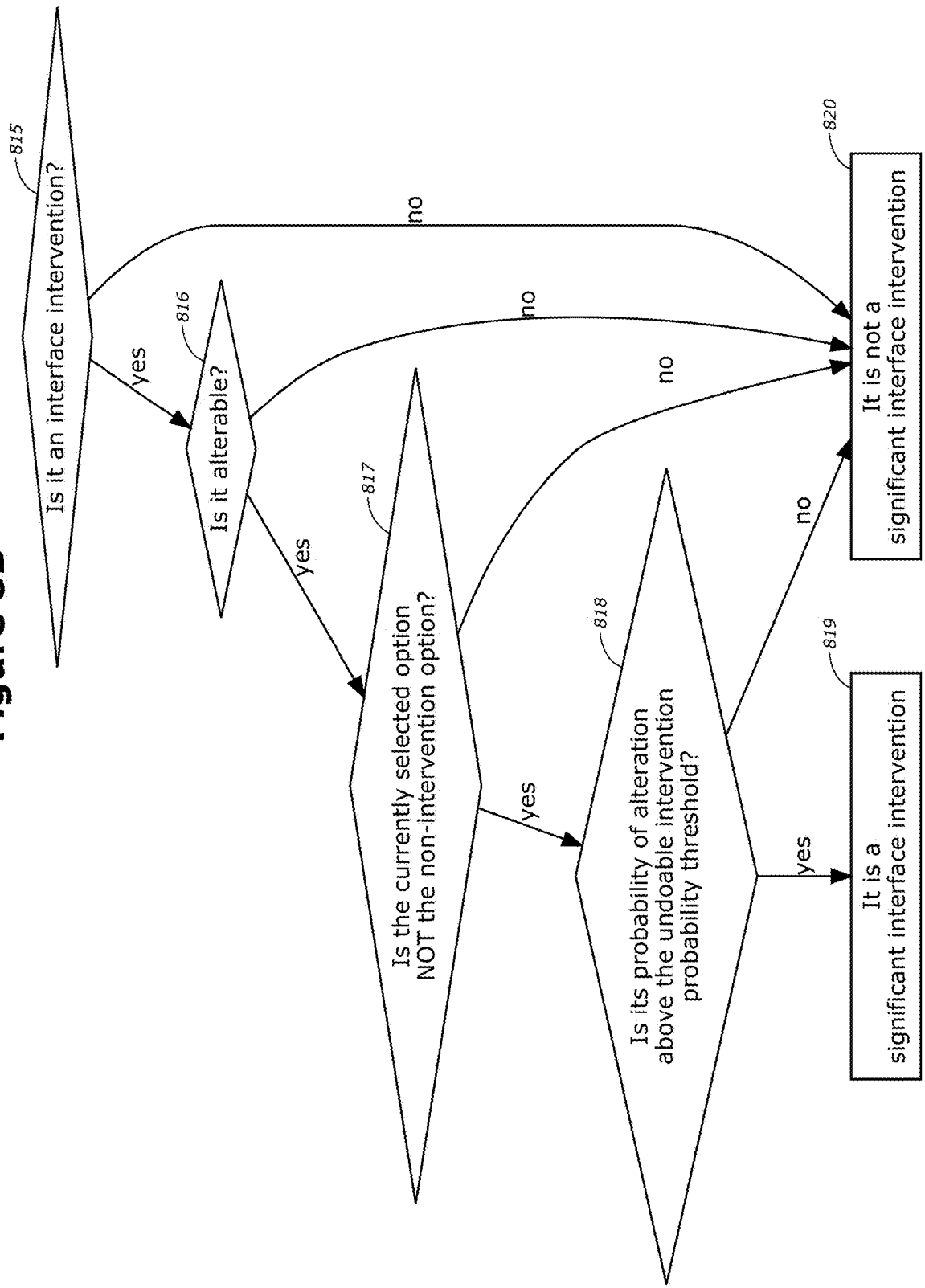
FIG. 8B is a flowchart that illustrates an example decision-making process for determining whether an interface intervention is significant.
Figure 9A:
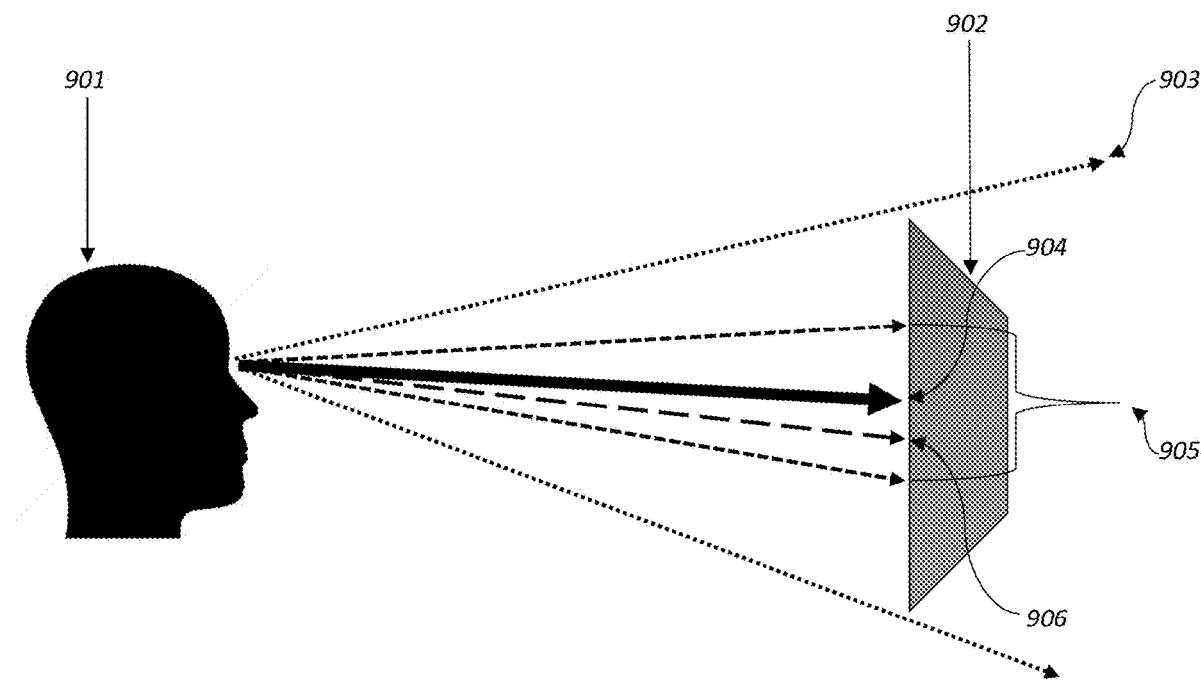
FIG. 9A illustrates a side-view of an interface user who is looking at a display device.
Figure 9B:
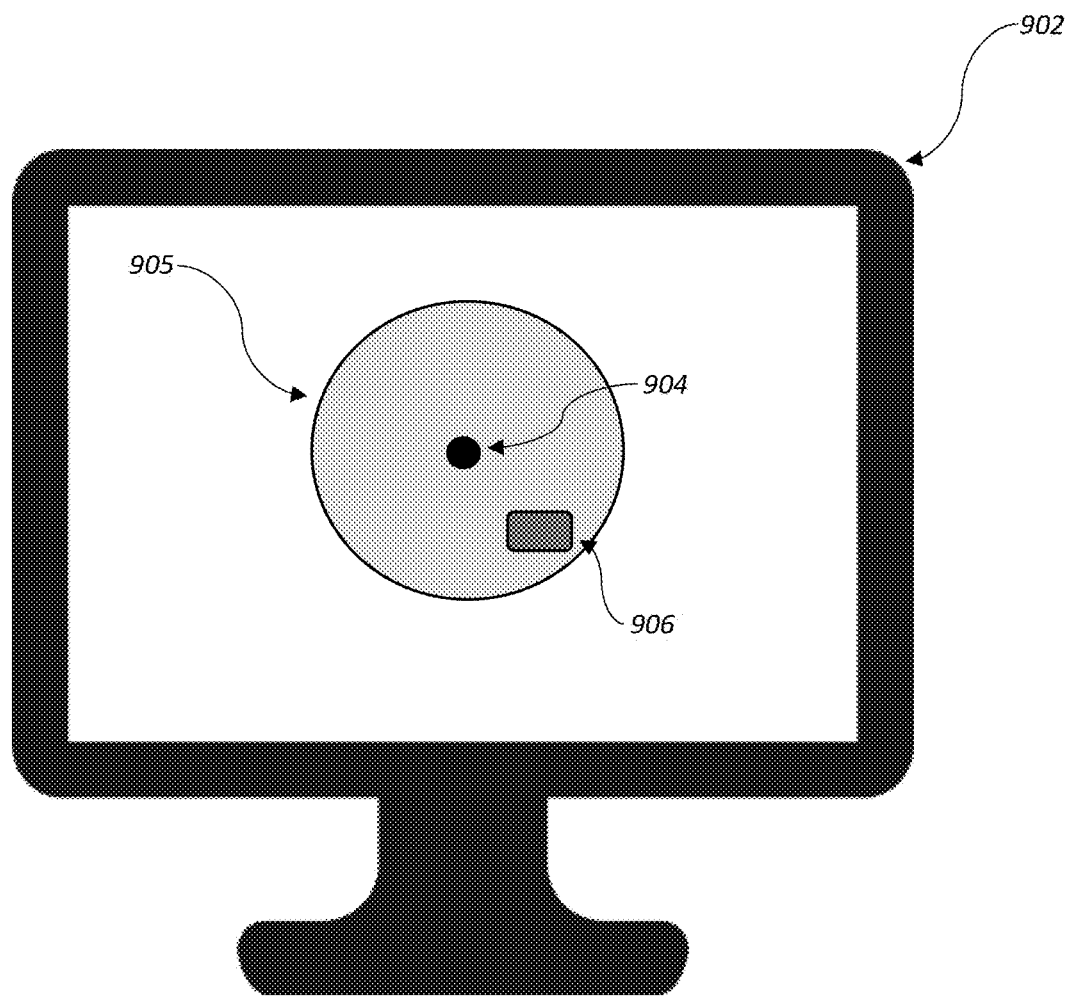
FIG. 9B is a front-facing view of the display device, including the target region and the focal zone centered on the focal location, according to one embodiment.
Figure 10:
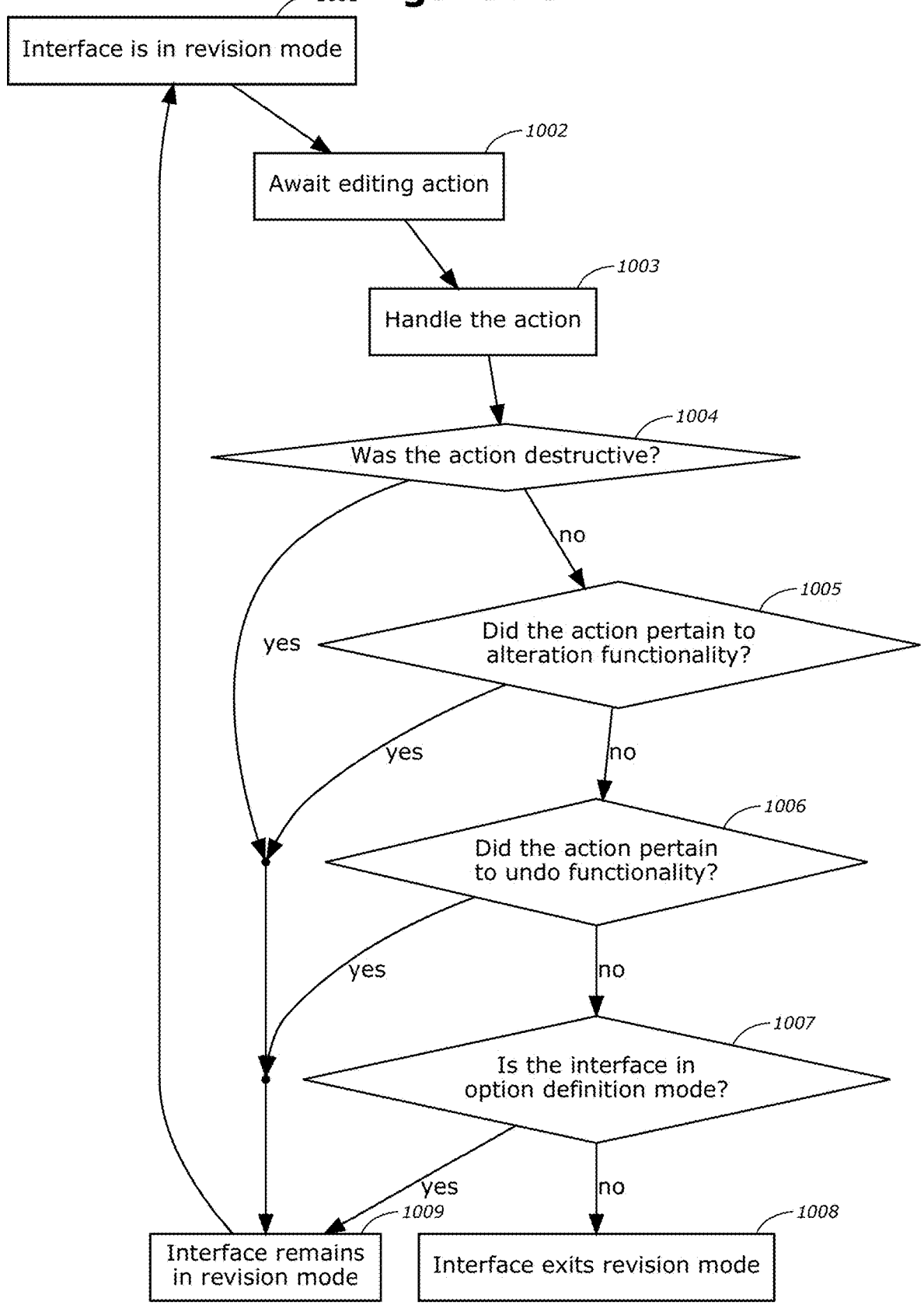
FIG. 10 is a flowchart that illustrates an example method for determining whether an interface remains in revision mode, beginning with the assumption that the interface is in revision mode
Figure 11B:
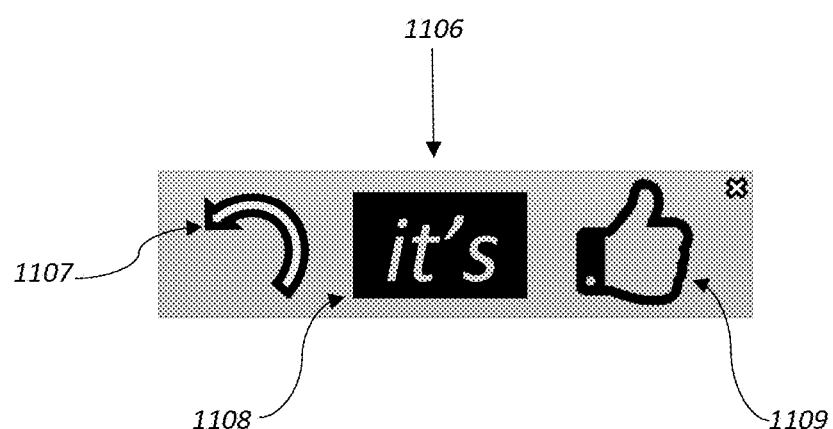
FIG. 11B illustrates an example remote alteration control.
Figure 12A:
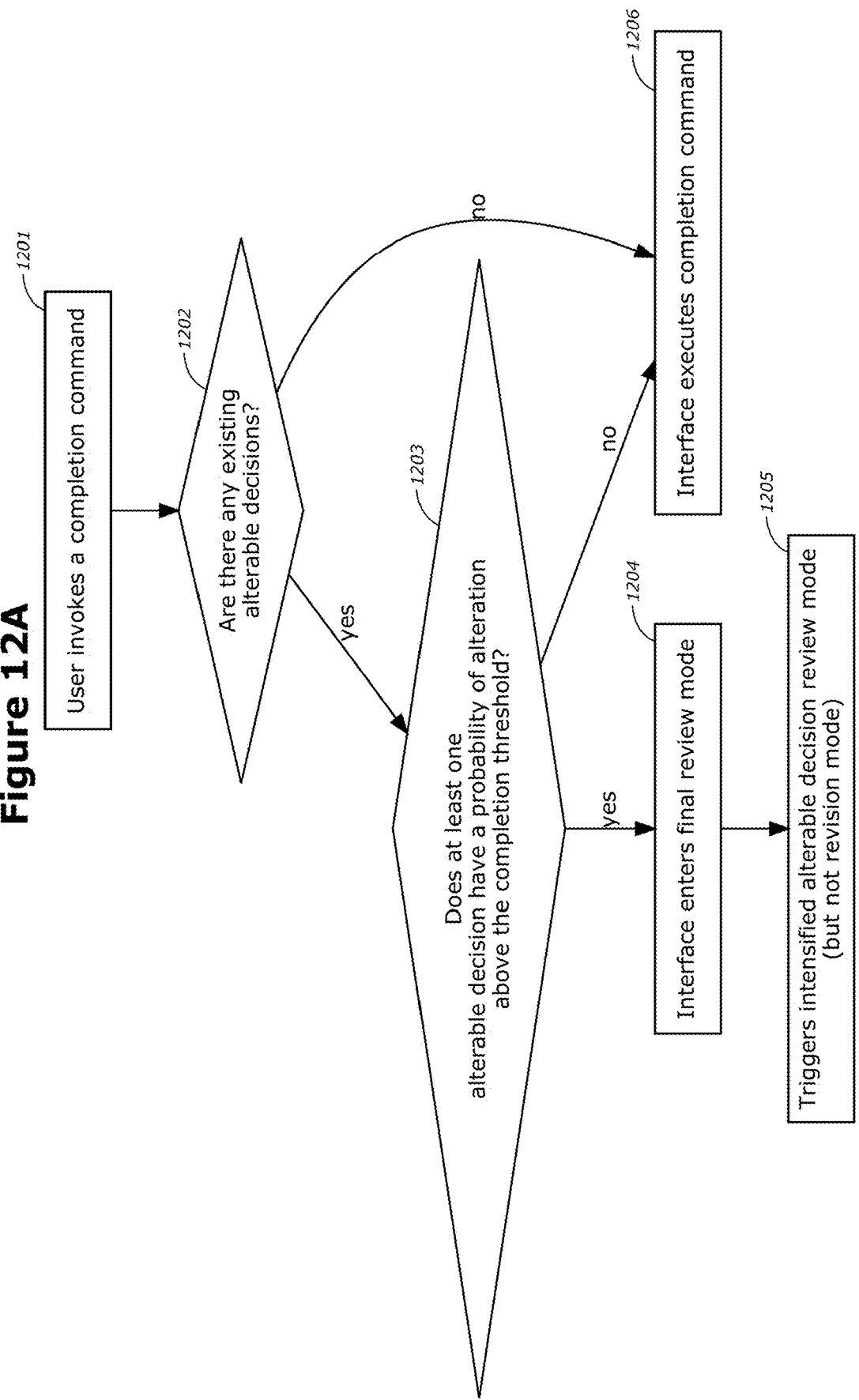
FIG. 12A is a flowchart that illustrates a method for deciding whether the interface enters a final review mode in response to a completion command, according to one embodiment.
Figure 13:
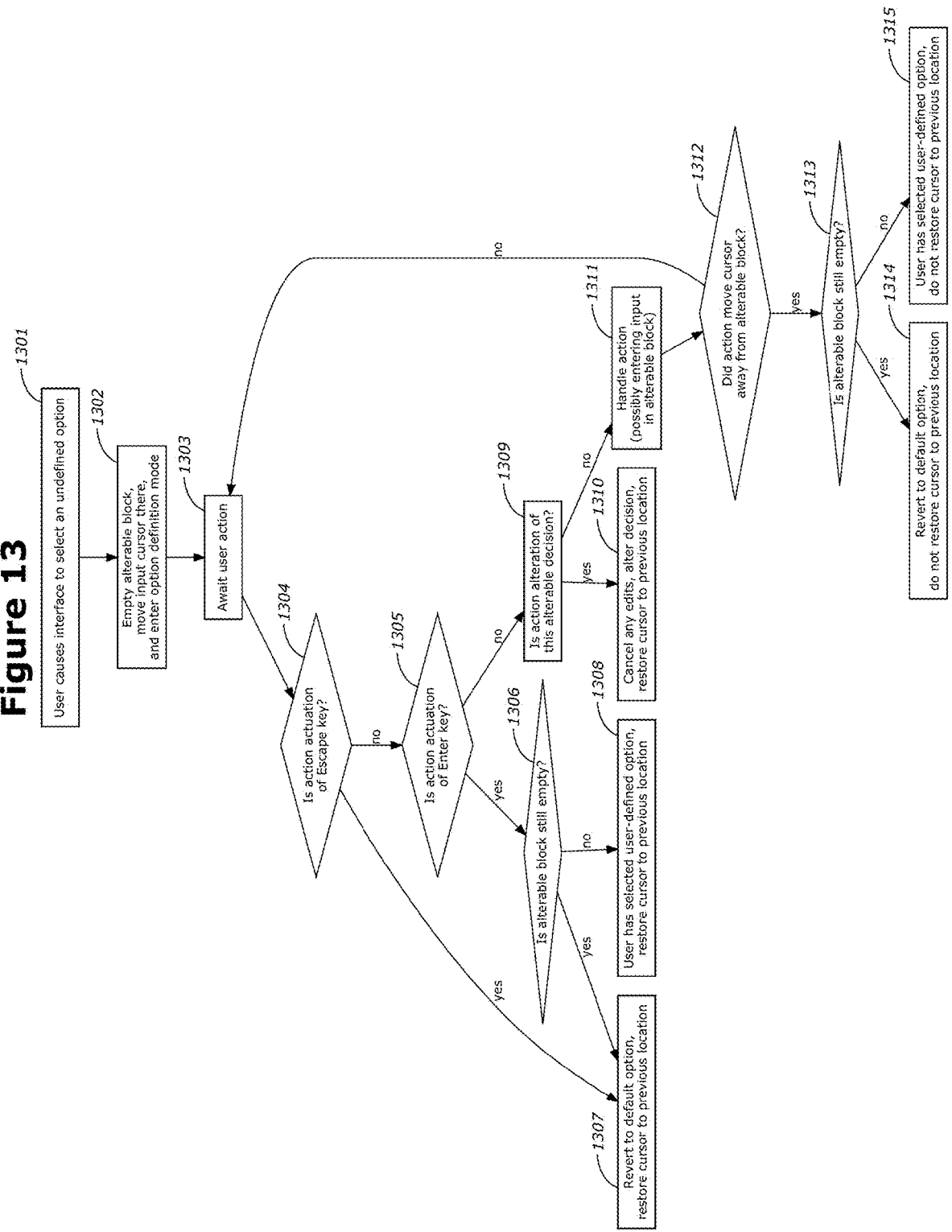
FIG. 13 is a flowchart that illustrates an example method for interface operation while in an option definition mode.
Figure 14B:
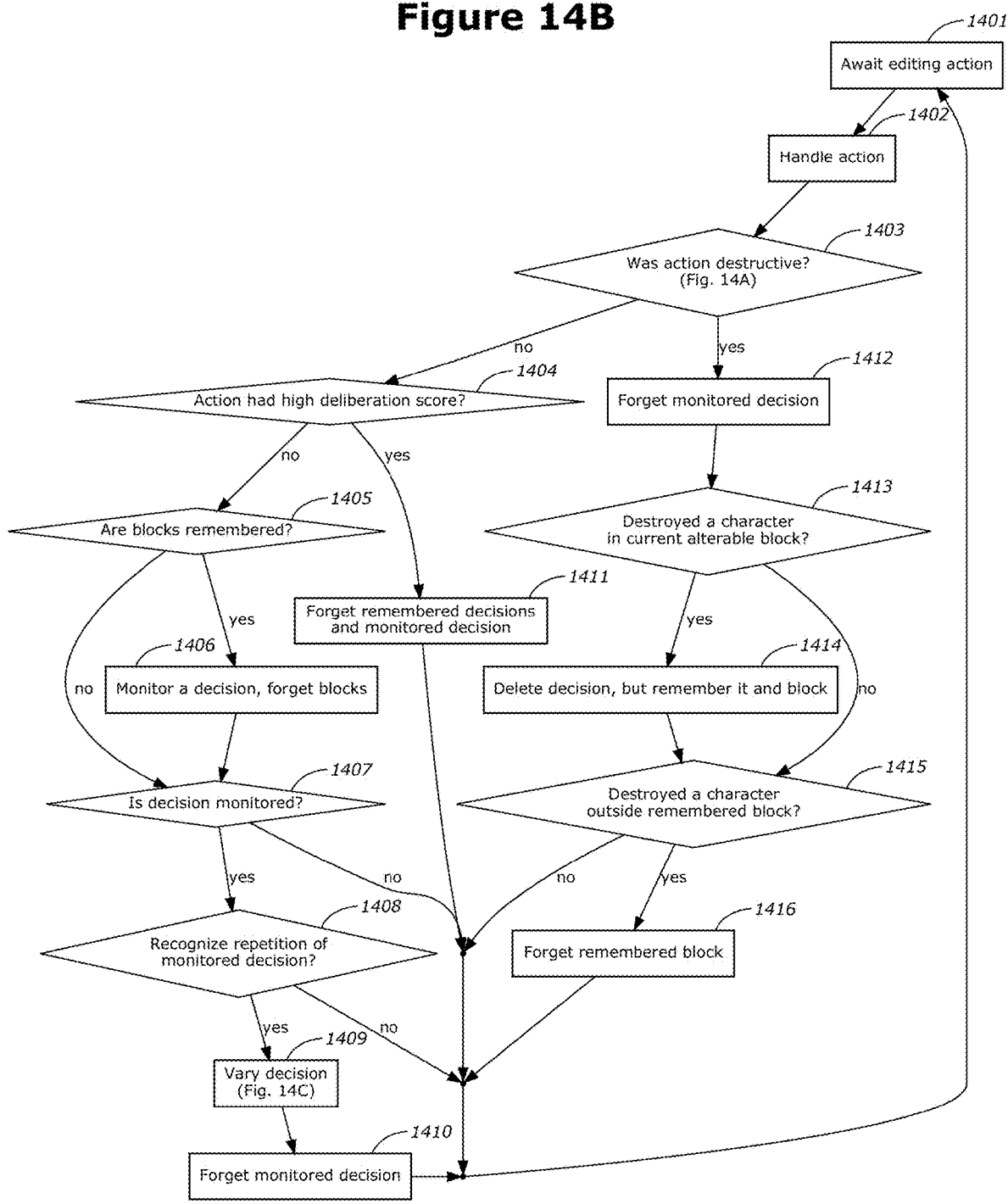
FIG. 14B is a flowchart that illustrates a simplified version of an automatic decision variation feature, according to one embodiment.
Figure 14C:
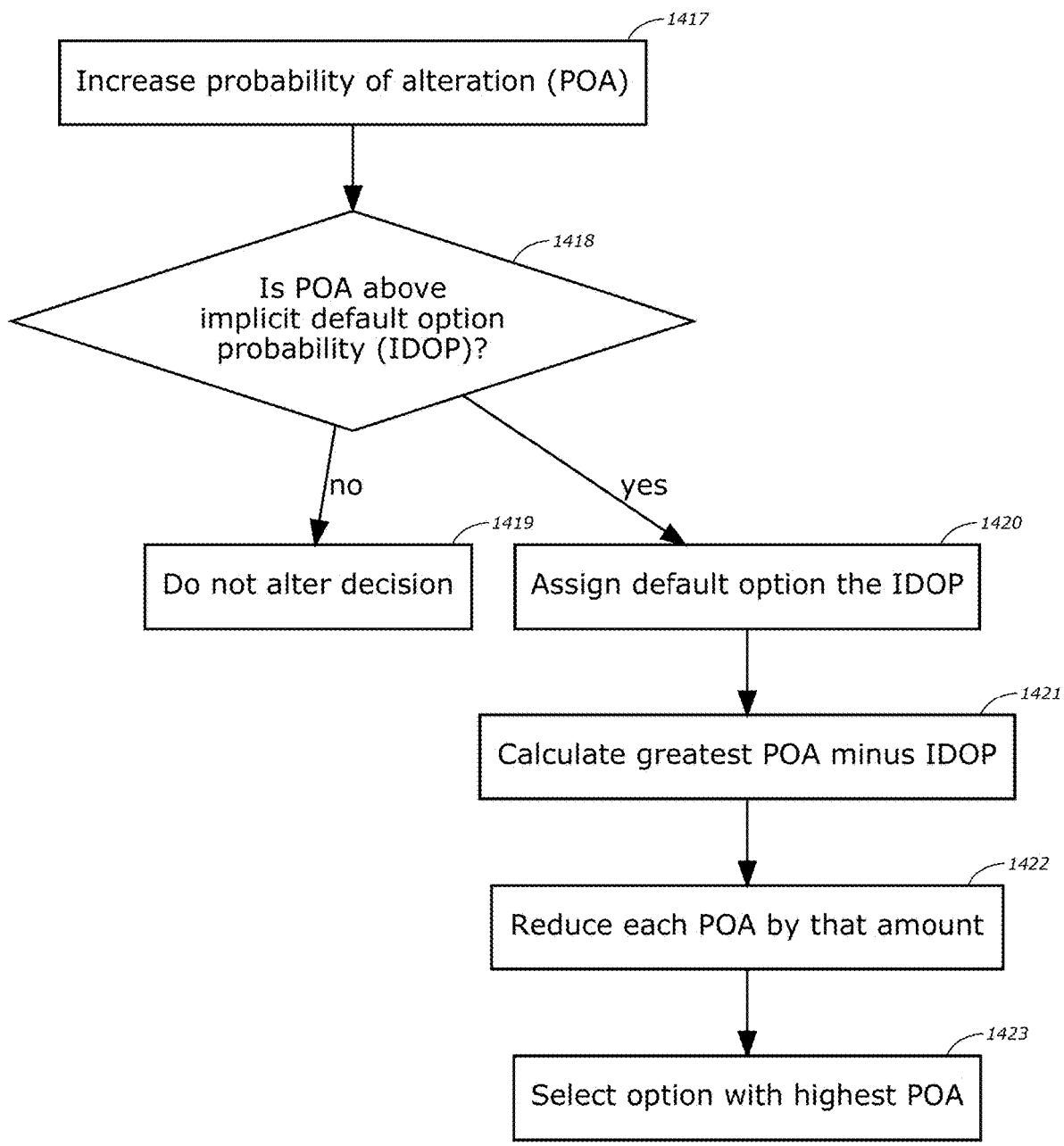
FIG. 14C is a flowchart that illustrates an example method for varying a decision that is identical to a monitored alterable decision.
Figure 15A:
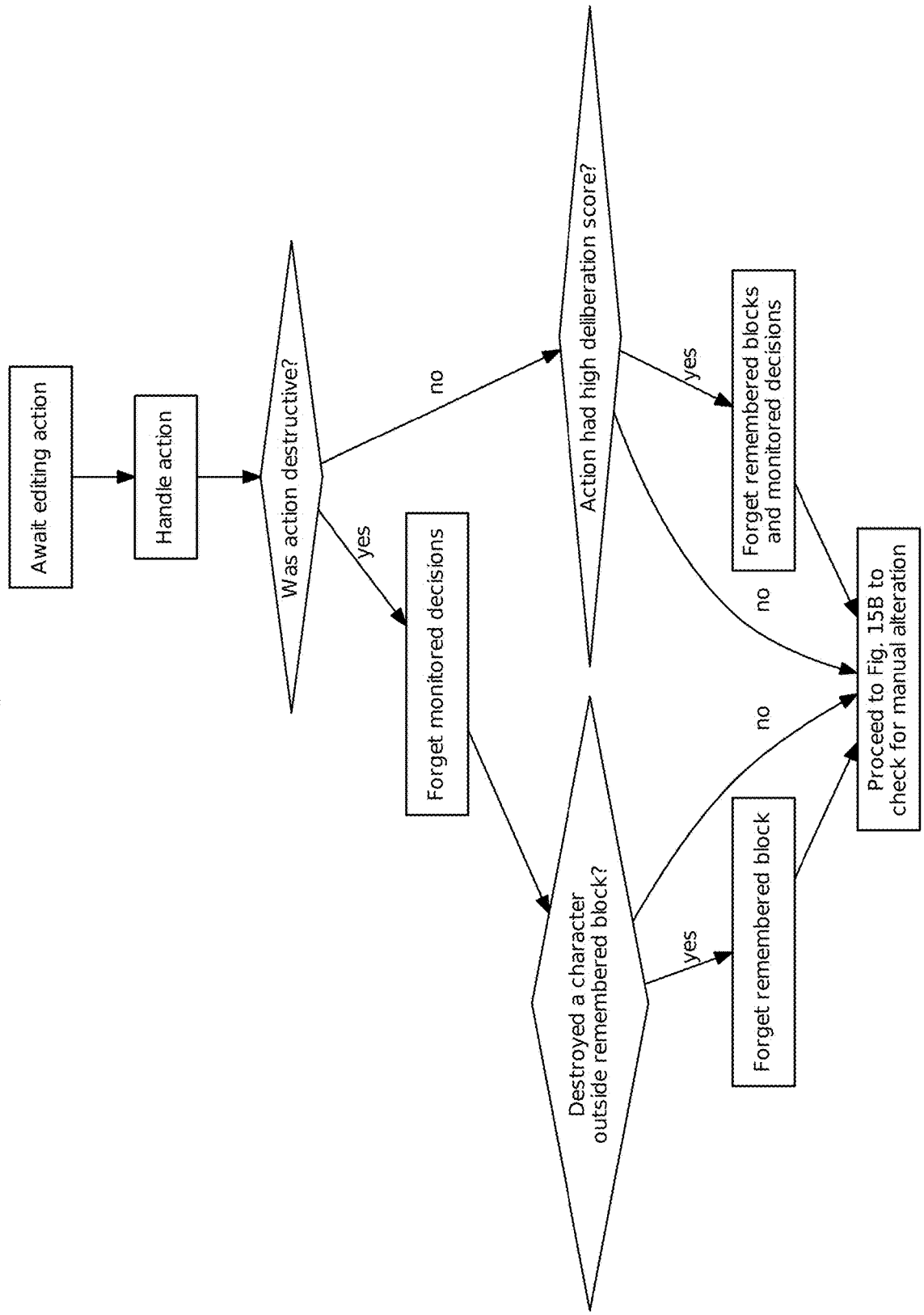
FIGS. 15A and 15B are flowcharts illustrating example methods for a manual alteration detection feature.
Figure 15B:
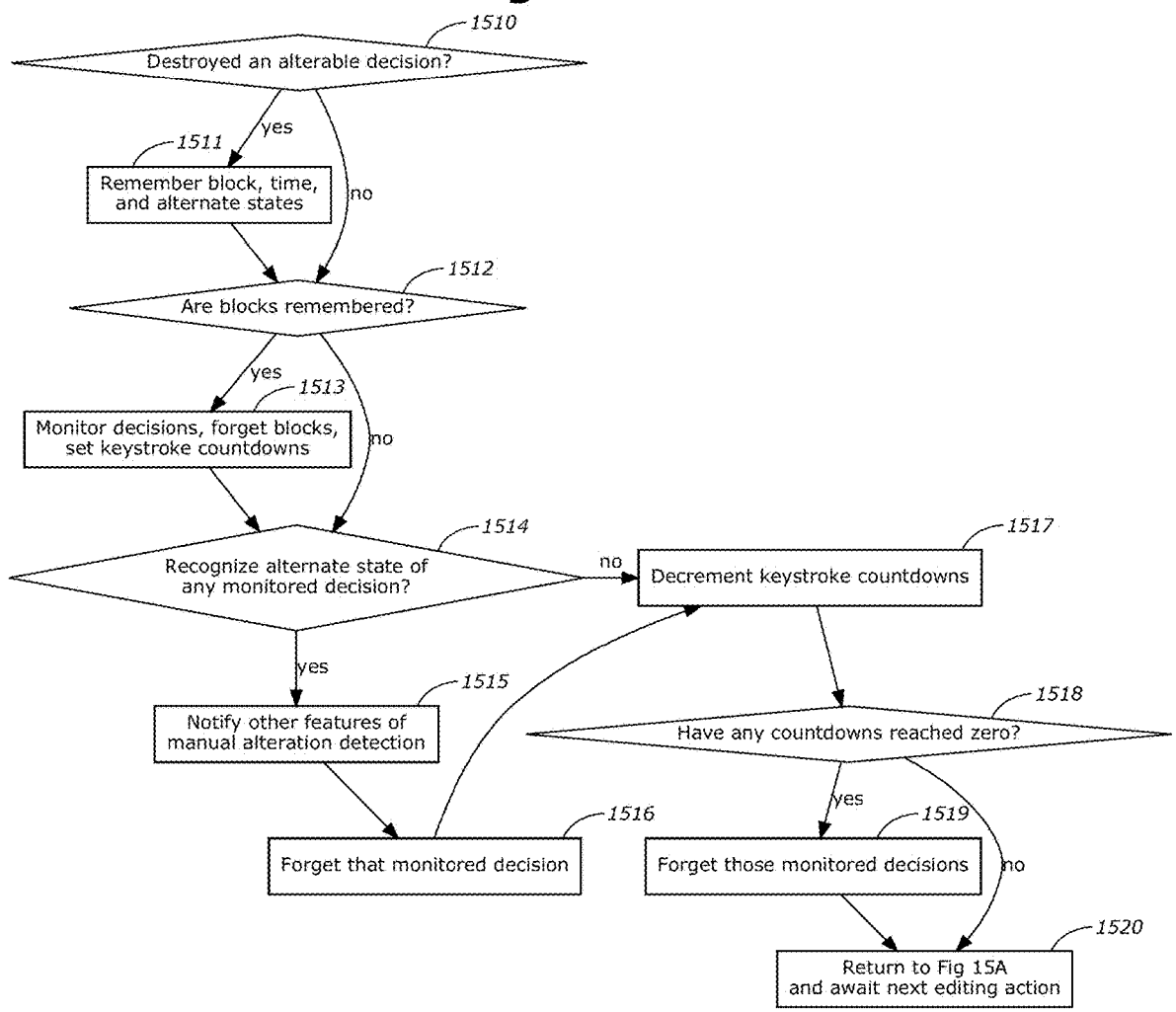
Figure 16:
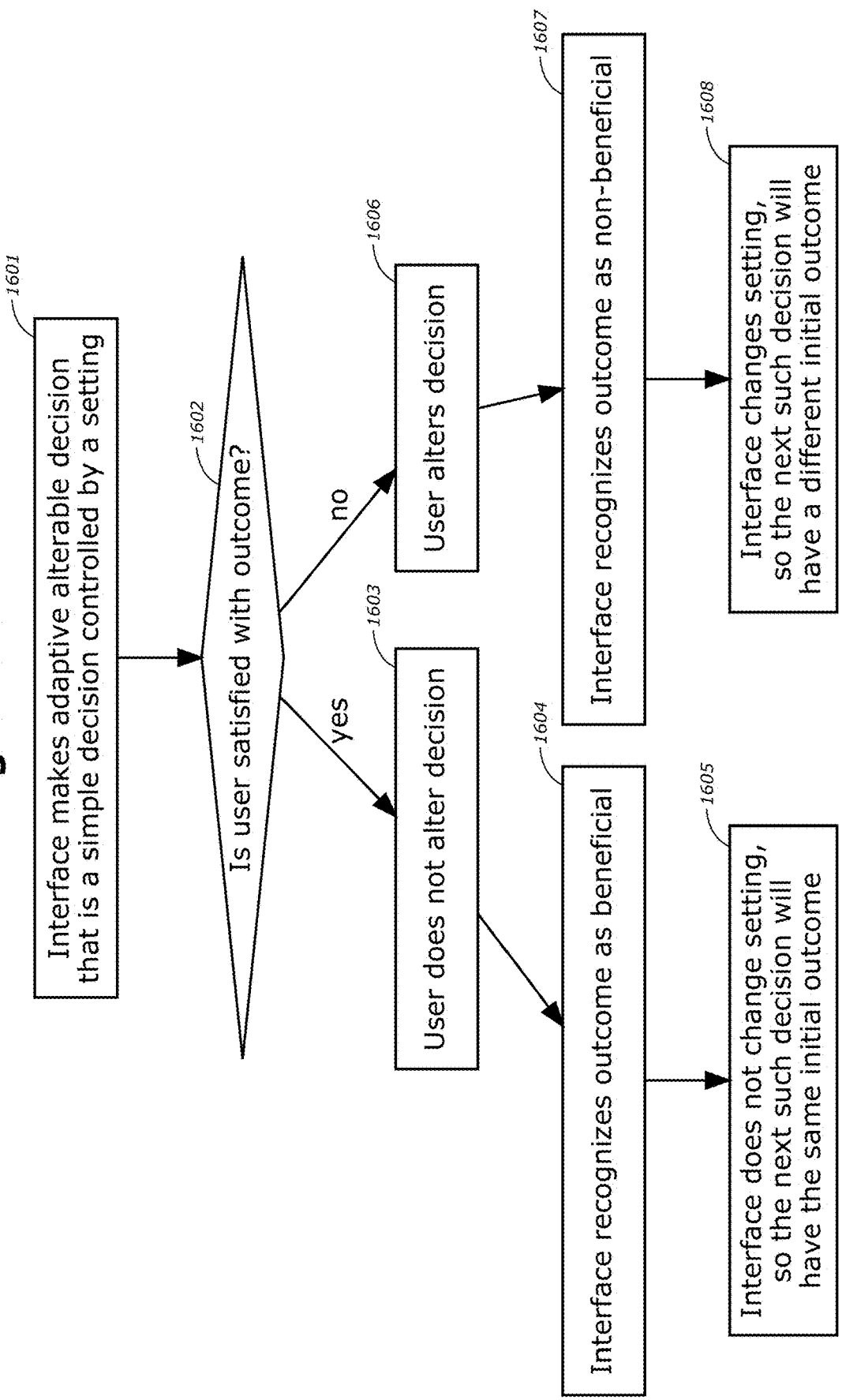
FIG. 16 is a flowchart that illustrates a simple case of an adaptive decision that may affect interface settings, according to one embodiment.
Figure 17:
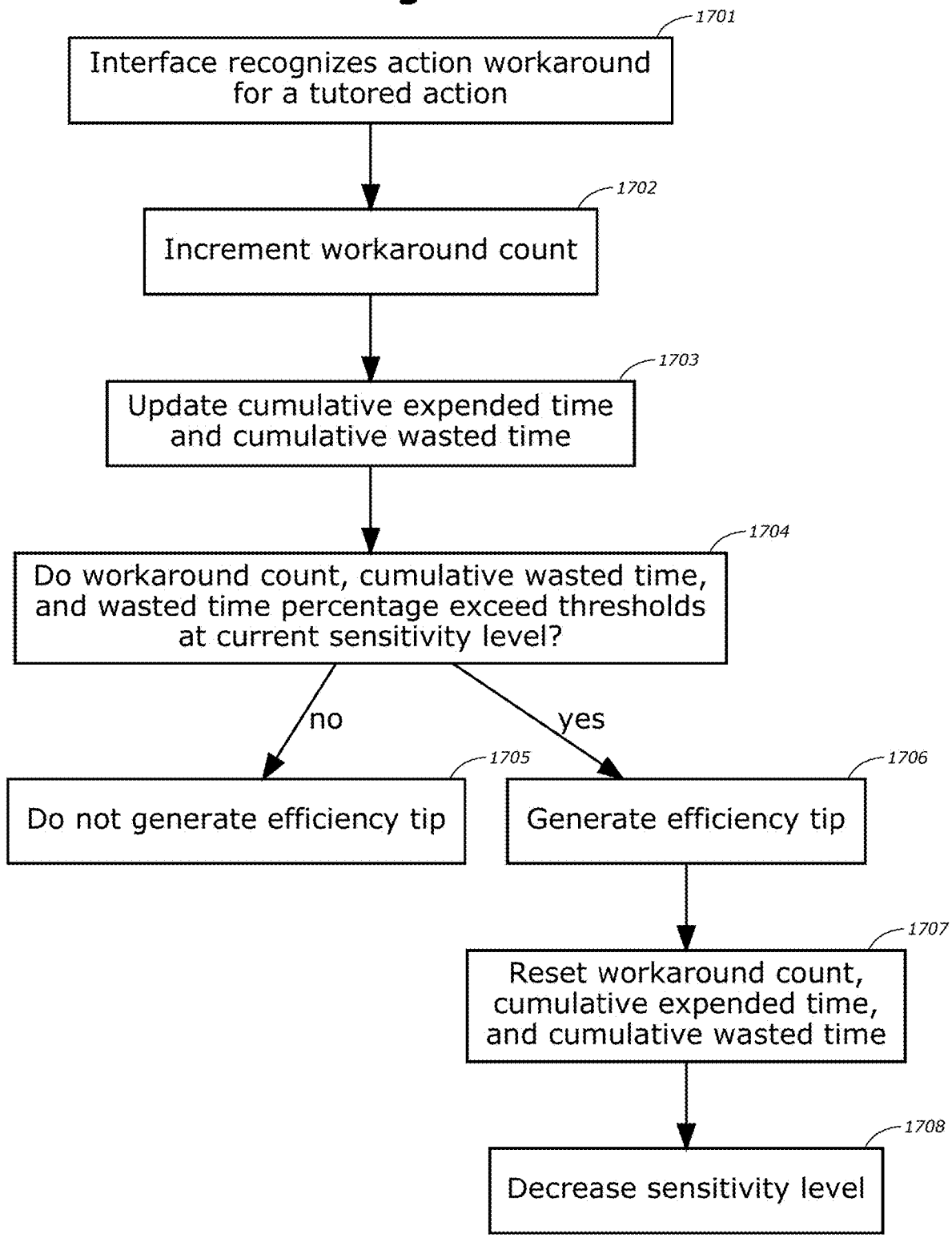
FIG. 17 is a flowchart that illustrates an example process by which an interface decides whether to generate an efficiency tip.
Figure 19B:
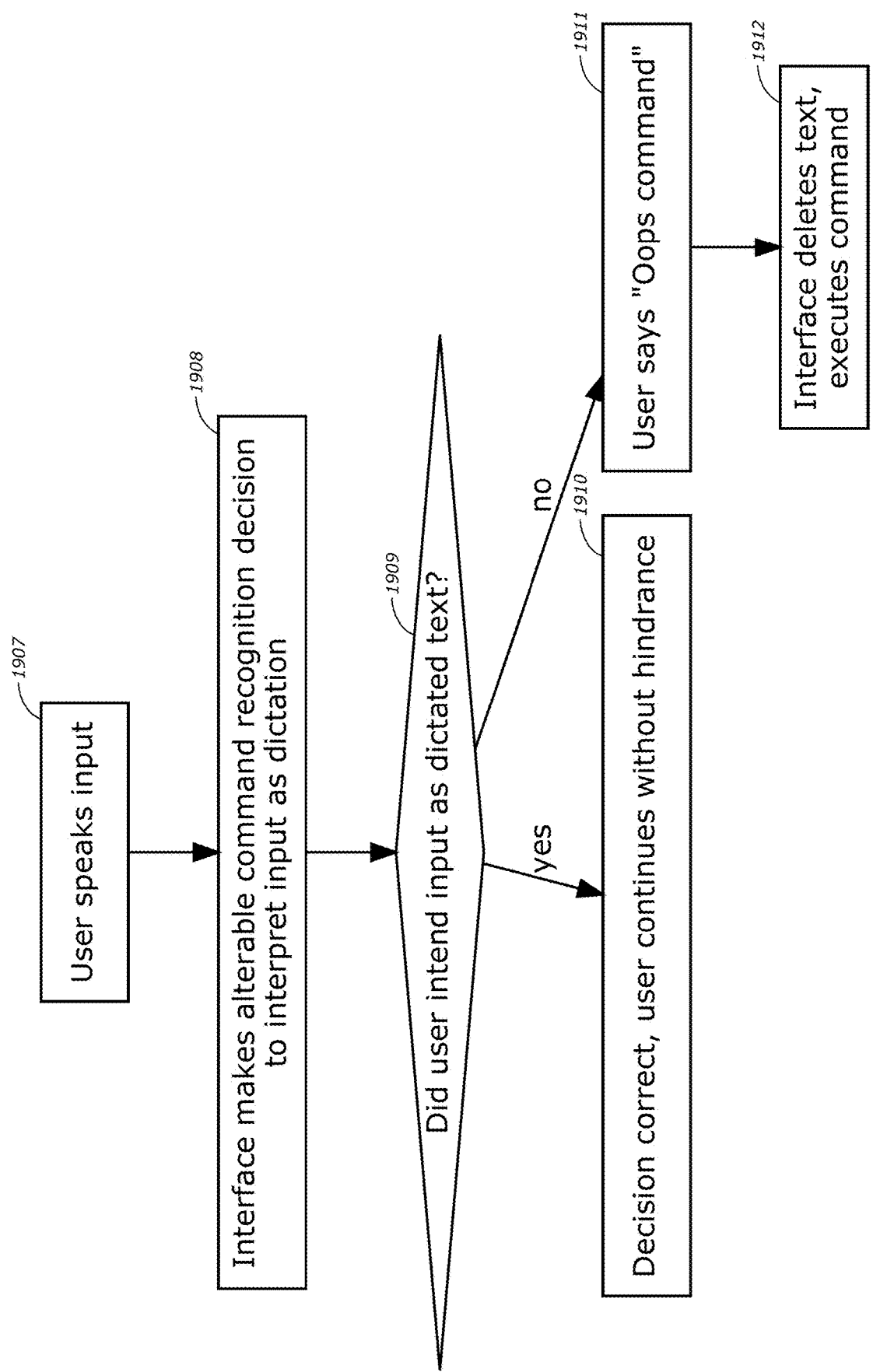
Figure 19C:
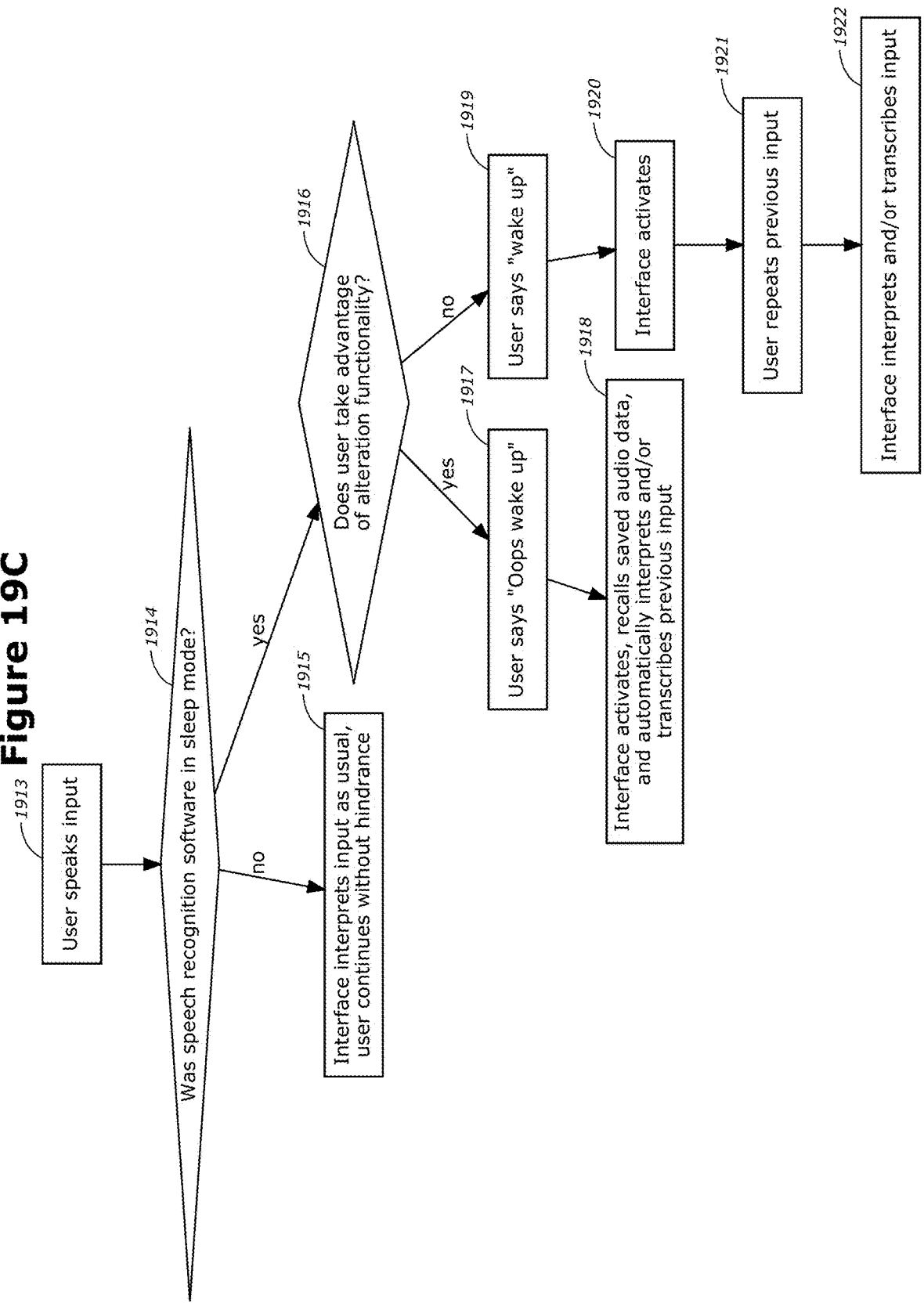
FIG. 19C is a flowchart depicting an example scenario for applying corrective alteration functionality to a mistake that may occur when speech recognition software is in sleep mode.
Figure 20A:
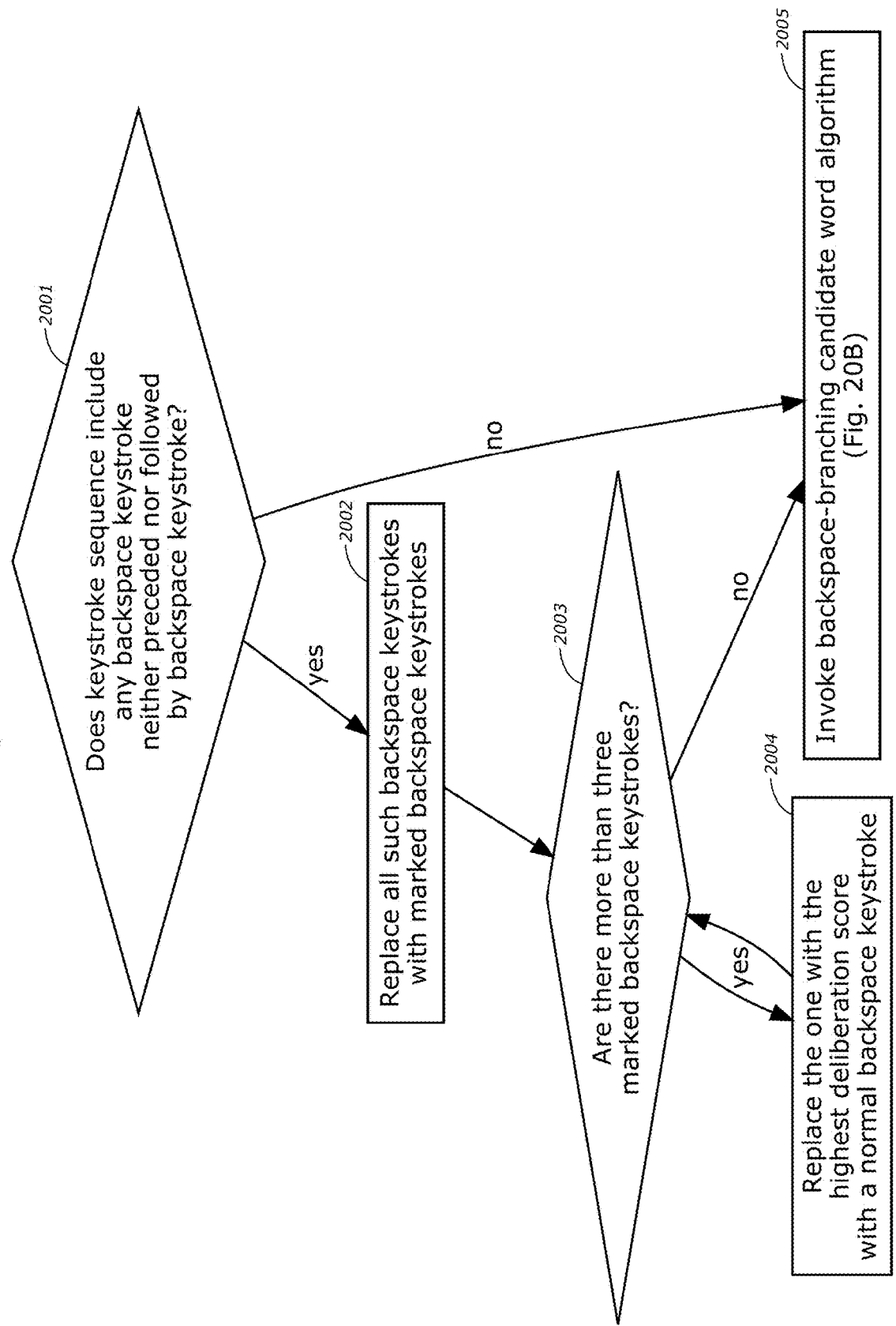
Figure 21A:
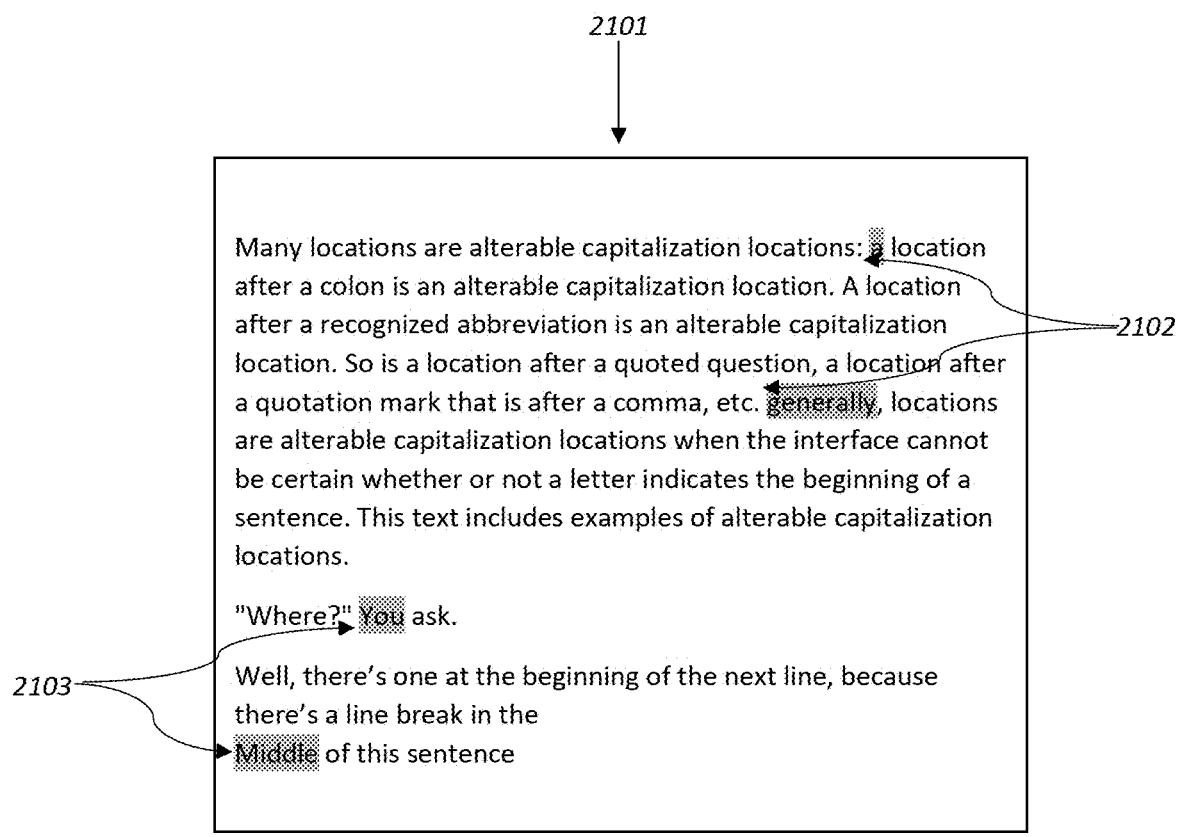
FIG. 21A illustrates features of an alterable capitalization decision.
Figure 21B:
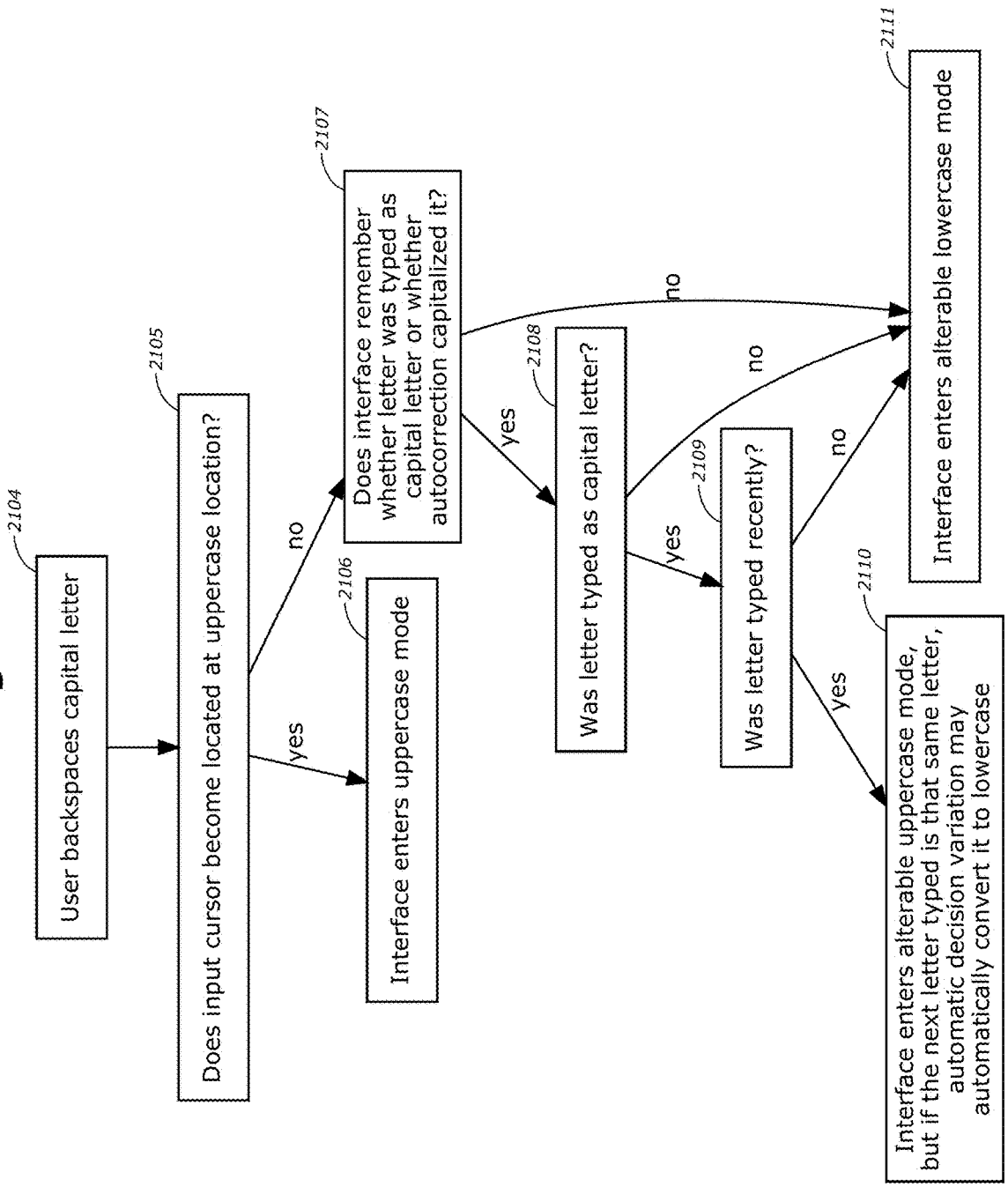
FIG. 21B is a flowchart that illustrates what happens when a user backspaces a capital letter, according to one embodiment.
Figure 22:
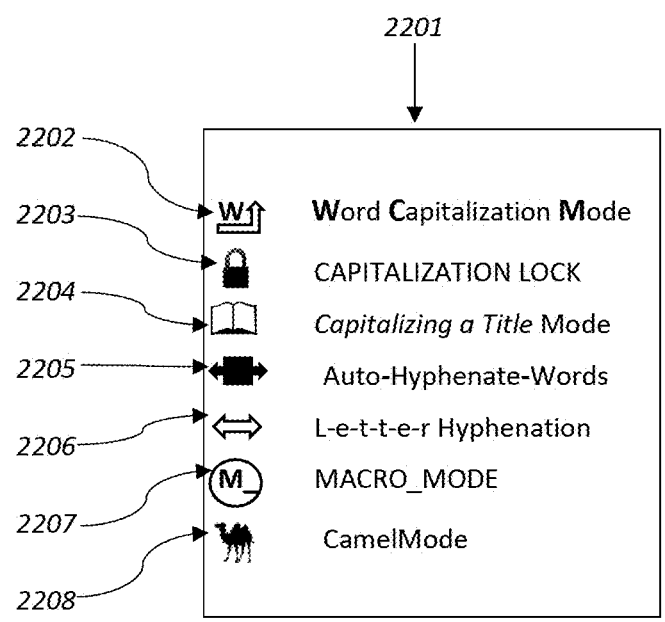
FIG. 22 illustrates an example of a word entry mode menu.

FIG. 6A is a flowchart that illustrates the behavior of an embodiment that has the touch alteration feature as described in the preceding paragraph. Block 601 says, "Interface highlights alterable block (FIG. 4B)" and proceeds to Block 602, which states, "Await user action." From there, the algorithm proceeds to Block 603, which asks, "Did user touch a highlighted alterable block?" If the answer is no, the interface simply handles the user action (Block 608). If the answer is yes, the algorithm proceeds to Block 604, which says, "Select alternate option that has not been previously selected" and then to Block 605, which says, "Await user action." From there, the algorithm proceeds to Block 606, which asks, "Did user touch the same highlighted alterable block again?" If the answer is no, the user has explicitly selected the current option of the alterable decision (Block 607) and the interface handles the action (Block 608). If the answer is yes, the algorithm proceeds to Block 609, which asks, "Have all alternate options been selected?" If the answer is no, the algorithm goes back to Block 604 and selects an alternate option that has not been previously selected and continues through the process as described above. If the answer is yes, the interface reverts the block to the default option, and the user has completed review of the alterable decision (Block 610).

In an alternative embodiment, the touch alteration feature will apply only when a user touches the highlighted alterable block of a highlighted alterable interface decision whose probability of alteration is above a certain threshold. In an embodiment, such a highlighted alterable block will be displayed differently than the highlighted alterable block of a highlighted alterable interface decision whose probability of alteration is below the threshold, so that a user can visually distinguish whether or not the touch alteration feature is applicable to any particular highlighted alterable decision.

In an embodiment, if a user touches a highlighted undoable block, the interface will respond as though the user actuated the Undo key; if a user touches a highlighted redoable block, the interface will respond as though the user actuated the Redo key. In an embodiment, if a user touches a highlighted multi-click block, the interface will respond as though the user actuated the relevant multi-click key again. In an embodiment, if a user touches a highlighted autocorrection block, the interface will perform that pending autocorrection. The interface behaviors described in the present paragraph, along with the touch alteration feature, are collectively referred to herein as "touch change features."

In an embodiment, if a highlighted changeable block contains no input and so the interface highlights a small region around the location of the changeable block in lieu of highlighting the changeable block itself, then touching that region counts as touching the highlighted changeable block for purposes of touch change features.

Touch Change Toggling

In an embodiment, in many cases, after a user touches a highlighted changeable block and thus invokes a touch change feature, a highlighted changeable block will then be present at the location the user just touched, and touching this highlighted changeable block will reverse the effect of the previous touch. For example, after a user touches a highlighted alterable block, in many cases that highlighted alterable block will continue to be present at the same location, and if it is the alterable block of a single-alternative alterable decision then touching the highlighted alterable block again will reverse the effect of the previous touch. After a user touches a highlighted undoable block, in many cases a highlighted redoable block will then be present where the highlighted undoable block previously was (in an embodiment where the redoable block is highlighted after an actuation of the Undo key), and touching the highlighted redoable block will reverse the effect of the previous touch. After a user touches a highlighted autocorrection block, in many cases a highlighted alterable block will then be present where the highlighted autocorrection block previously was (in an embodiment where autocorrections are alterable decisions), and touching the highlighted alterable block will reverse the effect of the previous touch. It may be desirable to enable a user to undo the invocation of a touch change feature by such means in even more cases, as is described in the following two paragraphs.

In an embodiment, after the touch alteration feature causes the interface to alter a particular alterable interface decision so that an alternate option of that decision becomes selected, if within a sufficiently short amount of time the user again touches the same location the user just touched, then the interface will again alter the same decision the interface just altered, even if for some reason that decision's alterable block is no longer at that location. For example, in such an embodiment, if the alteration that is triggered by touching a highlighted alterable block causes the highlighted alterable block to be entirely deleted, then for a short while, it will still be possible for the user to cause that alterable decision to revert to its default option by means of the touch alteration feature. In an embodiment, during this short amount of time in which touching the same location will cause the interface to alter the same decision, that location will be highlighted by some means; for example, that location may be a different color than surrounding input.

In an embodiment, when a user touches a highlighted autocorrection block and the interface performs the pending autocorrection, the resulting interface decision to perform that autocorrection is an alterable decision that is automatically assigned a probability of alteration that is above the highlighting threshold, so that if the user wishes to undo the autocorrection, the user can immediately do so by means of the touch alteration feature described above. However, in an embodiment, after a user touches a highlighted autocorrection block and the interface performs the pending autocorrection, once the user performs another action, if that next action is not an alteration of the alterable decision to perform that autocorrection, then the interface will consider the user to have explicitly selected the default option of that alterable decision, and so the interface will drastically decrease that alterable decision's probability of alteration and it will no longer be highlighted.

In an embodiment, the invocation of touch change features can also be reversed by another means in certain circumstances, as is described in the specification, in the explanation of side-sliding changes.

Word Replacement Improvements

Making Word Replacement Decisions Alterable

In the present specification, when the interface has used a candidate word algorithm to find candidate words that may serve as replacements for a word the user typed and the interface then makes its decision whether or not to replace the word the user typed with a different word, such a decision is a "word replacement decision."

In an embodiment, when the interface makes a word replacement decision that has more than one viable alternative, that decision is an alterable interface decision. Such a decision will be referred to herein as an "alterable word replacement decision," and also constitutes an "alterable autocorrection decision."

In an embodiment, an alterable word replacement decision will include one alternate option for each candidate word that was not selected as a replacement for the input word, along with an alternate option corresponding to the input word itself if the input word was replaced. In an embodiment, as an exception, if the number of candidate words is greater than a certain maximum amount (such as, in an embodiment, five), then the alterable word replacement decision will include only that maximum amount of alternate options, with the candidate words that have the highest suitability scores serving as alternate options. In an embodiment, an alterable word replacement decision will always include an option corresponding to the unmodified input word itself, so that whenever autocorrection functionality does cause the interface to replace a word the user typed, it will always be possible for the user to undo the effect of the autocorrection functionality by means of alteration functionality.

In an embodiment, each alternate option of an alterable word replacement decision will be assigned a probability of alteration that is reflective of the approximate probability that a user will wish to select that alternate option relative to the probability that the user will be satisfied with the default option, insofar as the interface is able to determine such a probability. Those of ordinary skill in the art will be able to understand various ways to implement such behavior with respect to any particular candidate word algorithm. For example, in an embodiment, if the candidate word for a particular alternate option has a suitability score that is at least 90% as much as the candidate word that is selected as the default option, then that particular alternate option will be assigned a very high probability of alteration.

In an embodiment, if autocorrection functionality ever replaces a word that is not the most recent word the user typed (such as because the most recent word provided relevant context that caused the autocorrection functionality to reconsider a previous decision it made), that particular alterable word replacement decision will be assigned a very high probability of alteration. For example, in an embodiment, if a user types "sotto" and autocorrection functionality converts this to "ditto" and then the user types "voce" and so autocorrection functionality converts "ditto" back to "sotto," then at this point, the alterable decision regarding "sotto" will have a very high probability of alteration.

In an embodiment, when a user deletes the alterable block of a word replacement decision, it will not become a remembered alterable block for purposes of the automatic decision variation feature: instead, autocorrection functionality itself will be configured in such a way that if a user deletes a single word and then quickly retypes it by means of the exact same keystroke sequence as before, the interface will be biased against choosing the same outcome for the resulting alterable word replacement decision that it chose the previous time. Such behavior of autocorrection functionality is described below, in the explanation of a "retyping-sensitive candidate word algorithm."

Other Autocorrection Improvements

Alterable Autoformatting Decisions

In the present specification, any decision whether or not to perform an autocorrection or automatic formatting action may be referred to as an "autocorrection decision." Generally, a "word replacement decision" is an autocorrection decision regarding whether or not to replace a word with a different word, and an "autoformatting decision" is an autocorrection decision that is not a word replacement decision.

Various types of autoformatting decisions are known to those of ordinary skill in the art. Generally, for any type of autoformatting decision, in the relevant circumstances where such an autoformatting decision may occur, a typical prior art interface will decide whether or not to perform the autocorrection or automatic formatting action based on whether or not the relevant setting is selected in an options menu somewhere. For example, in a prior art interface, when a user types "tuesday" and presses the space bar, the interface will automatically convert the first letter to lowercase if and only if the checkbox next to "Capitalize days of the week" is checked in a menu of AutoCorrect options.

In an embodiment of the present invention, when the interface decides whether or not to perform an autocorrection, the decision is an alterable decision. In an embodiment where pending autocorrections are highlighted differently than alterable blocks, it is thus possible for example that the word "tuesday" is highlighted as a pending autocorrection before a user presses the space bar, and then is automatically capitalized when the user presses the space bar, and is highlighted as an alterable block afterward.

Text Formatting Improvements

Text Formatting

Various interfaces allow users to input formatted text. In various interfaces, a text format may be composed of multiple distinct format elements that may vary independently, including foreground color, background color, underlining status, and so forth. In the present specification, a "format attribute" is a component of a format that may vary, such as foreground color, and a "format value" is one specific possibility for a format attribute, such as blue foreground color. In the present specification, the "active format" is the format that an interface will apply to the next character a user types if the user's next action is typing a character. A "format" is a set of all format values for all relevant format attributes; for example, a format may consist of the Times New Roman font, black foreground color, white background color, non-underlined, etc.

In prior art, interfaces that allow input of formatted text generally do not require a user to individually specify the format for each character the user types. Instead, a user can specify a particular format and then type any number of characters in that format before specifying a different format. Text formatting is thus contextual data as defined in the specification. Most prior art interfaces that allow users to input formatted text are somewhat similar: for example, the interface of the desktop computer word processing application Microsoft Word generally behaves as described in the following paragraph, and so does the interface of the web page editor for the web-based application WordPress. (As an exception, as far as the present writer can discern, the "Text Highlight Color" toolbar button of Microsoft Word seems to behave in a way that is inconsistent with what is described below; the present writer has not figured out how that toolbar button works.)

In various prior art interfaces, when a user backspaces a character, the active format becomes the format that character had; that is, in various interfaces, by default, if a user backspaces a character and then types a character, the new character's font, size, foreground and background color, bold status, italic status, and so forth will match the character that was backspaced. When a user moves the input cursor to a new location that is not at the beginning of a line of input, the active format becomes the format of the character to the left of the input cursor. When a user moves the input cursor to a new location that is at the beginning of a line of input that is not empty, the active format becomes the format of the character to the right of the input cursor.

In WordPress, if a user presses Enter when the input cursor is at the end of a line of input, then WordPress reverts the active format to the default format (as well as inserting a line break). The present writer has done some experimentation to try to determine how Microsoft Word determines the active format when a user moves the input cursor to a new location that is at the beginning of an empty line of input, but has not succeeded at figuring it out. (In fact, on several occasions the present writer has thought that he had deleted all text of a certain format from a document in Microsoft Word, but later when he typed new text at the beginning of an empty line of input where the deleted text had been, that previously used format was applied to the new text, contrary to his wishes.)

In various interfaces, a user can perform formatting actions by various means; for example, in both Microsoft Word and WordPress, a user can toggle italic status by clicking a toolbar button. If a region of text is selected when a user performs a formatting action, the formatting action is applied to the selected region and to the active format. (As an exception, if for example one character of the selected region is italic and another character is not, toggling italic status of the selected region will cause the entire region to be italic or cause the entire region to be non-italic, rather than individually toggling each character.) If no text is selected when a user performs a formatting action, if the input cursor is in the middle of a word, the formatting action is applied to that word and to the active format. If no text is selected when a user performs a formatting action and the input cursor is not in the middle of a word, then the formatting action is applied only to the active format. For example, when the last character of a document is italic, if a user moves the input cursor to the end of the document and then types a character, the new character will by default be italic; if instead the user moves the input cursor to the end of the document, clicks a toolbar button to toggle italic status, and then types a character, the new character will not be italic.

In an embodiment of the present invention, in various circumstances the interface will make it easier for users to cause text to have a desired format. In particular, in an embodiment, when a user has caused text to have a format that is not the format the user desired, the interface may make it easier to recover from such a mistake. Such interface behavior is described in detail below.

Blank Characters in an embodiment, for purposes of the interface behaviors described below, a "blank character" is a space character or tab character or any other character that does not correspond to a visible mark when rendered and does not pertain to a line break. In an embodiment, whenever an interface is showing formatting marks so that a space character or tab character corresponds to a visible mark when rendered, the space character or tab character does not constitute a blank character.

In an embodiment, a "background attribute" is a format attribute such that various format values of that format attribute can be distinguished even when the format attribute is only applied to blank characters. For example, underlining status is a background attribute, because a user can visually distinguish whether or not a space character is underlined. A "foreground attribute" is a format attribute that is not a background attribute, such as bold status.

In an embodiment, the formats of two characters are considered to "match" if the two characters have the exact same format, or if at least one of the characters is a blank character and the formats of the two characters have the same format values for every background attribute, whether or not they have the same format values for every foreground attribute. For example, if one space character is in a normal font and another space character is in a bold font that is otherwise identical, then their formats match. In an alternative embodiment, the formats of two characters are considered to match only if the two characters have the exact same format; such an alternative embodiment may be less advantageous in some respects, but may be easier to implement and may still have significant advantages over prior art.

In the present specification, a "blank block" is a maximally large set of one or more blank characters such that all the characters are in the same line of text, and all the characters are adjacent (with no non-blank characters between them), and the formats of all of the blank characters match one another. Any particular blank character will be included within only one blank block, which may be said to be the blank block of that blank character. For example, in an embodiment, if a line of text consists of five consecutive space characters whose formats are identical except that only the second character is in a bold font, then the line of text contains one blank block consisting of all five characters, but if a line of text consists of five consecutive space characters whose formats are identical except that only the second character has a green background color, then that second character will be a distinct blank block, and so the line of text will contain a total of three blank blocks. In many cases blank characters are not consecutive, so in many cases a blank block will just be a single blank character; and when a group of blank characters are consecutive they are usually in the same font, so when a group of blank characters are consecutive they will usually form a single blank block.

In the present specification, a character is "visually ambiguous" if it is a blank character whose blank block is neither at the beginning nor at the end of its line of text, and its format matches the format of the last character before its blank block and also matches the format of the first character after its blank block, but the format of the last character before its blank block does not match the format of the first character after its blank block. For example, when an space character is between a red character and a blue character, the space character is visually ambiguous if its format matches the format of the red character and its format matches the format of the blue character, because the format of the red character does not match the format of the blue character. A character is "visually distinct" if it is not visually ambiguous.

Figure 23A:
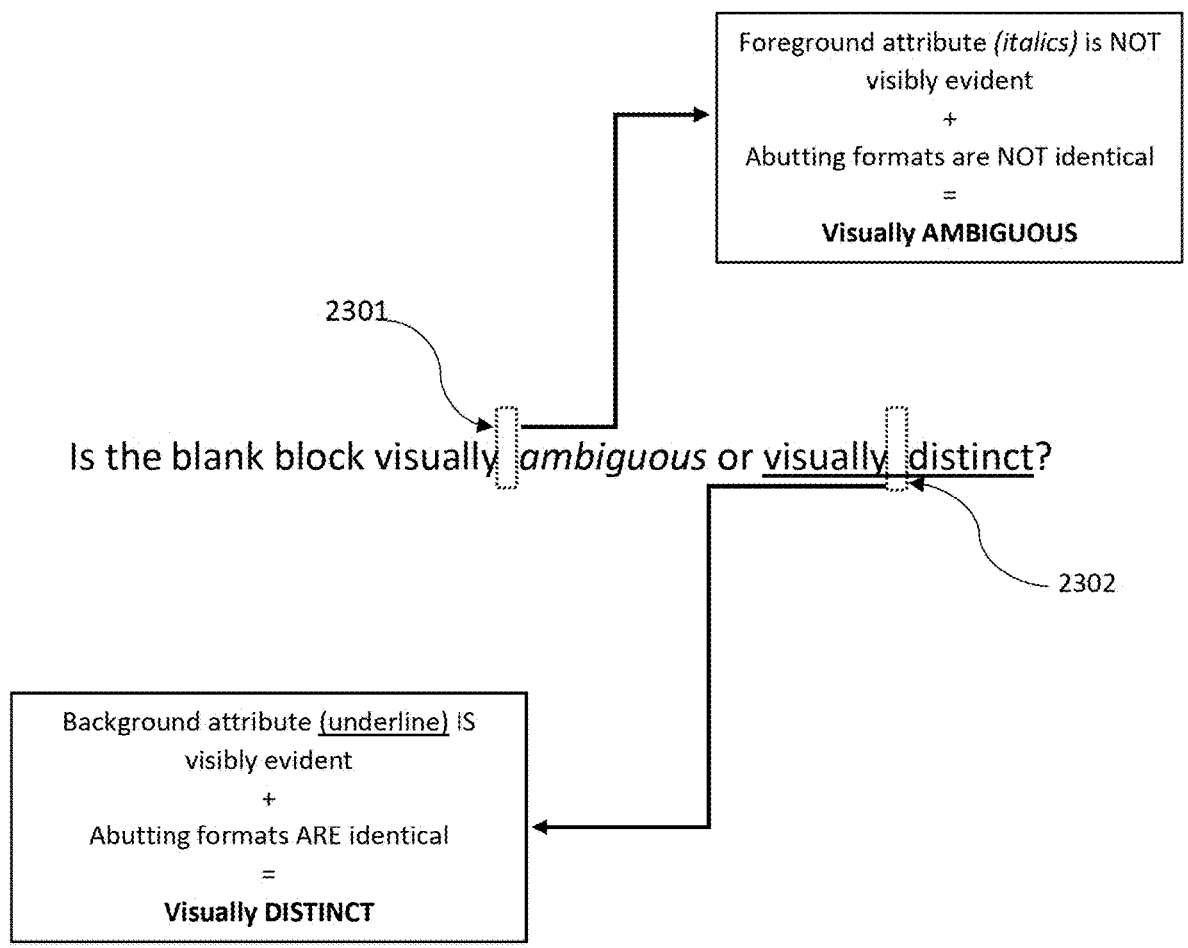
FIG. 23A illustrates a diagram identifying and deconstructing the pertinent format elements distinguishing visually ambiguous from visually distinct blank blocks, according to one embodiment.

FIG. 23A presents as a diagram identifying and deconstructing the pertinent format elements distinguishing visually ambiguous from visually distinct blank blocks. In FIG. 23A, blank block 2301, represented as the blank character between a standardly-formatted word and an italicized word, is classified as visually ambiguous because it meets the dual criteria that its abutting formats are not identical to each other and yet both formats appear identical to the format of the blank character because the divisive formatting element (italics, in this case) is identifiable as a "foreground attribute" whose presence or absence is not visibly discernible in the blank character constituting the blank block in question. By contrast, blank block 2302, represented as the blank character between two standardly-formatted and underlined words, is classified as visually distinct because of its characteristically identical abutting formats and because all "background attributes" that are visibly discernible in the blank character (including underlining, in this case) are shared with the abutting formats.

Hidden Formatting

In an embodiment, not only may each character in a document have its own individual formatting, but also a potential input cursor location may have its own individual formatting that does not necessarily match the formatting of a character immediately before it or a character immediately after it. In an embodiment, whenever moving the input cursor away from its current location and then immediately returning it to that location would change the active format, if the user does perform a cursor navigation action that will move the input cursor away from its current location, then before moving the input cursor, the interface will apply the active format to the current input cursor location so that the location has its own individual formatting. After moving the input cursor, the interface may change the active format based on the cursor's new location, but it will still remember the formatting of that previous input cursor location in case the user returns the cursor to that location.

For example, if a document contains no bold text and a user switches the active format to bold while the input cursor is at a certain location, but then the user moves the cursor away from that location before actually typing any bold text, then the bold format will, in a sense, be left behind: the interface will apply the bold format to the location where the cursor was before moving the cursor to its new location and changing the active format. As another example, in an embodiment, if a user has just finished deleting all highlighted text in a document and the active format is a highlighted format, then if the user moves the cursor away from its current location before typing any new highlighted text, the interface will apply the highlighted format to the location where the cursor was before moving the cursor to its new location and before changing the active format.

In an embodiment, when a format is applied to a potential input cursor location as described in the preceding paragraph, that format will be assigned an "inherent weight" that is initially a moderate value, and that weight will decrease over time until it becomes zero, at which point the location will cease to have its own individual formatting. Such an inherent weight is intended to reflect approximately how likely it is that a user who returns the input cursor to such a location will remember the format that was the active format when the input cursor was at that location, and will wish that format to become the active format again when the input cursor returns to that location.

Alterable Format Decisions

In the present specification, a "format set" consists of one or more formats, one of which is the "primary format" of the format set. For example, a format set may consist of a first format which is red underlined Helvetica and a second format which is black non-underlined Helvetica, with the first format as the primary format.

In an embodiment, a format that is in a format set may be assigned a "weight" that reflects approximately how likely the user is to want that format to be applied to certain characters, insofar as the interface is able to determine such a likelihood. In an embodiment, the primary format of a format set is always a format that has the highest weight within the format set. Below, whenever a certain format is said to be the primary format of a format set, this also means the format has a very high weight within that format set.

Below, the present specification will explain various circumstances in which the interface will determine certain format sets that include certain formats for various reasons. In an embodiment, if a format set would include a particular format for more than one reason, then the interface will include only one copy of that format in the format set, and the interface will assign it a weight that is slightly greater than the greatest weight it would have otherwise been assigned. In an embodiment, if a first format set is said to include a second format set, then that means it includes each format of the second format set. If a first format set is said to include a second format set with its weight reduced by a certain percentage, that means it includes each format of the second format set with the weight of each such format reduced by that percentage.

In an embodiment, in certain circumstances, rather than merely applying a particular format to one or more characters, the interface will apply a format set to those characters. When the interface applies a format set to one or more characters, the interface applies the primary format of the format set to those characters, and if the format set has more than one format then the decision to apply the primary format to those characters rather than applying some other format from the format set to those characters is an alterable decision. Such an alterable decision will be referred to herein as an "alterable format decision." An alterable format decision will have one alternate option for each particular format in the format set other than the primary format, and selecting such an alternate option will cause the interface to apply the corresponding format to the characters that the format set was applied to. For example, if a format set includes an italic format and an underlined format, and the italic format is the primary format of the format set, then applying that format set to a paragraph will cause the interface to make an alterable decision to cause the paragraph to become italicized, and altering that decision will cause the interface to change the paragraph from italicized to underlined.

In an embodiment, the probability of alteration of each alternate option of an alterable format decision will reflect the ratio of the weight of the relevant format to the weight of the primary format of the format set. For example, in an embodiment, if a format set includes a first format that is the primary format, a second format that has just as much weight as the primary format, and a third format that has a much lower weight than the primary format, then when the interface applies that format set to one or more characters, the resulting alterable format decision will have an alternate option with a very high probability of alteration for the second format and an alternate option with a low probability of alteration for the third format.

In an embodiment, in certain circumstances, rather than merely setting an active format that will be applied to the next character a user types if the user's next action is typing a character, the interface will set an "active format set."

In an embodiment, when the interface sets an active format set that has more than one format, its decision to cause the primary format of that format set to become the active format rather than causing some other format of that format set to become the active format is an alterable format decision that is an alterable input state decision. Because the alterable block of an alterable input state decision may continue to grow as a user types additional characters, in such an embodiment, if for example a user types a few words after the interface sets an active format set and then realizes that these words are not in the format he expected, then the user may be able to correct this mistake by means of a single actuation of the alteration key.

In an alternative embodiment, when the interface sets an active format set that has more than one format, its decision to cause the primary format of that format set to become the active format rather than causing some other format of that format set to become the active format is a potentially alterable decision, but that decision is not actually alterable until the user types at least one character to which that format set is applied, whereupon it becomes an alterable format decision that is an alterable input state decision as described in the preceding paragraph. In an embodiment, if such a decision is an adaptive decision, and if the user types at least one character before moving the input cursor to a new location, then the interface will evaluate the outcome of that decision based on the format of that character; for example, if the interface sets an active format set that has a bold font and a plain font, and the interface causes the bold font to become the active format because it is the primary format, and the user manually switches to the plain font before beginning to type, then the interface's decision to cause the bold font to become the active format will be considered to have had a non-beneficial outcome.

In an alternative embodiment, when the interface would set an active format set that has more than one format, the interface will merely cause the primary format of that format set to become the active format, and will not make an alterable format decision. Such an embodiment still may have significant advantages over prior art when its initial choice of an active format is a more intelligent choice than a prior art interface would make, even though that choice cannot be altered by means of alteration functionality.

Selecting Adjacent Formats Via Arrow Keys

In an embodiment, in certain circumstances that are described below, one or more formats may become "left-adjacent" or "right-adjacent" formats; for example, in certain circumstances, when a user moves the input cursor to the beginning of a document, a bold font may become the active format while a normal font becomes a left-adjacent format. In an embodiment, despite the term "left-adjacent," the format of the character immediately to the left of the cursor location may not be a "left-adjacent" format for purposes of the present specification: a "left-adjacent" format exists only in the circumstances that are explicitly described herein. Likewise, the format of the character immediately to the right of the cursor location may not be a "right-adjacent format."

In an embodiment, the active format is never left-adjacent or right-adjacent: whenever a format that is left-adjacent or right-adjacent becomes the active format, it ceases to be left-adjacent or right-adjacent. Whenever a user performs an action that causes the input cursor to move (including the action of typing a character), all formats that were previously left-adjacent or right-adjacent formats immediately cease to be left-adjacent or right-adjacent, but if that action consists of explicitly moving the input cursor, then that action may then itself cause one or more formats to become left-adjacent or right-adjacent, as described below.

In an embodiment, if a user actuates the left arrow key when there is a left-adjacent format, then instead of moving the input cursor, the interface will cause a left-adjacent format to become the active format, and the format that was previously the active format will become a right-adjacent format. If a user actuates the right arrow key when there is a right-adjacent format, then instead of moving the input cursor the interface will cause the right-adjacent format to become the active format, and the format that was previously the active format will become a left-adjacent format. In an embodiment, in such circumstances, if more than one format is left-adjacent or right-adjacent, the interface will if possible cause the left-adjacent or right-adjacent format that has the highest weight in the active format set to become the active format. Such a means of changing the active format may be convenient even in an embodiment that does not have alteration functionality.

In an embodiment, when the input cursor is at the beginning of a document, if a user actuates the left arrow key when there is no left-adjacent format, the interface will treat this as explicitly moving the input cursor to the beginning of the document, which will not cause the cursor to actually move but may cause the interface to change the active format and may cause one or more formats to become left-adjacent formats, as is described farther below. Conversely, when the input cursor is at the end of a document, if a user actuates the right arrow key when there is no right-adjacent format, the interface will treat this as explicitly moving the input cursor to the end of the document, which will not cause the cursor to move but may cause the interface to change the active format and may cause one or more formats to become right-adjacent formats.

For example, in an embodiment, when the active format is a bold font and there is one left-adjacent format, which is a normal font, then if a user actuates the left arrow key, then the normal font will become the active format. After that, if the user's next action is an actuation of the right arrow key, then this will undo the effect of pressing the left arrow key. If instead the user's next action is a second consecutive actuation of the left arrow key, then this will move the input cursor normally, except that if the input cursor was at the beginning of the document when the user performed the second consecutive actuation of the left arrow key then the interface will treat that actuation as explicitly moving the input cursor to the beginning of the document, which may for example cause the bold font to again become the active format and cause the normal font to again become a left-adjacent format.

In an embodiment, when an actuation of the left arrow key or right arrow key causes the interface to change which format is the active format without moving the input cursor, that change is treated as though it were an interface-specified change that is a subtle change for purposes of interface behaviors described in the specification, and so a block descriptor will appear for that change. In an embodiment, such a block descriptor will not be highlighted.

Text-Specific Format Sets

In an embodiment, in certain circumstances the interface may determine an "included format set" for a certain portion of text. In an embodiment, the included format set for a portion of text will include every format that is applied to any character within that portion of text, with a weight that is proportional to the prevalence of that format within that portion of text. For example, if a paragraph of several sentences is mostly plain text but includes one sentence that is bold and a single character that is italicized, then its included format set will include the plain text format with a high weight, the bold format with a moderately low weight, and the italic format with a very low weight.

In an embodiment, in certain circumstances the interface may determine a "prevalent format set" for a certain portion of text. In an embodiment, the prevalent format set for a portion of text will include every format that is applied to at least a certain minimum percentage of that portion of text (such as, in an embodiment, at least 20%), with a weight that is proportional to the amount by which the prevalence of that format exceeds the minimum percentage. For example, if a paragraph of several sentences is mostly plain text but includes one sentence that is bold and a single character that is italicized, then its prevalent format set will include the plain text format with a high weight and the bold format with a very low weight, and will not include the italic format at all. In an alternative embodiment, the prevalent format set for a portion of text will simply be the same as the included format set for that portion of text.

Normal Format Sets

In an embodiment, in certain circumstances the interface will determine a "normal format set." Generally, such a format set is intended to include at least one format that a user will perceive as the format that is currently appropriate for text that is not emphasized in any way; when it is not easy for the interface to determine with certainty what particular format fits that description, the normal format set may include more than one format that may fit that description.

In an embodiment, when the interface determines a normal format set, it will include the format that is used most in the current document. In an embodiment, if that format is bold or italic or otherwise has a distinctive attribute, then the interface will also include a plain text version of that format (with such distinctiveness removed) in the normal format set. In an embodiment, a format's choice of font will never be treated as distinctive. For example, in an embodiment, when a document contains exclusively purple text in the Times New Roman font, the normal format set will include both a purple Times New Roman format and a black Times New Roman format. In an embodiment, when multiple formats are the most used in the current document, all such formats will be included in the normal format set, along with plain text versions of all such formats.

In an embodiment, when the interface determines a normal format set, along with the format that is used most in the current document, the interface will include every format that is used by at least a certain percentage of the current document (such as, in an embodiment, at least 20% of the current document), along with a plain text version of every such format. In an embodiment, each such format will have less weight in the normal format set the less it is used.

Positional Formatting

In the present specification, a user may be said to "explicitly move the input cursor" when the user performs a cursor navigation action, such as, for example, actuating an arrow key or clicking a location. Cursor movement that occurs due to input entry or deletion does not constitute explicitly moving the input cursor.

In an embodiment, when a user explicitly moves the input cursor to a new cursor location, the interface will set the active format set. Such behavior is explained in more detail below.

In an embodiment, when a user explicitly moves the input cursor to a new cursor location, the interface will cause the active format set to include the format of the nearest visually distinct character to the left of the input cursor, if any such character exists, and will also cause it to include the format of the nearest visually distinct character to the right of the input cursor, if any such character exists. If those two formats are the same, then this format will have a very high weight in the active format set. If those two formats are not the same, then for each of those formats, the weight of the format will equal a high weight minus a small amount per each visually ambiguous character in the relevant direction that is between the input cursor and the nearest visually distinct character in that direction. In an embodiment, if these two formats are not the same and have exactly the same weight, then the format of the nearest visually distinct character to the left of the input cursor is the primary format.

For example, in an embodiment, if red text is followed by a space character that is followed by blue text, and by pressing an arrow key the user moves the input cursor to after that space character, then the active format set will include the red format and the blue format, and the red format will have a slightly lower weight because one visually ambiguous character (the space character) is between the input cursor and the nearest visually distinct character to the left. If the user then types a word in that location, then the interface will decide to apply the blue font to the word the user types rather than the red font, and this decision will be an alterable decision with a high probability of alteration. If an additional space character had been present after the input cursor, so that the blue format's weight was reduced just as much as the red format's weight, then the interface would have decided to apply the red font instead; this decision would have been an alterable decision with a very high probability of alteration.

FIG. 23B illustrates the potential usefulness of the behaviors described above. In FIG. 23B, once a user moves the cursor to a location between two visually distinct characters (2303), the interface evaluates elements such as whether those two characters have the same format (2304). If they do, the interface selects that shared format as the active format (2305) so when the user types text (2306) they presumably achieve the desired result (2307). If instead the user has moved the cursor to a location between two characters that do not have the same format, then the interface will examine whether one of the two characters is positioned nearer to the cursor (2308) to determine the more relevant format. If one character is positioned more closely to the cursor, the interface selects that character's format as the active format (2309) for subsequent input for that location. If the two characters are equidistant, the interface defaults to select the format of the character to the left of the cursor. Regardless of the currently active format selected, the user's next input (2310) will allow the user to evaluate whether or not the text appears in the user's desired format (2311). If so, the user has achieved the desired result (2307). If not, the user can then make use of alteration functionality (2312), prompting the interface to change the format of the text (2313) to the alternate option so that the user may achieve the desired result (2307) without the need to manually select the desired format.

In an alternative embodiment, when a user explicitly moves the input cursor to a new location, if a visually distinct character exists that is to the left of the input cursor and a visually distinct character exists that is to the right of the input cursor, and these two characters have different formats, and the distance from the input cursor to the nearest such character on the left equals the distance from the input cursor to the nearest such character on the right, then the format of the nearest such character on the left will become the active format, and the format of the nearest such character on the right will become a right-adjacent format. Such interface behavior may undesirably hinder the use of the right arrow key for its usual purpose, but may still confer a net advantage in an embodiment that does not have alteration functionality, or in an embodiment where it is relatively inconvenient to alter an alterable format decision, because in such an embodiment it may be a convenient way for a user who has positioned the input cursor between two adjacent characters that have different formats to explicitly select the format of the character on the right to be the active format before beginning to type.

In an embodiment, in certain cases a potential cursor location may have its own individual formatting that does not necessarily match any characters to the left or the right of the location, as is described above. In an embodiment, when a user explicitly moves the input cursor to such a cursor location, the interface will also cause the active format set to include that location's format. The weight of that location's format in the format set will be the location's inherent weight as defined above. For example, if the input cursor is at the beginning of a certain line of plain text when a user switches the active format to bold, but then before typing anything the user moves the input cursor somewhere else, then the bold format will be, in a sense, left behind: the location at the beginning of the line where the cursor was when the user switch the active format to bold will itself have the bold format with moderate weight. That weight will decrease over time, as described above. If the user moves the input cursor back to the beginning of that line very soon, before the inherent weight of the bold format has decreased much, then that bold format will not become the active format but it will be included in the active format set with a moderate weight, so if the user types a word then the interface will decide to apply the plain font to that word and its decision to apply the plain font rather than the bold font will be an alterable decision with a moderate probability of alteration.

In an embodiment, when a user explicitly moves the input cursor to a location that is at the beginning of a line that is not empty, the interface will cause the active format set to include the format of the last character that precedes that line if any such character exists, with a low weight, and that format will become a left-adjacent format. When a user explicitly moves the input cursor to a location that is at the end of a line that is not empty, the interface will cause the active format set to include the format of the first character that is after that line if any such character exists, with a low weight, and that format will become a right-adjacent format. For example, if a document happens to include one line of text that ends with a word that is in an italic font, and that line of text is followed by a line that is entirely in a normal font, and if the user moves the input cursor to immediately after the italicized word, then the italic font will become the active format, but the user can change this by pressing the right arrow key to switch to the normal font, or the user can type a few characters and then actuate the alteration key to change those characters from the italic font to the normal font.

In an embodiment, when a user explicitly moves the input cursor to a location that is at the beginning or end of a document, the interface will cause the active format set to include the normal format set, with a reduced weight; if the location is at the beginning of the document, then all formats in the normal format set will become left-adjacent formats, and if it is at the end of the document, then all formats in the normal format set will become right-adjacent formats. For example, if most of the characters within a document are in a plain font but the last character is in a superscript font, and if the user moves the input cursor to the end of the document then the superscript font will become the active format, but the user can change this by pressing the right arrow key to switch to a plain font, or the user can type a few characters and then actuate the alteration key to change those characters from the superscript font to the plain font.

In an embodiment, after a user types a character, if the cursor is then in a location such that explicitly moving the input cursor to that location would cause one or more left-adjacent or right-adjacent formats to exist according to the interface behaviors specified in the two preceding paragraphs, then such left-adjacent or right-adjacent formats will exist as though the user had explicitly moved the input cursor to that location. For example, if most of the characters within a document are in a plain font, and the input cursor is at the end of the document, and the user switches to a superscript font and types a character in the superscript font at the end of the document, then pressing the right arrow key will cause the interface to switch to the plain font.

Figure 23C:
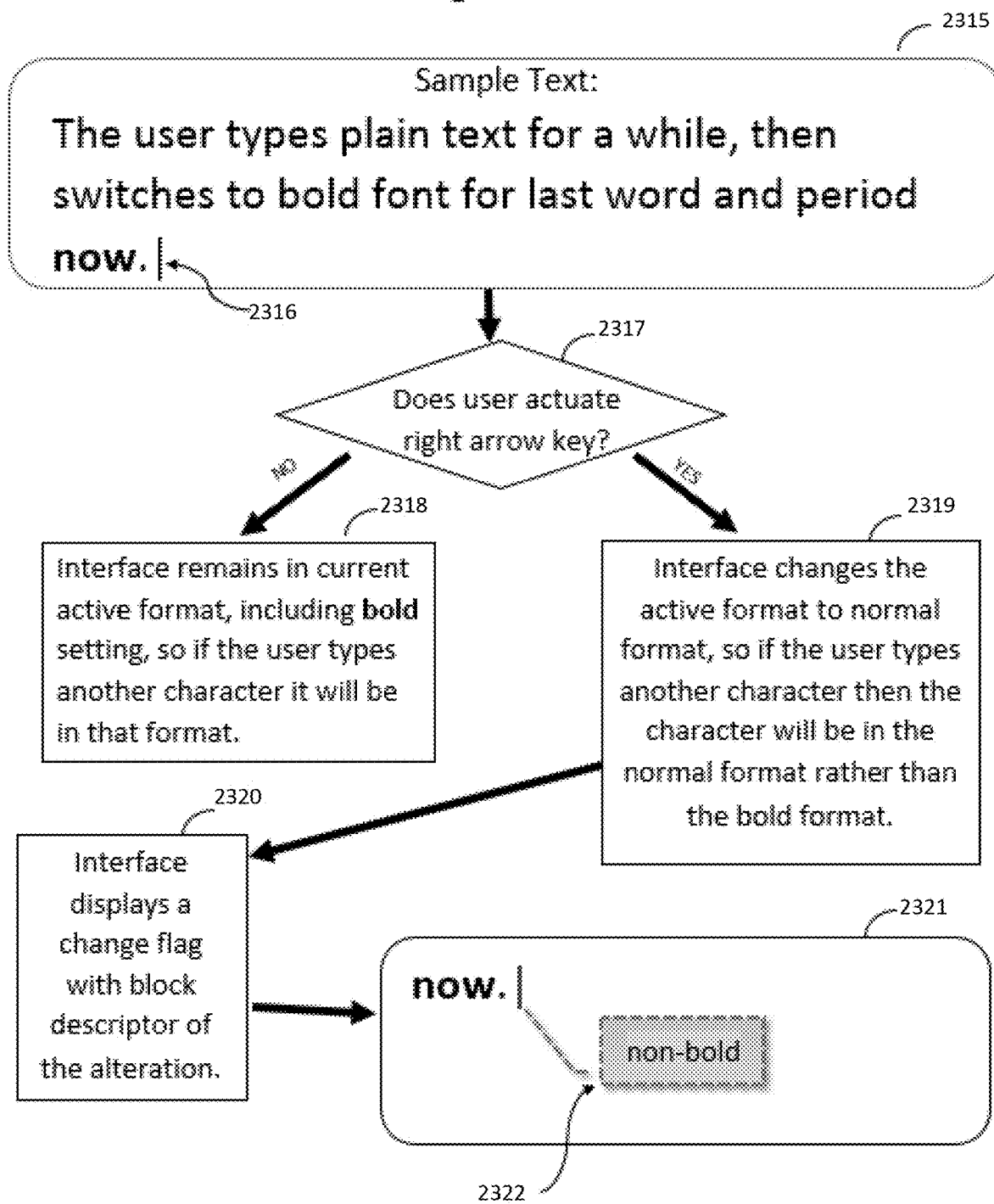
Figure 24:
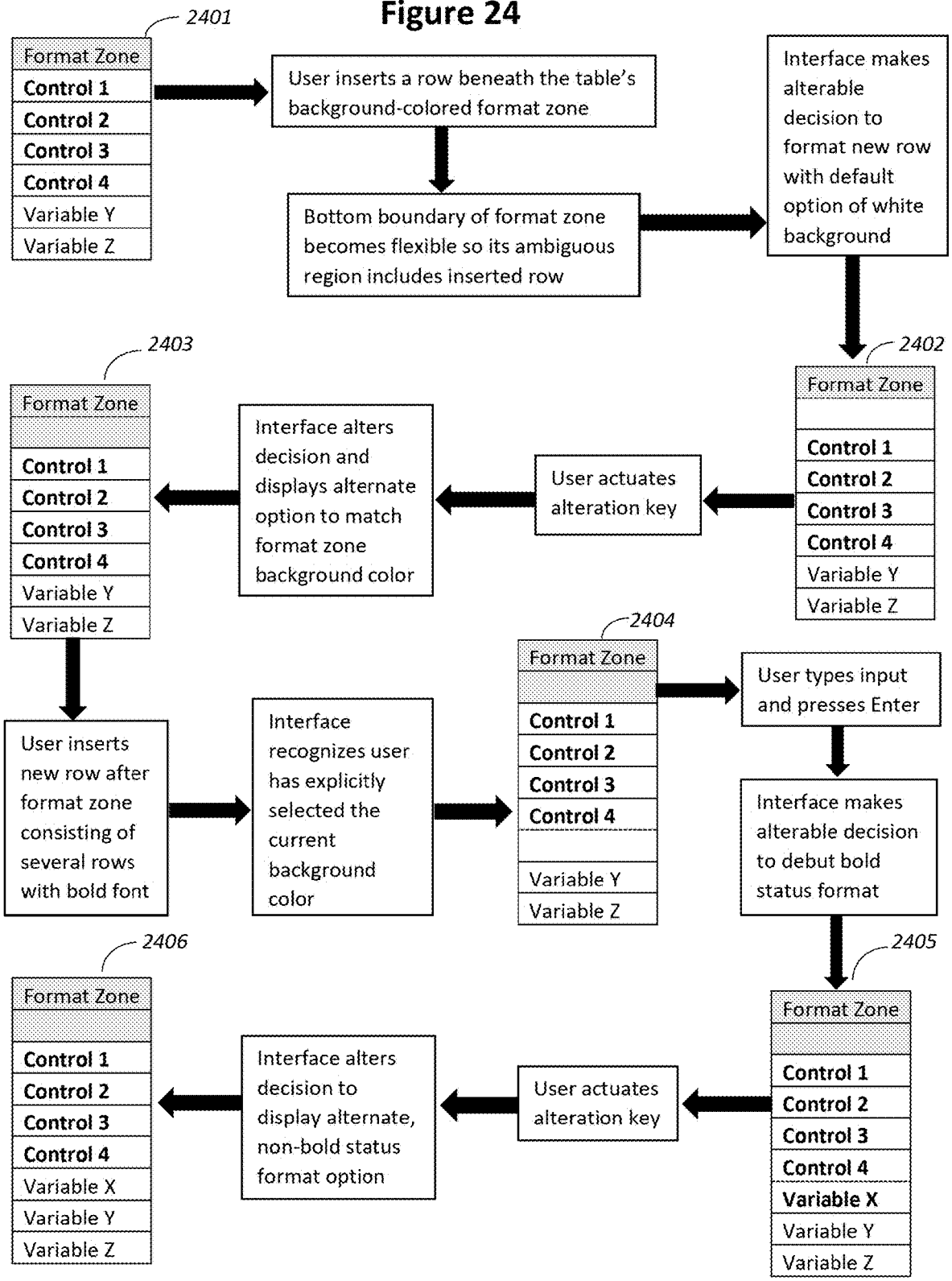
FIG. 24 illustrates alterable format expression decisions in action, according to an embodiment.
Figure 25A:
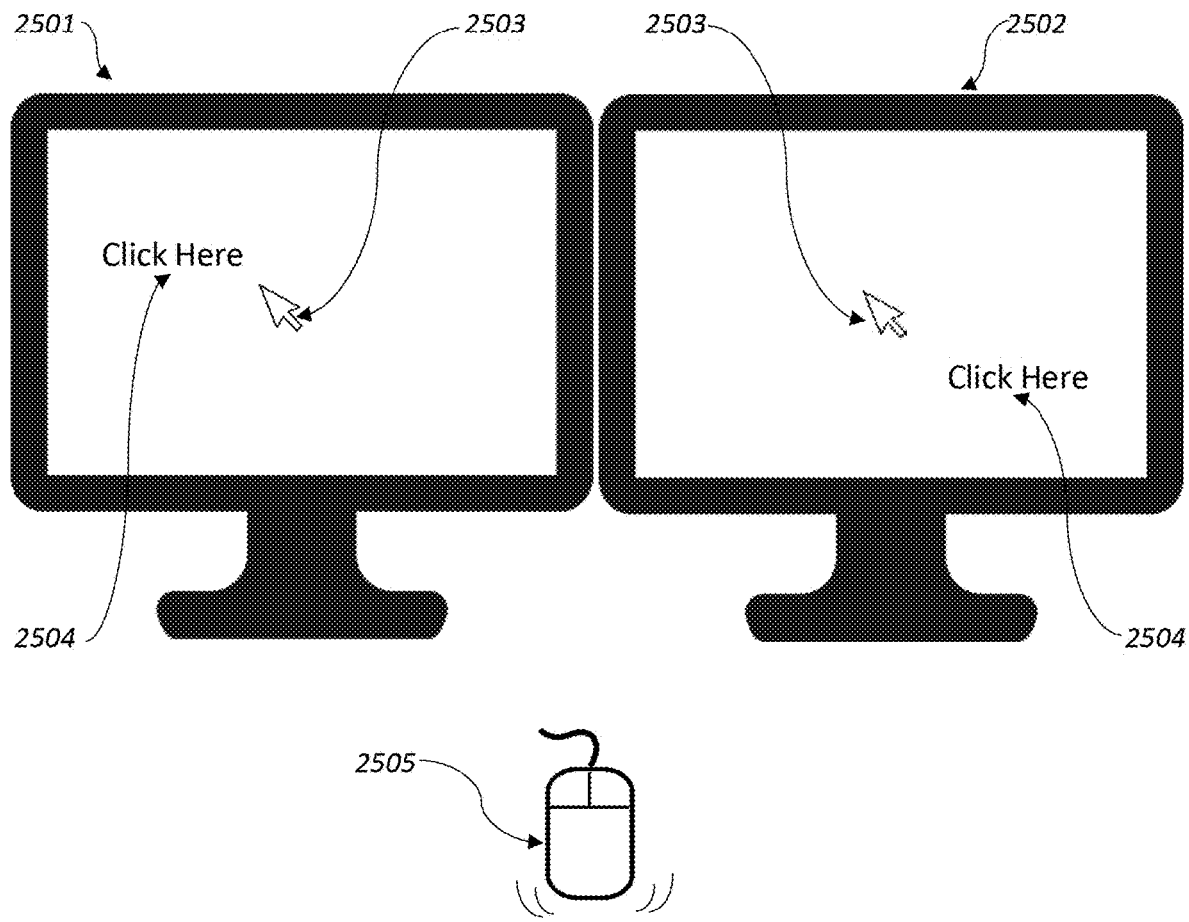
FIG. 25A illustrates a directed input cursor jumping feature in action, according to an embodiment.
Figure 25B:
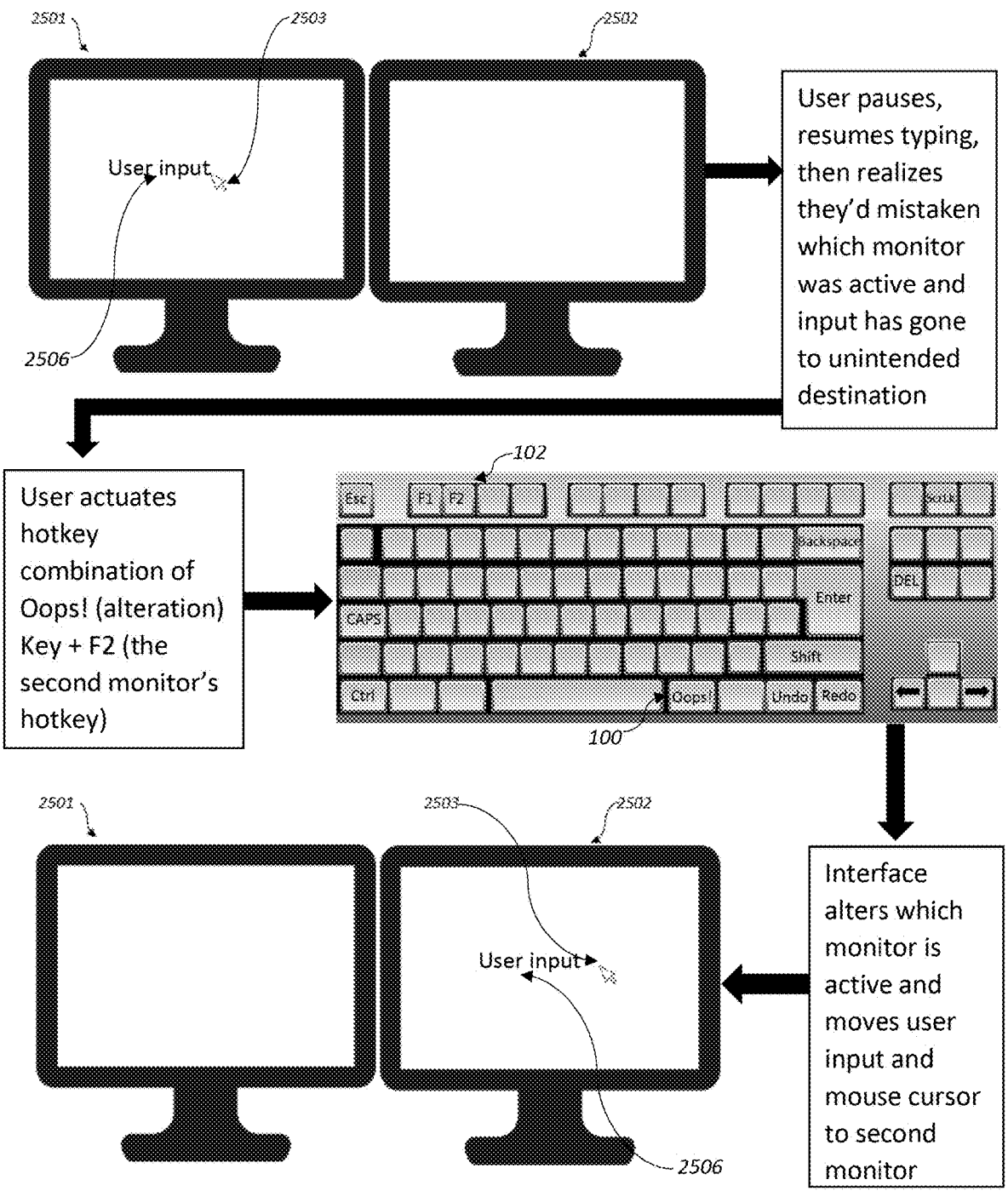
FIG. 25B illustrates advantages associated with some embodiments of a directed mouse cursor jumping feature.

FIG. 23C is a flowchart that includes text that illustrates and explains the behavior described in the preceding paragraph such that actuating the right arrow key when the cursor is at the end of a line of text may cause the interface to change the active format: Block 2315 illustrates a situation where the active format is a bold format, but if the user actuates the right arrow key then the interface will behave as explained in Blocks 2319 and 2320 so the interface will change the active format to the normal format and display a block descriptor 2322 to inform the user of this change.

Paste Formatting

In various prior art interfaces, a user can copy and paste formatted text. In various interfaces, depending on the means by which a user pastes formatted text, the interface may either paste the formatted text with its formatting unchanged or may cause the formatting of the pasted text to entirely match the active format (which is the format that the interface would have applied if the user had typed a character rather than invoking the Paste command). For example, in WordPress, if a user presses Ctrl-V then the interface will paste formatted text with its formatting unchanged; if the user instead presses Ctrl-Shift-V then the interface will cause the formatting of the pasted text to match the active format, as though the user had retyped the individual characters of the pasted text rather than pasting the text.

In an embodiment of the present invention, when a user pastes formatted text into a document at the location of the input cursor, the primary format of the format set for the pasted copy of the text will be the original format of the formatted text; that is, the interface will alterably choose to keep the source formatting. In an embodiment, when a user pastes formatted text into a document at the location of the input cursor, the format set for the pasted copy of the text will also include every format that it would have included if the user had typed a character at that location. For example, if a user positions the input cursor between red text and green text and pastes blue text there, the interface will alterably decide to leave the pasted text blue; selecting one of the alternate options of this decision will cause the pasted text to become red, and selecting the other will cause the pasted text to become green.

Figured 23D is a flowchart demonstrating interface use of contextual data to inform pasted text format determinations as alterable format decisions. When the user pastes formatted text into a location (2301) the interface defaults to preserve the pasted text's original source formatting (2302) but registers that formatting as an alterable decision. If the default format is what the user desired (2303), the decision is correct and the intended result achieved (2306). If the default original source formatting was not what the user desired (2303), user experience becomes defined by the interface's alteration functionality or its lack thereof (2304). When the format is alterable the user can simply invoke alteration functionality (2307) to prompt the interface to change the formatting to an alternate option determined by positional data (2308). (Usage of positional data is further detailed in FIG. 23B.) At that point, the user evaluates whether the text is in the desired format (2303), and the user either has achieved the desired result (2306) or can easily actuate alteration functionality again to prompt the interface to change the formatting to another not-previously-selected option. By contrast, if the interface lacks alteration functionality (2304), the user must manually edit the text format (if not forced to delete the input entirely and re-type it in the desired format) (2305) in order to achieve the desired result (2306).

Deletion Formatting

In an embodiment, immediately after a user deletes an individual character by means of the backspace key or Delete key, the primary format of the active format set will be the format that individual character had, and the active format set will also include every format that it would include if the input cursor were explicitly moved to its current location. For example, if a document consists entirely of plain text except for one line that is bold text, then if a user repeatedly presses the Backspace key until all the text in that line is deleted, the primary format of the active format set will be the bold format, and the active format set will also include the plain format. As another example, if the first letter of a word is underlined and the following letter is not, then if a user deletes that first letter and immediately retypes a new letter, the new letter will be underlined by default, but the interface's decision to underline the new letter will be an alterable decision.

In an embodiment, immediately after a user selects a region of input containing a plurality of characters and then actuates the backspace key or the Delete key so that all the characters within the region are deleted via a single keystroke, the primary format of the active format set will include the prevalent format set of the text that was deleted via that keystroke and will also include every format that it would include if the input cursor were explicitly moved to its current location. For example, if a document contains just one brief sentence that is in a bold font, and that sentence includes a couple italicized words, then if a user selects that sentence and then deletes the entire sentence by means of a single actuation of the backspace key, then the active format set will include the bold format, and will include the bold italic format with a lower weight, and will also include a plain format if the characters that are now immediately before and immediately after the cursor location are plain text characters.

Pattern-Recognition Formatting

In an embodiment, the interface will attempt to recognize distinctive format usage patterns. If the interface recognizes a distinctive format usage pattern, then the interface will automatically add the appropriate format to the active format set at the appropriate time in order to cause the pattern to continue. If the interface is very confident in recognizing such a distinctive format usage pattern, then the interface will add the appropriate format to the active format set as the primary format.

In particular, in an embodiment, when a document has at least three blank lines, if each line that is immediately after a blank line has the same first particular format, and each such line is immediately followed by a line that has the same second particular format that is distinct from the first particular format, then when the user adds a line at the end of the document, if that line is immediately after a blank line, then the interface will add that first particular format to the active format set as the primary format, and unless the user then breaks the pattern, at the start of the following line the interface will add that second particular format to the active format set as the primary format. For example, in such an embodiment, if a blank line is always followed by a line that is in a particular bold font (because it is a section heading) that is followed by a line that is in a particular normal font, then the interface will learn to automatically switch to that particular bold font after a blank line, and then switch back to that particular normal font at the beginning of the following line.

Various other means of identifying distinctive format usage patterns will be evident to those of ordinary skill in the art, and especially clever means of identifying distinctive format usage patterns may be evident to the especially skilled practitioner. One possible advantage of the alterable format set functionality that is described above is that once such functionality is deployed, an interface designer can aggressively deploy smart algorithms that attempt to guess what format a user wants with relatively little risk that such algorithms will cause very much inconvenience when they guess incorrectly.

Targeted Formatting

The alteration key and other alteration functionality may be quite useful for efficiently correcting mistakes, but do not necessarily need to be devoted to that purpose exclusively: in an embodiment, alteration functionality may also be used to make other changes. In particular, in an embodiment, the targeted format alteration feature described below may be used to change the format of a selected portion of a document.

In an embodiment, while a range of input is selected, the selected range is "targeted for alteration" as described in the specification. In the following paragraphs, a selection that is targeted for alteration will be referred to as a "target."

In an embodiment, when a selection is targeted for alteration, the interface may cause one or more targeted alterable interface decisions to temporarily exist such that altering one of these decisions will cause the format of the target to change. Such an embodiment will be said to have "the targeted format alteration feature," and such an alterable interface decision will be referred to herein as a "targeted format decision."

In an embodiment, when a selection is targeted for alteration, if the target is the alterable block of an alterable format decision that already existed, then that alterable format decision will be treated as a targeted format decision for purposes of the behaviors described below even though it is not a targeted alterable interface decision as defined in the specification, and so the interface may temporarily add additional formats to its format set, as described below. If it does, then if any of these additional formats would have a weight greater than the weight of the primary format that was already in the format set of the targeted format decision, then the weights of all these additional formats will be reduced by a sufficient percentage that none has a weight greater than the weight of the primary format. Also, if the interface adds additional formats to the format set of an alterable format decision when its alterable block becomes targeted for alteration, then any such additional format that is not selected when its alterable block ceases to be targeted for alteration will then be deleted from the format set of the alterable format decision.

In an embodiment, when a selection is targeted for alteration, if the target is not the alterable block of an alterable format decision that already existed, then the interface will cause a single targeted alterable interface decision to exist that is a targeted format decision, except that if such a decision would have no alternate options then the interface will not cause such a decision to exist. Such a decision will be an alterable format decision such that the primary format of its format set corresponds to leaving the format of the selection unchanged; the interface may also add other formats to its format set, as described below, and if it does, then the targeted format decision will thus have alternate options that have probabilities of alteration that are proportional to the weights of these additional formats in its format set.

In an embodiment, when a decision is a targeted format decision, its format set will include every format that is in use in the current document. Thus, for example, in an embodiment, if all the text in a document is either black or red, then selecting a black word and actuating the alteration key may cause the word to become red, and selecting a red word and actuating the alteration key may cause the word to become black.

In an embodiment, the interface will remember formats that a user has used even after a document is closed, and the format set of a targeted format decision not only will include every format that is in use in the current document, but also may include other formats that the user has recently used. In an embodiment, the interface will examine other documents on the same computing device that may be closely related to the current document, such as documents that are stored in the same folder on a computer's hard drive, and a targeted format decision may also include other formats that are stored on the same computing device as the current document.

Targeted Format Weights in an embodiment, for purposes of the interface behavior described in the following paragraphs, an "alternate format" is a format that is in the format set of a targeted format decision. Various factors are discussed below that the interface may take into consideration in assigning a weight to a format in the format set of a targeted format decision. When it is said that an alternate format is assigned a higher weight in certain circumstances, this means that it is assigned a higher weight than it would be assigned in other circumstances, all else being equal. For example, the following paragraph means that in an embodiment, an alternate format that is used in the current document will be assigned a higher weight than it would be assigned if it were not used in the current document, all else being equal.

In an embodiment, an alternate format that is used in the current document will be assigned a higher weight.

In an embodiment, an alternate format that is used by text that is located closer to the target will be assigned a higher weight than it would be assigned if it were located farther away, and in particular, an alternate format that is used by text that is immediately adjacent to the target will be assigned an especially high weight.

In an embodiment, the interface will count the number of distinct places that each alternate format is used within the current document, and an alternate format that corresponds to a higher number will be assigned a higher weight. In an embodiment, if the interface examines other documents on the same computing device to determine what alternate formats are available for a targeted format decision, then the interface will count the number of distinct places that each alternate format is used within other documents and will add a percentage of this number to the number of distinct places that each alternate format is used within the current document, and an alternate format that corresponds to a higher total will be assigned a higher weight. (In other words, in an embodiment, alternate formats that are more heavily used will have a higher weight, especially if they are more heavily used in the current document.) In an embodiment, the percentage mentioned in the present paragraph is a higher percentage for documents that the user has edited more recently; in an alternative embodiment, the percentage is a fixed percentage.

In an embodiment, an alternate format that the user selected more recently will be assigned a higher weight. For purposes of the present paragraph, "selecting" a format consists of explicitly choosing that format by some means such as clicking format-related buttons on a toolbar or performing targeted format alteration; merely locating the input cursor within a region where a format has previously been applied and typing within that region does not constitute "selecting" that format.

In an embodiment, an alternate format that has more format values in common with the entire target will be assigned a higher weight; for example, if the selection that is targeted for alteration includes only black underlined text and blue underlined text, then an alternate format that includes underlining will be assigned a higher weight than an alternate format that does not, all else being equal.

In an embodiment, for each format value that an alternate format does not have in common with the entire target, the alternate format will be assigned a higher weight if it does not have that format value in common with the majority of the current document than the weight it would be assigned if it did have that format value in common with the majority of the current document, all else being equal. In other words, formats that diverge farther from the document's default format will tend to have higher weights. In an embodiment, the weight bias described in the present paragraph will be sufficiently strong that if an alternate format consists of the format that is used in the majority of the current document, then this format still may not necessarily have the highest weight of all the alternate formats. For example, in an embodiment, if the majority of a document consists of non-underlined black text and the selection that is targeted for alteration consists of non-underlined blue text, and if an alternate format consisting of underlined blue text exists, then the alternate format consisting of underlined blue text may have a higher weight than an alternate format consisting of non-underlined black text even though non-underlined black text is used in the majority of the current document.

In an embodiment, when the selection that is targeted for alteration has the same format as the text that immediately precedes the selection and the same format as the text that immediately follows the selection, the weight bias disclosed in the preceding paragraph will be even stronger. For example, in such an embodiment, if the majority of a document consists of non-underlined black text and the selection that is targeted for alteration consists of a single word that is in the middle of a sentence that entirely consists of non-underlined blue text, then the behavior disclosed in the present paragraph will cause the interface to have a substantial bias against causing that word to become non-underlined black text, as opposed to, say, underlined blue text.

However, in an embodiment, as an exception to the behaviors disclosed in the preceding two paragraphs, when the selection that is targeted for alteration has the same format as the text that immediately precedes the selection and the same format as the text that immediately follows the selection, if the selection is italicized and the majority of the current document is not italicized, then an alternate format that is identical to the selection's current format except that it is not italicized will not be assigned a lower weight due to not being italicized. For example, in such an embodiment, if the selection that is targeted for alteration consists of a single italicized word that is in the middle of an italicized sentence, then the behavior disclosed in the preceding two paragraphs will not be applicable and so the interface may not necessarily have any bias against causing that word to become non-italicized text.

Subsequent Formatting

In an embodiment, for purposes of the interface behavior described in the following paragraphs, a "subsequent format decision" is an alterable format decision such that altering the decision will change which format is the active format but will not change the format of any characters that exist yet. For example, if a user moves the input cursor to a new location and the interface makes an alterable input state decision whether to set the active format to a red format or a blue format, that decision is then a subsequent format decision, but as soon as the user types a character, it is no longer a subsequent format decision.

Because altering a subsequent format decision does not change the format of any characters that exist yet, in an embodiment, such an alterable decision is a subtle change for purposes of the relevant interface behaviors that are described in the specification, which means that when such a decision is a highlighted alterable decision, in an embodiment, the interface may cause a block descriptor to appear that contains a brief description of the status of such an alterable decision, as is described in the specification. In an embodiment, such a brief description will include only the minimum explanation necessary to distinguish a particular option of a subsequent format decision from the other options; for example, if the two options of a subsequent format decision consist of setting the active format to be either italicized underlined red or italicized underlined blue, then the brief descriptions of those options will consist of only the words "red" and "blue" respectively. In an embodiment, the text of such a brief description will be displayed in the actual format that it is a description of, provided that this format does not cause the text to be illegible.

In an embodiment, whenever the input cursor is at a location where it is possible to input formatted text, and no text is selected, a subsequent format decision will exist, except that if such a decision would have no alternate options then such a decision will not exist. The format set of such a decision will be referred to as the "subsequent format set." That is, in an embodiment, except when there is a subsequent format decision that exists due to an interface behavior that is described above (such as due to the interface causing a format set that has more than one format to become the active format set), or when there is text that is selected, the interface will cause a subsequent format decision to temporarily exist, unless such a decision would have no alternate options. In an embodiment, such a decision will exist only until the user performs an editing action such as moving the input cursor or typing a character, whereupon the interface will delete the decision (but may then immediately cause another subsequent format decision to temporarily exist). For example, in an embodiment, if a user alters a temporarily existing subsequent format decision and thus causes the active format to change from red to blue, and then the user types a character, then the decision the user altered will no longer exist and so the user cannot change the color of the character he just typed by altering that decision; a new temporarily existing subsequent format decision may then exist so that the user can change the active format from blue back to red, but doing so would not affect any character the user already typed.

In an embodiment, whenever there is a visually distinct character that is to the right of the input cursor, if the nearest such character has a format other than the active format, the subsequent format set will include the format of that character with a high weight, minus a small amount per each visually ambiguous character that is between the input cursor and that character. When the input cursor is at the end of a line that is not empty, the subsequent format set will include the format of the first character that is after that line if any such character exists, with a low weight. When the input cursor is at the end of a document, the subsequent format set will include the normal format set, with a reduced weight.

In an embodiment, the subsequent format set will include every format that would be included in the format set of any targeted format alteration decision as described above, and the same factors that would affect the weights of the formats in the format set of a targeted format alteration decision as described above correspondingly affect the weights of these formats in the subsequent format set, except that factors that affect format weights that are dependent on the content of the target in a targeted format alteration decision are not relevant in determining the format of a weight in the subsequent format set, since there is no selection that is targeted for alteration. (Such behavior is possible even in an embodiment that does not have targeted format alteration decisions: the above explanation of how to determine what formats are included in the format set of a targeted format alteration decision can instead be used as an explanation of how to determine what formats are included in the subsequent format set.) Thus, for example, in an embodiment, if a document contains some blue text in just one location, and that location is quite far away from the input cursor location, then the subsequent format set will include the blue format, but with a relatively low weight because it is used far away and in only one place.

In an embodiment, for each alternate option of a temporarily existing subsequent format decision, its probability of alteration will equal only a certain percentage (such as, in an embodiment, 50%) of the probability of alteration it would have if the temporarily existing subsequent format decision were an ordinary alterable format decision. For example, in an embodiment, if a character moves the input cursor to a location that is between a red letter and a blue letter, then the interface will make an alterable format decision to set the active format to be red instead of blue, and the blue format will have a high weight in the format set of that decision, so the alternate option of that decision will have a very high probability of alteration (such as, in an embodiment, 5.0). Such a decision is an ordinary alterable format decision, and is an alterable input state decision. If the user then types a character that is red, then that alterable input state decision may still exist, so the user can change that character from red to blue by altering that decision, but now a temporarily existing subsequent format decision will also exist. Such a temporarily existing subsequent format decision will not have a very high probability of alteration: the blue format has a high weight in the format set of that decision, but the corresponding alternate option of that decision has a probability of alteration that equals only a certain percentage of the probability of alteration it would ordinarily have, so that alternate option has a moderate probability of alteration (such as, in an embodiment, 2.5). If the user continues to type red text within the alterable block of the alterable input state decision, gradually that decision's probability of alteration will decrease so that its probability of alteration may become lower than that of a temporarily existing subsequent format decision. Thus, in such an embodiment, it may be the case that when a user moves the input cursor to a location that is between two formats and begins to type, if the text the user is typing is not in the format the user desires, the user can retroactively correct this mistake by actuating the alteration key once; if it is in the format the user desires, the user can continue to type text in this format, and then a while later, if the user wants to switch to the other format without affecting the text he has already typed, he may be able to achieve this by actuating the alteration key once, provided that the alterable input state decision regarding the text he has already typed has come to have a lower probability of alteration than the temporarily existing subsequent format decision.

Math Interface Features

Math Interfaces

Interfaces that allow input of mathematical expressions in standard mathematical notation are typically relatively complicated, because mathematical notation often requires special symbols that are not common to ordinary text, and often requires special formatting that is not common to ordinary text. A skilled typist can type ordinary text faster than he can write text by hand, but even for an experienced user, entering a mathematical expression into a calculator or word processor may often be slower than writing the same expression by hand. Additionally, interfaces that allow output of results of mathematical calculations may be relatively complicated, in order to allow users to select various options pertaining to the format of the output. Complex interfaces tend to slow users down and also tend to lead to interface mistakes.

The following description of various math interface improvements will include improvements that are applicable to various features that were previously disclosed in U.S. Pat. No. 8,788,548 (Multimode mathematical user interface) and U.S. Pat. No. 8,504,600 (Mathematical expression entry).

In the present specification, a "fraction creation key" is a key such that when the key is actuated, the interface will create a fraction in standard mathematical notation, with its numerator above its denominator. A "fraction bar key" is a fraction creation key such that when the key is actuated, the interface may move previously typed mathematical text into the numerator of the fraction it creates; for example, in an interface with a fraction creation key that is a fraction bar key, the keystroke sequence 2/3 will yield ⅔. Whenever an example of a keystroke sequence includes a forward slash character, that character represents an actuation of the fraction bar key; for example, in the preceding sentence the phrase "the keystroke sequence 2/3" refers to the keystroke sequence consisting of first an actuation of the 2 key, then an actuation of the fraction bar key, and then an actuation of the 3 key. A "fraction initialization key" is a special type of fraction bar key such that repeated consecutive actuations of the key may have a special effect; such a key is described in detail in the specification.

In the present specification, a "function identifier" is an abbreviation that denotes a mathematical function in a mathematical expression, such as "cos" or "ln."

In the present specification, the term "calculator" may refer to a computing device that is exclusively for use as a calculator, and may also refer to a general-purpose computing device that has a calculator application or other calculator functionality. The term "numeric calculator" refers to a calculator or other computing device that can perform numeric calculations but not algebraic calculations, as is explained in more detail in the specification.

Mathematical Structures

Mathematical Structures

In the present specification, "textbook notation" refers to mathematical notation as it is typically found in mathematical textbooks in the United States. Specifically, when a fraction is written in "textbook notation," the fraction consists of a horizontal fraction bar, a numerator that is above the horizontal fraction bar, and a denominator that is below the horizontal fraction bar. When a square root is written in "textbook notation," the square root symbol includes a horizontal vinculum that extends above the radicand of the square root. When an exponent is written in "textbook notation," it is written with superscript formatting. For example, the expression $$\frac{x+1}{x+2} - \sqrt{x+2} - x^2$$

includes a fraction, a square root, and an exponent that are all written in textbook notation. Those of ordinary skill in the art will also be familiar with the way in which other mathematical expressions are written in textbook notation, such as mathematical expressions that include integrals, summations, etc.

Many mathematical expressions, when written in textbook notation, have characteristics that are not common to most non-mathematical printed English text. Typically, a portion of non-mathematical printed English text is written as a sequence of characters arranged in lines from left to right. Typically, if a character of non-mathematical English text is directly above another character of non-mathematical English text, there is no close relationship between these two characters: each character is a portion of a distinct line of text, and their proximity is of no significance. Many mathematical expressions, on the other hand, when written in textbook notation, include characters and symbols that are directly above or below other characters or symbols that they are closely related to. For example, the fraction one half, when written as the English text "one half," is expressed as a sequence of characters arranged from left to right; but the same fraction, when written in textbook notation as ½, is expressed as a numeral 1 that is directly above a fraction bar that is directly above a numeral 2. Thus, this fraction, when written in textbook notation, does not merely consist of a sequence of characters arranged in lines from left to right: its characters are arranged vertically. In addition to fractions, many other types of mathematical expressions, when written in textbook notation, make use of vertical relationships between characters and symbols. For example, the two distinct mathematical expressions $\sqrt{x+2}$ and $\sqrt{x}+2$ are visually distinguished by the fact that the plus sign and the numeral 2 in the former expression are vertically below the vinculum of the square root symbol, but the plus sign and the numeral 2 in the latter expression are not vertically below the vinculum of the square root symbol.

In the present specification, a "mathematical structure" is a portion of a mathematical expression that has special formatting that has syntactic significance. For example, an exponent that is written in textbook notation is delineated by superscript formatting, and so an exponent that is written in textbook notation is a mathematical structure. Fractions and square roots are also mathematical structures when written in textbook notation.

Mathematical Structure Input

Some prior art interfaces that allow users to input mathematical expressions do not allow users to do so in the standard mathematical notation that is typically encountered in textbooks. For example, in some interfaces, rather than inputting $$\frac{1}{2} + x^2 + \sqrt{2} + \log_2 8,$$

a user would be required to input 1/2+x^2+√(2)+log 2(8). Other prior art interfaces have special functionality to facilitate inputting mathematical expressions in textbook notation. In particular, various prior art calculator interfaces allow users to input mathematical expressions such as $$\frac{1}{2} + x^2 + \sqrt{2} + \log_2 8$$

in textbook notation.

Many prior art math input interfaces rely heavily on templates for input of mathematical structures. For example, the equation entry interface within Microsoft Word relies heavily on templates for input of mathematical structures, and so do the interfaces of various graphing calculators. Generally, in such interfaces, in order to input a particular mathematical structure and its contents, a user must insert the appropriate empty mathematical structure template, then input its contents, and then move the input cursor out of the template if the user wishes to type anything else after the mathematical structure. Also, in some prior art math input interfaces, in order to input a fraction mathematical structure with its contents, a user must insert an empty fraction template, then input the numerator, then move the input cursor into the empty denominator, then input the denominator, and then move the input cursor out of the denominator if the user wishes to type anything else after the fraction.

In some prior art math input interfaces (including the multimode math input interface mentioned in the following paragraph), when a user presses the fraction creation key and the interface creates a new fraction, the new fraction will not necessarily be an empty fraction template. Instead, before creating the new fraction, the interface will determine what if anything would constitute the dividend of the division operator if a division operator were inserted into the user's input at the input cursor location, and if such a potential dividend exists then the interface will include that potential dividend in the numerator of the new fraction and will move the input cursor into the denominator of the new fraction. In such an interface, in many cases, in order to input a fraction mathematical structure with its contents, a user may input the numerator, then press the fraction creation key, then input the denominator, and then move the input cursor out of the denominator if the user wishes to type anything else after the fraction.

A multimode math input interface is disclosed in U.S. Pat. No. 8,788,548. In a multimode math input interface, when the input cursor is within and at the end of a mathematical structure, in certain circumstances the interface may be in a special bipositional entry mode such that if the user types a digit while the interface is in the bipositional entry mode then the digit will be included within the mathematical structure, but if the user types a plus sign or minus sign while the interface is in the bipositional entry mode then the interface will automatically exit the mathematical structure and put the plus sign or minus sign that was typed outside of the mathematical structure, to the right of the mathematical structure. If the user types some other character while the interface is in a bipositional entry mode, the interface may or may not automatically exit the mathematical structure, depending both on the character that the user typed and the particular bipositional entry mode that the interface is in. For example, the keystroke sequence consisting of the 3 key, the exponent creation key, the 1 key, the 0 key, and then the plus key will yield the result $3^{10}+$. In a multimode math input interface, in many cases, in order to input a fraction mathematical structure with its contents, a user may input the numerator, then press the fraction creation key, and then input the denominator, with no need to perform any explicit cursor navigation actions even if the user wishes to type something else after the fraction. For example, in such an interface, a user may type $$\frac{1}{2} + \frac{1}{3}$$

using just seven keystrokes, without ever using an arrow key to move the input cursor.

When a multimode math input interface is in a bipositional entry mode, the input cursor may be placed in a special location, such as partly within the mathematical structure, in order to visually indicate that the next character that is entered may or may not be placed within the mathematical structure. For example, in a certain embodiment of a multimode math input interface, if a user types the keystroke sequence 1/2, then the interface will display the mathematical structure ½ and the input cursor will be located to the right of the fraction and vertically aligned with the fraction's denominator in order to visually indicate that the next character that is entered may either be appended in the fraction's denominator or be appended to the right of the fraction. If the user then actuates the plus key, the interface will move the cursor so that it is fully and unambiguously outside of the fraction's denominator and will append the plus sign after the fraction.

Mathematical Structure Mistakes

In some cases, a user of a math input interface may forget a particular keystroke that is necessary in order to distinguish the boundaries of a particular mathematical structure. In an interface that is not a multimode math input interface, a user may forget to explicitly move the input cursor to exit a mathematical structure when necessary, so for example a user who wishes to type $\sqrt{4}+5$ may accidentally type $\sqrt{4+5}$ instead. Conversely, in an interface that is a multimode math input interface, a user may forget to prevent the interface from automatically exiting a mathematical structure, so for example a user who wishes to type $\sqrt{4}=$ may accidentally type $\sqrt{4}+5$ instead.

On a prior art TI-84 Plus Silver Edition C graphing calculator running OS 4.0, when the input cursor is at the end of a non-empty denominator, a non-empty square root, or a non-empty exponent, the input cursor changes from a blinking solid black rectangle to a blinking black rectangle that has a white right arrow symbol superimposed on it. This modified cursor serves as a reminder to the user that the user must actuate the right arrow key in order to exit the mathematical structure if the user wishes to type anything else after the mathematical structure. This modified cursor may reduce the probability that a user will neglect to actuate the right arrow key when necessary, but will not entirely eliminate the possibility that a user will neglect to actuate the right arrow key when necessary.

In an interface that has a fraction creation key that is not a fraction bar key as defined in the specification, a user may forget that it is necessary to create an empty fraction template before typing a fraction's numerator. For example, a user who wishes to type ½ may press the 1 key first rather than pressing the fraction creation key first. In an interface that has a fraction bar key, a user may type an expression that includes multiple terms that the user intends to become the numerator of a new fraction, and then the user may press the fraction bar key with the expectation that the newly created fraction will have that entire expression as its numerator, but when the user presses the fraction bar key the interface will move only the term that immediately precedes the input cursor into the new fraction's numerator. For example, a user who wishes to type $$\frac{x+1}{2}$$

may type x+1 and then press the fraction bar key with the expectation that the result thus far will be $$\frac{x+1}{\square},$$

but instead the result will be $$x+\frac{1}{\square}.$$

In various embodiments, the present invention will include one or more features that facilitate modifying mathematical structures so as to efficiently correct the kinds of mathematical structure mistakes that are described in the preceding two paragraphs. Below, the present specification will define specific terms pertaining to structure modifications; after that, the present specification will explain various features that facilitate structure modifications, along with other features that facilitate inputting mathematical structures.

Mathematical Structure Terminology

In an embodiment, for purposes of the interface behaviors described herein, the terms "mathematical text," "mathematical expression," and "expression" may refer to any contiguous portion of mathematical input entered by a user of a math input interface, whether or not such a contiguous portion of mathematical input is syntactically valid when considered in isolation. For example, if the user has typed "3+4," then the text 3+ is a mathematical expression. In an embodiment, for purposes of the interface behaviors described herein, the term "mathematical expression" may refer to a single character, but will not refer to empty text.

In an embodiment, the "first portion of a mathematical structure" consists of the portion of that structure that a user may type before pressing the key that causes the mathematical structure to be created and that may then automatically become part of the mathematical structure when the mathematical structure is created, if any such portion exists. In particular, in a math input interface that has a fraction bar key, the first portion of a fraction consists of the fraction's numerator, because when a user presses the fraction bar key, a mathematical expression that the user typed before pressing the fraction bar key may automatically become the new fraction's numerator. Many mathematical structures do not have first portions; for example, square roots and exponents do not have first portions.

In an embodiment, the "last portion of a mathematical structure" consists of the portion of that structure that a user will typically type after creating the mathematical structure, and after any cursor navigation that involves moving between different portions of the mathematical structure, if any such portion exists. For example, the last portion of a fraction is its denominator. The last portion of a square root consists of the entire radicand (but does not include the square root symbol itself); the last portion of the exponent 2 consists of the entire numeral 2.

In an embodiment, a "portion of a mathematical structure" is a first portion of a mathematical structure, or a last portion of a mathematical structure, or any similar distinct subsection of a mathematical structure within which a user can input mathematical text.

Below, the present specification discusses various means of expediting the entry and editing of fractions that are written in textbook notation, in some embodiments. Generally, except as otherwise specified, any reference to a "fraction" refers to a fraction that is written in textbook notation, and is thus a mathematical structure according to the definition used in the present specification. Thus, except as otherwise specified, a "fraction" consists of a horizontal fraction bar along with its numerator and denominator. A "numerator" is the mathematical expression immediately above a fraction bar if such an expression is present, or the space above the fraction bar if no mathematical expression is immediately above the fraction bar. If no mathematical expression is immediately above the fraction bar, the fraction will be said to have an "empty numerator." A "denominator" is the mathematical expression immediately below the fraction bar if such an expression is present, or the space below the fraction bar if no mathematical expression is immediately below the fraction bar. If no mathematical expression is immediately below the fraction bar, the fraction will be said to have an "empty denominator." However, the specification specifies circumstances where a "fraction" is not written in textbook notation and is not a mathematical structure, in an embodiment.

In the present specification, when an example is given of a fraction that has an empty numerator or empty denominator, the empty numerator or denominator will be visually indicated by an empty box, as in this example:

$$\frac{1}{\square}.$$

Such empty boxes are included in the present specification for clarity. It is to be understood that in various embodiments, the interface may actually use such an empty box as a visual indicator of an empty numerator or empty denominator, or may provide a different visual indicator for an empty numerator or empty denominator, or may leave an empty numerator or empty denominator entirely blank with no visual indicator at all.

Below, in descriptions of structure modification features, when any character, symbol, structure, or location is said to be "before" or "after" some other character, symbol, structure, or location, or when a character, symbol, structure, or location is said to be "between" two other characters, symbols, structures, or locations, it is to be understood that in an embodiment, for purposes of structure modification features, the characters, symbols, structures, and locations within a mathematical expression are considered to be in the sequence in which they would typically be written by hand. Therefore, a character that is said to be "before" some other character is not necessarily to the left of that other character. In particular, a fraction's numerator is considered to be before its fraction bar, which is before its denominator. A square root symbol is considered to be before the square root's radicand. For example, even though a portion of the square root symbol in the expression $\sqrt{x+1}-2$ extends farther to the right than the letter x, the square root symbol is still considered to be before the letter x. In an embodiment, for purposes of structure modification features, when a mathematical expression is displayed on multiple lines due to wordwrap or an analogous feature, everything on an upper line is considered to be before everything on a lower line. For example, even if a line break occurs between the square root and the minus sign in the expression $\sqrt{x+1}-2$ and so the minus sign is farther to the left than the square root, the minus sign is still considered to be after the square root, and is still considered to be between the square root and the numeral 2.

In an embodiment, for purposes of structure modification features, distinct mathematical expressions that are included within the same larger mathematical expression are said to be "separated" from each other if and only if one of the expressions is within a portion of a mathematical structure that the other expression is not within. For example, in the expression $\sqrt{(5-6)}$ the parentheses are separated from each other because the left parenthesis is within a radicand that the right parenthesis is not within. If a structure modification is said to "separate" two or more mathematical expressions, this means that the structure modification moves one or more of these expressions into or out of a portion of a mathematical structure without moving all of them into or out of that portion of a mathematical structure.

Structure Modifications

Application to Other Types of Mathematical Structures

Below, in the explanation of various means of structure modification, numerous examples will be provided of structure modifications that move mathematical text into or out of fractions, square roots, and exponents, in some embodiments. Fractions, square roots, and exponents are used in these examples because fractions, square roots, and exponents are among the most commonly encountered types of mathematical structures. Previously, in the specification of U.S. Pat. No. 8,788,548, a feature was described that may cause an interface to automatically exit a fraction, square root, or exponent in certain circumstances; a nearly identical feature will be referred to as "the automatic structure exiting feature" in the present specification.

In light of the following explanation of various means of structure modification, those of ordinary skill in the art will understand how to generalize any means of structure modification that can move mathematical text into or out of fractions, square roots, and exponents so as to also be able to move mathematical text into or out of other types of mathematical structures that are not fractions, square roots, or exponents. For example, cube roots are very similar to square roots, and any example of a structure modification that moves mathematical text into or out of a square root is obviously analogous to an example that moves mathematical text into or out of a cube root. Likewise, any example of a structure modification that moves mathematical text into or out of an exponent is obviously analogous to an example that moves mathematical text into or out of a subscript. Furthermore, those of ordinary skill in the art will understand that the automatic structure exiting feature may also be applied to other types of mathematical structures that are not fractions, square roots, or exponents.

For many types of mathematical structures, including square roots, each mathematical structure of that type will consist of a special symbol denoting the mathematical structure and a "last portion of the mathematical structure" as defined above, and nothing else. For any such type of mathematical structure, each means of structure modification described herein may be useful if it moves mathematical text into or out of a last portion of a mathematical structure. For any such type of mathematical structure, the automatic structure exiting feature may be applicable, in an embodiment.

For a few types of mathematical structures, most notably including fractions, each mathematical structure of that type will have a "first portion of the mathematical structure" as defined above. Below, various means of structure modification are described that move mathematical text into or out of a numerator, in some embodiments. Such means of structure modification are described herein in terms of moving mathematical text into or out of a numerator because numerators are the most common type of "first portion of a mathematical structure." However, those of ordinary skill in the art will understand how to generalize any such means of structure modification so as to also be able to move mathematical text into or out of any first portion of a mathematical structure, not just a numerator. For example, $_5C_2$ can be verbally described as "5 choose 2." In an embodiment, the expression $_5C_2$ is treated as a single mathematical structure such that the numeral 5 is its first portion and the numeral 2 is its last portion, and for each means of structure modification described herein that can move mathematical text into or out of a numerator, the same means of structure modification or an analogous means of structure modification can move mathematical text into or out of the subscript that precedes the letter C in an expression such as $_5C_2$.

Even in an embodiment that has structure modification features that are described herein, a type of mathematical structure may exist that does not have a first portion or a last portion as defined above, and even for any type of mathematical structure that does have a first portion and/or last portion, the structure modification features that are described herein do not necessarily need to be applied to that type of mathematical structure, and the automatic structure exiting feature does not necessarily need to be applied to that type of mathematical structure either. For example, in an embodiment, the expression $_5C_2$ is a mathematical structure that has a first portion and a last portion, but none of the structure modification features described herein apply to that type of mathematical structure, and the interface does not automatically exit that type of mathematical structure.

Structure Modification Nomenclature

Farther below, various features are described that may move mathematical text into and/or out of mathematical structures, in some embodiments. Specifically, such features may cause the interface to perform "structure modifications" as defined herein. Specific terms that are used for structure modifications may indicate the target, direction, complexity, desirability, and size of the structure modifications, as explained in the following paragraphs.

In an embodiment, the target of a structure modification is either a first portion of a mathematical structure (usually a numerator) or a last portion of a mathematical structure. The direction of a structure modification is either expansion or contraction: that is, a structure modification eithers moves mathematical text into the target portion of a mathematical structure or moves mathematical text out of the target portion of a mathematical structure. Therefore, every structure modification may be classified as a "numerator expansion" which moves mathematical text into the first portion of a mathematical structure, a "numerator contraction" which moves mathematical text out of the first portion of a mathematical structure, a "structure expansion" which moves mathematical text into the last portion of a mathematical structure, or a "structure contraction" which moves mathematical text out of the last portion of a mathematical structure.

(Although a numerator expansion may be referred to in the present specification as a "structure modification," a numerator expansion generally will not be referred to as a "structure expansion," because a "structure expansion" is defined to be a structure modification that expands the last portion of a mathematical structure, and a numerator is not a last portion of a mathematical structure. Likewise, a numerator contraction generally will not be referred to as a "structure contraction.")

In an embodiment, in some cases, a structure modification will affect another mathematical structure in addition to its primary target. In some cases, a structure modification that affects two mathematical structures may be classified as either a numerator expansion or a structure contraction depending on which of the two mathematical structures is viewed as the primary target of the structure modification. In other cases, a structure modification that affects two mathematical structures may be classified as either a structure expansion or numerator contraction depending on which of the two mathematical structures is viewed as the primary target of the structure modification.

Some structure modifications change the contents of only a single mathematical structure; other structure modifications are more complex. In an embodiment, every structure modification will be classified as a "simple structure modification," "interchanging structure modification," "compound structure modification," or "improper structure modification." These terms are defined below. In an embodiment, any change that does not fit into any of these four classifications as described below does not constitute a "structure modification" for purposes of the structure modification functionality that is described herein, even if it is a change that could be achieved by performing consecutive structure modifications. For example, in an embodiment, converting $$\sqrt{1+2} + \frac{3}{4} \text{ to } \sqrt{1} + \frac{2+3}{4}$$

is not a structure modification of any kind, even though it could be achieved by performing a simple structure contraction and then a simple numerator expansion.

In an embodiment, a structure modification that is possible may still produce a result that a user is relatively unlikely to desire, such as if the structure modification introduces a mathematical syntax error. Farther below, criteria are defined for classifying possible structure modifications as either "valid" or "invalid"; valid structure modifications are further classified as "normal" or "abnormal."

Sorting Structure Modifications by Size

In some cases, a larger structure modification may be described herein as consisting of a sequence of smaller structure modifications. When a larger structure modification is described in this way, this means that in an embodiment, the larger structure modification achieves the result that would be achieved if each of the smaller structure modifications were performed in sequence, regardless of whether the larger structure modification achieves this result by means of actually performing each of the smaller structure modifications in sequence or whether it achieves this result by a more direct means. For example, after the present specification explains how moving a single character from before a fraction into the fraction's numerator constitutes a "simple numerator expansion," the present specification says, "Any sequence of two or more simple numerator expansions of the same numerator is itself a simple numerator expansion." This means that in an embodiment, moving two or more characters from before a fraction into the fraction's numerator is a simple numerator expansion, regardless of whether this result is achieved by moving the characters one at a time in sequence or by moving the characters simultaneously.

Below, the "smallest possible numerator expansion" is defined for various circumstances. Generally, in an embodiment, every possible expansion of a given numerator in any given circumstances that is not the smallest possible expansion of that numerator consists of performing a smallest possible expansion of that numerator some particular number of consecutive times. (However, as is explained in the preceding paragraph, an expansion of a given numerator that is not the smallest possible expansion of that numerator need not necessarily be achieved by means of actually performing these smallest possible numerator expansions one at a time.)

In an embodiment, a possible expansion of a numerator is considered to be "smaller" than another possible expansion of that numerator if it consists of fewer consecutive smallest possible expansions of that numerator. For example, the numerator expansion that converts $$-1 + \frac{3}{4} \text{ to } -\frac{1+3}{4}$$

consists or two consecutive smallest possible numerator expansions, and the numerator expansion that converts $$-1+\frac{3}{4} \text{ to } \frac{-1+3}{4}$$

consists of three consecutive smallest possible numerator expansions, so the former numerator expansion is smaller than the latter.

In an embodiment, for any two distinct possible expansions of the same numerator, it will be the case that one of the possible numerator expansions is considered to be smaller than the other. This means that expansions of a particular numerator can be sorted by size, and it is thus possible to determine the "smallest" expansion of a particular numerator that fits certain criteria. Similarly, it will also be possible to determine the smallest contraction of a particular numerator that fits certain criteria, or the smallest expansion of a particular structure that fits certain criteria, or the smallest contraction of a particular structure that fits certain criteria. Various features that perform structure modifications will be described in such terms: for example, a numerator initialization key is described in the specification such that in certain circumstances an actuation of the numerator initialization key causes the interface to perform the smallest expansion of a particular numerator that is a "valid" structure modification as defined below.

In an embodiment, in order to determine the smallest numerator expansion of a particular numerator that fits certain criteria, the interface will first determine whether or not the smallest possible numerator expansion fits the criteria, and if it does not then the interface will determine whether or not the numerator expansion that consists of twice consecutively performing the smallest possible numerator expansion fits the criteria, and then it will check the numerator expansion that consists of three times consecutively performing the smallest possible numerator expansion, and so on, until either the interface finds a possible numerator expansion that fits the criteria, or until no more numerator expansions are possible. For example, in order to determine the smallest valid numerator expansion of the numerator in the expression $$(1+2)+\frac{3}{4},$$

the interface may first determine that the numerator expansion that would convert the expression to $$(1+2)\frac{+3}{4}$$

is not valid, and then determine that the numerator expansion that would convert the expression to $$(1+2)\frac{+3}{4}$$

is not valid, and so on, until eventually it determines that the numerator expansion that would convert the expression to $$\frac{(1+2)+3}{4}$$

is valid; since no smaller numerator expansion was valid, this is the smallest valid numerator expansion. Those of ordinary skill in the art will understand that various other means are possible for determining the smallest numerator expansion that fits certain criteria; for example, an algorithm that determines the smallest valid numerator expansion can be made more efficient by causing it to skip any numerator expansion that would move a right parenthesis into a numerator without moving its corresponding left parenthesis, since any such numerator expansion would be invalid anyway. Similarly, those of ordinary skill in the art will understand that the interface can determine the smallest structure expansion of a particular last portion of a mathematical structure that fits certain criteria by means of checking possible structure expansions one at a time beginning with the smallest to see whether they fit the criteria, or by some other means.

In an embodiment, in some cases repeatedly performing the smallest possible numerator contraction will never yield the emptying numerator contraction. (The term "emptying numerator contraction" is defined below.) However, in such cases, repeatedly performing the smallest possible numerator contraction will yield each numerator contraction that is possible that is not the emptying numerator contraction, and the emptying numerator contraction is considered to be the largest possible numerator contraction, so numerator contractions can still be arranged in sequence from smallest to largest and it is still possible to determine the smallest numerator contraction of a particular numerator that fits certain criteria by means of checking possible numerator contractions one at a time beginning with the smallest to see whether they fit the criteria, or by some other means. Likewise, even though in some cases consecutively performing the smallest possible structure contraction repeatedly will never yield the emptying structure contraction, structure contractions can still be arranged in sequence from smallest to largest and it is still possible to determine the smallest structure contraction of a particular last portion of a mathematical structure that fits certain criteria by means of checking possible structure contractions one at a time beginning with the smallest to see whether they fit the criteria, or by some other means.

Simple Structure Modifications

Essentially, a "simple structure modification" moves mathematical text into or out of a mathematical structure without modifying any other mathematical structure. For example, converting $$1+\frac{2}{\Box} \text{ to } \frac{1+2}{\Box}$$

is a "simple numerator expansion": it moves two characters into the fraction's numerator, without changing anything else. Simple structure modifications are defined more precisely in the following paragraphs.

In an embodiment, for purposes of the present discussion of structure modifications, the input cursor counts as a character. Throughout the present discussion of structure modifications, when examples are provided that do not explicitly specify the location of the input cursor, it is to be understood that the input cursor is located somewhere where it will have no effect. For example, if the input cursor were located immediately before the fraction in the expression $$\sqrt{1+2}+\frac{3}{4},$$

then the smallest possible numerator expansion of the numerator in that expression would consist of simply moving the input cursor into the numerator, but the following paragraph asserts that the smallest possible numerator expansion of the numerator in this expression consists of something else; the example in the following paragraph thus includes the implicit assumption that the input cursor is located somewhere else, where it will have no effect.

In an embodiment, when a fraction is immediately preceded by a character or a mathematical structure and the fraction is not separated from the character or structure, the smallest possible numerator expansion consists of moving that character or that mathematical structure with all its contents into the fraction's numerator, at the beginning. Such a numerator expansion is a "simple numerator expansion." For example, the smallest possible numerator expansion of the numerator in the expression $$\sqrt{1+2}+\frac{3}{4}$$

is a simple numerator expansion that converts the expression to $$\sqrt{1+2}\frac{+3}{4}.$$

If that numerator expansion occurs, then subsequently the smallest possible numerator expansion of the numerator in the resulting expression $$\sqrt{1+2}\frac{+3}{4}$$

is a simple numerator expansion that converts the expression to $$\frac{\sqrt{1+2}+3}{4}.$$

In an embodiment, any sequence of two or more simple numerator expansions of the same numerator is itself a simple numerator expansion. For example, converting $$\sqrt{1+2}+\frac{3}{4}$$

directly to $$\frac{\sqrt{1+2}+3}{4}$$

is a simple numerator expansion.

In an embodiment, a simple numerator expansion cannot for example convert $$\sqrt{1+2}+\frac{3}{4} \text{ to } \sqrt{1+\frac{2+3}{4}},$$

because a simple numerator expansion cannot move the numeral 2 out of the square root mathematical structure that it was within. There is no single structure modification that converts $$\sqrt{1+2}+\frac{3}{4} \text{ to } \sqrt{1+\frac{2+3}{4}}.$$

Likewise, in an embodiment, when a first mathematical structure that has a last portion is immediately followed by a character or a second mathematical structure and the first mathematical structure is not separated from the character or second mathematical structure, the smallest possible structure expansion consists of moving that character or that second mathematical structure with all its contents into the last portion of the first mathematical structure, at the end. Such a structure expansion is a "simple structure expansion." Also, any sequence of two or more simple structure expansions of the same last portion of a mathematical structure is itself a simple structure expansion.

In an embodiment, when a fraction's numerator is not empty, a simple numerator contraction is possible that moves the first character or mathematical structure that is in the fraction's numerator to immediately before the fraction, without moving that character or structure into or out of any mathematical structure other than the fraction. In most cases, the simple numerator contraction that moves the first character or mathematical structure out of a fraction's numerator is the smallest possible numerator contraction; however, in some cases the smallest possible numerator contraction is instead an interchanging numerator contraction, as explained below. Any sequence of two or more simple numerator contractions of the same numerator is itself a simple numerator contraction.

Likewise, in an embodiment, when the last portion of a mathematical structure is not empty, a simple structure contraction is possible that moves the last character or mathematical structure that is in the last portion of the mathematical structure to immediately after the mathematical structure, without moving the character or structure into or out of any other mathematical structure. In most cases, that simple structure contraction is the smallest possible structure contraction; however, in some cases the smallest possible structure contraction is instead an interchanging structure contraction, as explained below. Any sequence of two or more simple structure contractions of the same last portion of a mathematical structure is itself a simple structure contraction.

In an embodiment, an "emptying numerator contraction" is a simple numerator contraction that moves everything out of a fraction's numerator to immediately before the fraction. A "non-emptying numerator contraction" is any numerator contraction that is not an emptying numerator contraction. For any given numerator, an emptying numerator contraction is always considered to be a larger numerator contraction than any non-emptying numerator contraction. An "emptying structure contraction" is a simple structure contraction that moves everything out of the last portion of a mathematical structure to immediately after the mathematical structure. A "non-empty structure contraction" is any structure contraction that is not an emptying structure contraction. For any given last portion of a mathematical structure, an emptying structure contraction is always considered to be a larger structure contraction than any non-emptying structure contraction.

In some math input interfaces, a mathematical identifier that actually consists of multiple characters may be treated like a single character for editing purposes. For example, on some graphing calculators, when a user presses the cosine key the interface will yield "cos(", and although this result includes four distinct text characters it is treated like a single character for editing purposes, so for example it is not possible to delete any of these four characters without deleting all four. In an embodiment, for purposes of the present discussion of structure modifications, any reference to a "character" should be understood to refer to either a single character or a mathematical identifier that actually consists of multiple characters but is treated like a single character for editing purposes. For example, the above explanation of simple numerator expansions should also be understood to mean that in an embodiment where "cos("is treated like a single character, the smallest possible numerator expansion of cos ( $$\frac{3}{\Box}$$

converts it to $$\frac{\cos(3}{\Box},$$

and is a simple numerator expansion.

Interchanging Structure Modifications

In an embodiment, if a portion of mathematical text is both within the first portion of one mathematical structure and within the last portion of another mathematical structure, then it must be the case that either that first portion is itself contained within that last portion, or vice versa. Essentially, an "interchanging structure modification" interchanges the relationship of such a first portion and such a last portion: if the first portion was contained within the last portion, then the last portion becomes contained within the first portion; if the last portion was contained within the first portion, then the first portion becomes contained within the last portion. For example, in the expression $$\sqrt{\frac{3}{4}},$$

the numeral 3 is within a numerator (which is the first portion of a fraction) that is itself contained within a radicand (which is the last portion of a square root); in the expression $$\frac{\sqrt{3}}{4},$$

the numeral 3 is within a radicand that is itself contained within a numerator. Converting $$\sqrt{\frac{3}{4}} \text{ to } \frac{\sqrt{3}}{4}$$

or vice versa constitutes an interchanging structure modification. Interchanging structure modifications are defined more precisely in the following paragraphs.

In the following paragraphs, an "outer structure" is a mathematical structure that contains some other mathematical structure before a structure modification occurs; in describing the results of a structure modification, such a structure will still be referred to as "the outer structure" even after the structure modification causes it to no longer contain that other mathematical structure. Similarly, an "inner structure" is a mathematical structure that is contained within some other mathematical structure before a structure modification occurs, and such a structure will be still be referred to as "the inner structure" even after the structure modification causes it to no longer be contained within that other mathematical structure.

In an embodiment, for purposes of the present explanation of interchanging structure modifications, if the last portion of an outer structure contains nothing except an inner structure, and that inner structure has a first portion, then the contents of that first portion of an inner structure constitute "the doubly enclosed expression." For example, in the expression $$\sqrt{\frac{3}{4}},$$

the last portion of the square root (the radicand) contains nothing except an inner fraction, and the fraction has a first portion (the numerator), so the contents of that numerator (the numeral 3) constitute "the doubly enclosed expression." In such circumstances, an "interchanging structure modification" consists of causing the last portion of the outer structure to contain only the doubly enclosed expression (rather than containing the entire inner structure) and causing the first portion of the inner structure to contain the entire outer structure (rather than containing only the doubly enclosed expression). Such an interchanging structure modification may be classified as an "interchanging numerator expansion" and may also be classified as an "interchanging structure contraction." Such an interchanging structure modification is both the smallest possible expansion of that numerator and the smallest possible contraction of that last portion of the outer structure. For example, an interchanging structure modification that modifies the expression $$\sqrt{\tfrac{3}{4}}$$

consists of causing the radicand to contain the numeral 3 (rather than containing the fraction) and causing the numerator to contain the entire square root (rather than containing only the numeral 3), thus yielding the result $$\tfrac{\sqrt{3}}{4}.$$

As another example, in the expression $$\tfrac{\tfrac{1}{2}}{3},$$

the last portion or the outer structure (its denominator) contains nothing except the inner structure ⅔, which has a first portion (its numerator 2), so the contents of that numerator (the numeral 2) constitute "the doubly enclosed expression." An interchanging structure modification that modifies this expression consists of causing the outer structure's denominator to contain only the numeral 2 (rather than containing the entire fraction ⅔) and causing the inner structure's numerator to contain the entire outer structure (rather than containing only the numeral 2), thus yielding the result $$\tfrac{1}{\tfrac{2}{3}}.$$

In an embodiment, if the first portion of an outer structure contains nothing except an inner structure, and that inner structure has a last portion, then the contents of that last portion of an inner structure constitute "the doubly enclosed expression." In such circumstances, an "interchanging structure modification" consists of causing the first portion of the outer structure to contain only the doubly enclosed expression (rather than containing the entire inner structure) and causing the last portion of the inner structure to contain the entire outer structure (rather than containing only the doubly enclosed expression). Such an interchanging structure modification may be classified as an "interchanging structure expansion" and also may be classified as an "interchanging numerator contraction," and is the smallest possible expansion of that last portion of the inner structure and the smallest possible contraction of that numerator. For example, an interchanging structure modification that modifies the expression $$\tfrac{\sqrt{3}}{4}$$

consists of causing the numerator to contain only the numeral 3 (rather than containing the entire square root) and causing the radicand to contain the entire fraction (rather than containing only the numeral 3), thus yielding the result $$\sqrt{\tfrac{3}{4}}.$$

As another example, an interchanging structure modification that modifies the expression yields $$\tfrac{1}{\tfrac{2}{3}}$$

the result $$\tfrac{\tfrac{1}{2}}{3}.$$

Compound Structure Modifications

In an embodiment, a "proper structure modification" is a simple structure modification, interchanging structure modification, or compound structure modification. A "compound structure modification" is essentially a combination of consecutive simple and interchanging structure modifications.

In an embodiment, a "compound numerator expansion" is a single structure modification that consists of two or more consecutive expansions of the same numerator such that each of the consecutive expansions is a simple numerator expansion or an interchanging numerator expansion, and such that at least one of the consecutive expansions is an interchanging numerator expansion. For example, after a user has entered $$\sqrt{3+\sqrt{\tfrac{4}{\square}}},$$

three consecutive expansions of the same numerator could convert the user's input to $$\sqrt{3+\tfrac{\sqrt{4}}{\square}},$$

then $$\sqrt{\tfrac{3+\sqrt{4}}{\square}},$$

and then $$\tfrac{\sqrt{3+\sqrt{4}}}{\square},$$

and so a single compound numerator expansion can directly convert the user's input to $$\frac{\sqrt{3+\sqrt{4}}}{\Box}.$$

Similarly, in an embodiment, a "compound numerator contraction" is a single structure modification that consists of two or more consecutive contractions of the same numerator such that each is a non-emptying simple numerator contraction or an interchanging numerator contraction and at least one is an interchanging numerator contraction. For example, converting $$\frac{\sqrt{3+\sqrt{4}}}{\Box} \text{ to } \sqrt{3+\sqrt{\frac{4}{\Box}}}$$

is a compound numerator contraction. Likewise, a "compound structure expansion" is a single structure modification that consists of two or more consecutive expansions of the same last portion of a mathematical structure such that each is a simple or interchanging structure expansion and at least one is an interchanging structure expansion, and a "compound structure contraction" is a single structure modification that consists of two or more consecutive contractions of the same last portion of a mathematical structure such that each is a non-emptying simple structure contraction or interchanging structure contraction and at least one is an interchanging structure contraction.

Improper Structure Modifications in an embodiment, a "proper structure modification" is a simple structure modification, interchanging structure modification, or compound structure modification.

In an embodiment that behaves as described above, when an inner fraction is within an outer mathematical structure, unless the fraction is at the end of the last portion of the outer structure so that an interchanging or compound numerator expansion may cause the fraction to no longer be contained in the outer structure, the outer structure will constrain the expansion of the fraction's numerator so that no proper numerator expansion can cause the fraction to contain the outer structure or anything outside the outer structure. Similarly, when an inner mathematical structure that has a last portion is within an outer mathematical structure, unless the inner structure is a fraction that is at the beginning of the first portion of the outer structure so that an interchanging or compound structure expansion may cause the inner structure to no longer be contained in the outer structure, the outer structure will constrain the expansion of the last portion of the inner structure so that no proper structure expansion can cause the inner structure to contain the outer structure or anything outside the outer structure.

In an embodiment, even when no proper numerator expansion is possible for a particular numerator, in certain circumstances an improper numerator expansion will be possible that consists of a "prerequisite component modification" that modifies an outer structure in such a way that a proper numerator expansion becomes possible, followed by an "unblocked component modification" that is a proper numerator expansion. Similarly, in an embodiment, even when no proper structure expansion is possible for a particular last portion of a mathematical structure, in certain circumstances an improper structure expansion will be possible that consists of a "prerequisite component modification" that modifies an outer structure in such a way that a proper structure expansion becomes possible, followed by an "unblocked component modification" that is a proper structure expansion. Improper numerator expansions and improper structure expansions are explained in detail in the following paragraphs.

In an embodiment, when an inner fraction is at the beginning of the last portion of an outer mathematical structure, if that last portion of an outer mathematical structure contains more than just the inner fraction, then the smallest possible numerator expansion of the inner fraction's numerator consists of a simple structure contraction of the outer mathematical structure that causes the last portion of the outer mathematical structure to contain only the inner fraction, followed by an interchanging numerator expansion. Such a numerator expansion is an improper numerator expansion. The "prerequisite component modification" of such a numerator expansion is the simple structure contraction of the outer mathematical structure that causes the last portion of the outer mathematical structure to contain only the inner fraction, and the unblocked component modification is the subsequent interchanging numerator expansion. For example, to perform a numerator expansion of the numerator in the expression $$\sqrt{\frac{3}{4}+5},$$

the prerequisite component modification would be a simple structure contraction that causes the square root to contain only the fraction, which would yield the result $$\sqrt{\frac{3}{4}}+5;$$

after the prerequisite component modification occurred, an interchanging numerator expansion would yield $$\frac{\sqrt{3}}{4}+5.$$

Therefore, the smallest possible numerator expansion of the numerator in the expression $$\sqrt{\frac{3}{4}+5}$$

is an improper numerator expansion that converts the result directly to $$\frac{\sqrt{3}}{4}+5.$$

(Such an improper numerator expansion may also be classified as a compound structure contraction; for example, converting $$\sqrt{\frac{3}{4}+5} \text{ to } \frac{\sqrt{3}}{4}+5$$

may be classified as an improper numerator expansion or as a compound structure contraction of the square root.)

In an embodiment, when an inner mathematical structure is at the end of the numerator of an outer fraction, if that numerator contains more than just the inner mathematical structure, then no structure expansion of the last portion of the inner mathematical structure is possible.

In an alternative embodiment, when an inner mathematical structure is at the end of the numerator of an outer fraction, if that numerator contains more than just the inner mathematical structure, then a structure expansion of the last portion of the inner mathematical structure is possible; the smallest such structure expansion consists of a simple numerator contraction of the outer fraction that causes the numerator to contain only the inner structure, followed by an interchanging structure expansion. Such a structure expansion is an improper structure expansion. The prerequisite component modification of such a structure expansion is the simple numerator contraction of the outer fraction that causes the numerator of the outer fraction to contain only the inner structure, and the unblocked component modification is the subsequent interchanging structure expansion. For example, in such an embodiment, an improper structure expansion of the square root converts $$\frac{5+\sqrt{4}}{3} \text{ to } 5+\sqrt{\frac{4}{3}}.$$

(Such an improper structure expansion may also be classified as a compound numerator contraction.)

In an embodiment, when an inner fraction is at the beginning of the numerator of an outer fraction, the only possible numerator expansions of the inner fraction's numerator are improper numerator expansions. Each such numerator expansion consists of a numerator expansion of the outer fraction's numerator followed by the largest possible proper numerator expansion of the inner fraction's numerator, so that the inner fraction still ends up at the beginning of the numerator of the outer fraction. In other words, when an inner fraction is at the beginning of the numerator of an outer fraction, the only possible numerator expansions of the inner fraction's numerator move mathematical text from outside the outer fraction directly into the inner fraction's numerator. The prerequisite component modification of any such numerator expansion is the numerator expansion of the outer fraction's numerator, and the unblocked component modification is the subsequent expansion of the inner fraction's numerator. For example, to perform the smallest possible numerator expansion of the inner fraction's numerator in the expression $$\frac{-\frac{1}{2}}{3},$$

the prerequisite component modification would be the smallest possible numerator expansion of the outer fraction's numerator, which causes the outer fraction's numerator to contain the negative sign, yielding the result $$\frac{-\frac{1}{2}}{3};$$

after the prerequisite component modification occurred, the largest possible proper numerator expansion of the inner fraction's numerator would yield $$\frac{\frac{-1}{2}}{3}.$$

Therefore, converting $$-\frac{\frac{1}{2}}{3}$$

directly to $$\frac{-\frac{1}{2}}{3}$$

is an improper numerator expansion of the inner fraction's numerator.

Similarly, in an embodiment, when an inner mathematical structure is at the end of the last portion of an outer mathematical structure, the only possible structure expansions of the last portion of the inner structure are improper structure expansions. Each such structure expansion consists of a structure expansion of the last portion of the outer structure followed by the largest possible proper expansion of the last portion of the inner structure, so that the inner structure still ends up at the end of the last portion of the outer structure. In other words, when an inner structure is at the end of the last portion of an outer structure, the only possible structure expansions of the last portion of the inner structure move mathematical text from outside the outer structure directly into the inner structure. The prerequisite component modification of such a structure expansion is the structure expansion of the last portion of the outer structure, and the unblocked component modification is the subsequent expansion of the last portion of the inner structure. For example, in such an embodiment, the smallest possible structure expansion of the inner square root in the expression $$\sqrt{5-\sqrt{2}}+2$$

is an improper structure expansion that yields the result $$\sqrt{5-\sqrt{2+}}\ 2;$$

a larger possible structure expansion of the inner square root is an improper structure expansion that yields the result $$\sqrt{5-\sqrt{2+2}}.$$

Any numerator expansion that consists of a sequence of consecutive expansions of the same numerator is an improper numerator expansion if any of its components is an improper numerator expansion. For example, a numerator expansion that converts 2+

$$\sqrt{\frac{3}{4}+5}$$

directly to $$\frac{2+\sqrt{3}}{4}+5$$

is an improper numerator expansion. Similarly, any structure expansion that consists of a sequence of consecutive expansions of the same last portion of a mathematical structure is an improper structure expansion if any of its components is an improper structure expansion.

Reversing Structure Modifications

Below, various features are described that may cause the interface to perform structure modifications, in some embodiments. In an embodiment, whenever a user performs a sequence of consecutive actions such that each of the consecutive actions invokes the same feature that causes the interface to perform a structure modification that has the same target, if one of the consecutive actions is an improper numerator expansion or improper structure expansion, then if a later one of the consecutive actions is a numerator contraction of the same numerator or a structure contraction of the same last portion of a mathematical structure, and if that numerator contraction or structure contraction reverses the effect of the unblocked component modification that was a component of the earlier improper numerator expansion or improper structure expansion, then the interface will also reverse the prerequisite component modification that was a component of that earlier improper numerator expansion or improper structure expansion.

For example, in an embodiment, if by means of the structure handle dragging feature that is described in the specification a user causes the interface to expand the inner square root in the expression $$\sqrt{\sqrt{1}+3}+5$$

to the greatest extent possible, thus yielding the result $$\sqrt{\sqrt{1+3+5}},$$

then if the user's next action is to contract that inner square root by means of the structure handle dragging feature so that the mathematical text +3+5 is moved back out of that square root, then rather than just moving those four characters out of the inner square root, the interface will then also move the last two characters out of the outer square root, thus yielding $$\sqrt{\sqrt{1}+3}+5$$

instead of $$\sqrt{\sqrt{1}+3+5}.$$

In an embodiment, whenever a user performs a sequence of consecutive actions such that each of the consecutive actions invokes the same feature that causes the interface to perform a structure modification that has the same target, any structure modification that would restore that target to the state it was in before the user performed the first of these consecutive actions is a valid and normal structure modification, even if it would be invalid or abnormal according to the rules that are specified below.

Valid and Invalid Structure Modifications

In the present specification, a structure modification is said to be "valid" for purposes of the structure modification functionality that is disclosed herein if and only if it is a possible structure modification and it is not "invalid." In the following paragraphs, various circumstances are specified in which a structure modification is invalid in some embodiments.

In an embodiment, a structure modification that moves nothing but the input cursor is invalid, so that whenever the interface performs the smallest valid structure modification that fits certain criteria (such as when it performs the smallest valid numerator expansion of a particular numerator), it will do more than just move the input cursor.

In an embodiment, a structure modification is invalid if the structure modification separates the digits of a numeral from each other. In an embodiment, a structure modification is invalid if the structure modification separates the letters of a mathematical identifier such as "cos" from each other. In an embodiment, a structure modification is invalid if the structure modification separates the whole number part of a mixed fraction from the fractional part of the mixed fraction.

In an embodiment, when an exponent is immediately preceded by its base, a structure modification is invalid if it separates the first character of the exponent from the exponent's base. In an embodiment, when a variable has a subscript, a structure modification is invalid if it separates the variable from the first character of its subscript. In an embodiment, when the identifier log is immediately followed by a subscript, a structure modification is invalid if it separates the identifier log from the first character of its subscript.

In an embodiment, a structure modification is invalid if the structure modification moves a numeral into or out of a mathematical structure in such a way that the numeral ceases to be identifiable as a distinct numeral. For example, a structure modification that converts $$\int \frac{dx}{2}$$

is invalid.

In an embodiment, a structure modification is invalid if it causes a mathematical expression to contain a new syntax error. In the following paragraphs, certain such structure modifications are explicitly identified as invalid in some embodiments.

In mathematical notation, it is syntactically valid for an integral symbol to correspond to a differential that is within a numerator that the integral symbol is not within; for example, in the expression $$1\frac{2}{3} \text{ to } \frac{12}{3}$$

it is syntactically valid for the integral symbol to correspond to the differential dx even though the differential is within a numerator that the integral symbol is not within. Other than that, in most cases, when it is syntactically necessary for a portion of mathematical text to correspond to some other portion of mathematical text, two portions of mathematical text do not correspond to each other if they are separated from each other. In an embodiment, for purposes the following paragraph, two portions of mathematical text will not be considered to correspond to each other if they are separated from each other, except in any special case where it is syntactically valid for the two portions to correspond to each other while separated; in particular, a left parenthesis and right parenthesis will not be considered to correspond to each other if they are separated from each other.

In an embodiment, if two portions of mathematical text (such as, for example, a left parenthesis and a right parenthesis) correspond to each other, then a structure modification is invalid if it separates these portions of mathematical text from each other in such a way as to cause these two portions of mathematical text to no longer correspond to each other. For example, a structure modification that converts $\sqrt{4}+(5-6)$ to $\sqrt{4+(5-6)}$ is invalid. In an embodiment, if an expression contains a syntax error because some portion of mathematical text fails to correspond to an appropriate later portion of mathematical text, then a structure modification is invalid if it moves that portion of mathematical text into a numerator, unless by doing so it causes that portion of mathematical text to correspond to an appropriate later portion of mathematical text. For example, a structure modification that converts $$\left(\frac{1}{2} \text{ to } \frac{(1)}{2}\right.$$

is invalid, but a structure modification that converts $$\left(\frac{1)}{2} \text{ to } \frac{(1)}{2}\right.$$

is valid.

In an embodiment, if the function identifier of a multivariable function is followed by a left parenthesis, and a comma is present later in the expression that would be parsed as a separator of the parameters of the multivariable function, then a structure modification is invalid if it separates the comma from the left parenthesis of the multivariable function. For example, a structure modification that converts $$f\left(x, \frac{y}{2}\right) \text{ to } f\left(\frac{x, y}{2}\right)$$

is invalid.

According to the rules of mathematical parsing, in order for a mathematical expression to constitute the operand of a mathematical operator or function, that mathematical expression must not be separated from the mathematical operator or function identifier. For example, in the expression $\sqrt{4}+5$, the operand that immediately precedes the plus sign is not the numeral 4, because the numeral 4 is within a square root that the plus sign is not within; the operand that immediately precedes the plus sign is the expression $\sqrt{4}$, which is itself a mathematical structure but is not within a mathematical structure that the plus sign is not within. As another example, in the expression $\sqrt{4+5}$, the plus sign is not immediately followed by any operand of the plus sign: the numeral 5 is not an operand of the plus sign because the numeral 5 is not within a square root that the plus sign is within. Similarly, in the expression $\sqrt{\sin}\ x$, the sin function identifier is not immediately followed by any operand of the sine function. For purposes of the present specification, an empty fraction or other empty structure template may constitute the operand of a mathematical operator or function.

In an embodiment, when a mathematical operator is immediately preceded by an operand of the operator, a structure modification is invalid if it moves the operator into or out of a mathematical structure in such a way that the operator is no longer immediately preceded by an operand. In an embodiment, as an exception to the rule described in the preceding sentence, when a minus sign is immediately preceded by an operand that ends with a right parenthesis, a structure modification that moves the minus sign into a fraction's numerator without moving the operand that preceded the minus sign is not necessarily invalid. (However, even if such a structure modification is valid, it may be "abnormal," as discussed below.)

In an embodiment, when a mathematical operator or function identifier is immediately followed by an operand of the operator or function, a structure modification is invalid if it moves the operator or function identifier into or out of a mathematical structure in such a way that the operator or function identifier is no longer immediately followed by an operand. For example, a structure modification that converts $\sqrt{4}+5$ to $\sqrt{4+5}$ is invalid because prior to the modification the plus sign is immediately followed by the operand 5 but after the modification the numeral 5 no longer constitutes an operand of the plus sign and so the plus sign is no longer immediately followed by an operand. However, a structure modification that converts $\sqrt{4}+$ to $\sqrt{4+}$ is valid, because in such a case the plus sign is not immediately followed by an operand even when the structure modification has not occurred. As another example, a structure modification that converts $$\log\frac{\square}{\square} \text{ to } \frac{\log\square}{\square}$$

is invalid because prior to the modification the log function identifier is immediately followed by an empty fraction, which constitutes an operand of the logarithm function, but after the modification the log function identifier is no longer immediately followed by an operand.

In an embodiment, for purposes of the rule described in the preceding paragraph, an operator is considered to be "immediately followed by an operand" if either the operator is immediately followed by an operand according to the ordinary rules of mathematical parsing or else the operator is immediately followed by the input cursor (and the operator is not separated from the input cursor). In such an embodiment, whether a particular structure modification is valid or invalid may depend on whether or not it moves the input cursor in addition to moving other mathematical text. For example, in such an embodiment, if the input cursor is at the end of the expression $\sqrt{4}+$, then a structure modification that converts this expression to $\sqrt{4+}$ is valid if and only if it moves the input cursor into the square root in addition to moving the plus sign into the square root.

In an embodiment, a structure modification is invalid if it causes a portion of a mathematical structure to become completely empty, so that it does not contain any mathematical text and does not contain the input cursor.

In an embodiment, when a relational operator such as $=$ or $<$ is not within any mathematical structure, a structure modification is invalid if it moves the relational operator into a mathematical structure.

Figure 26B:
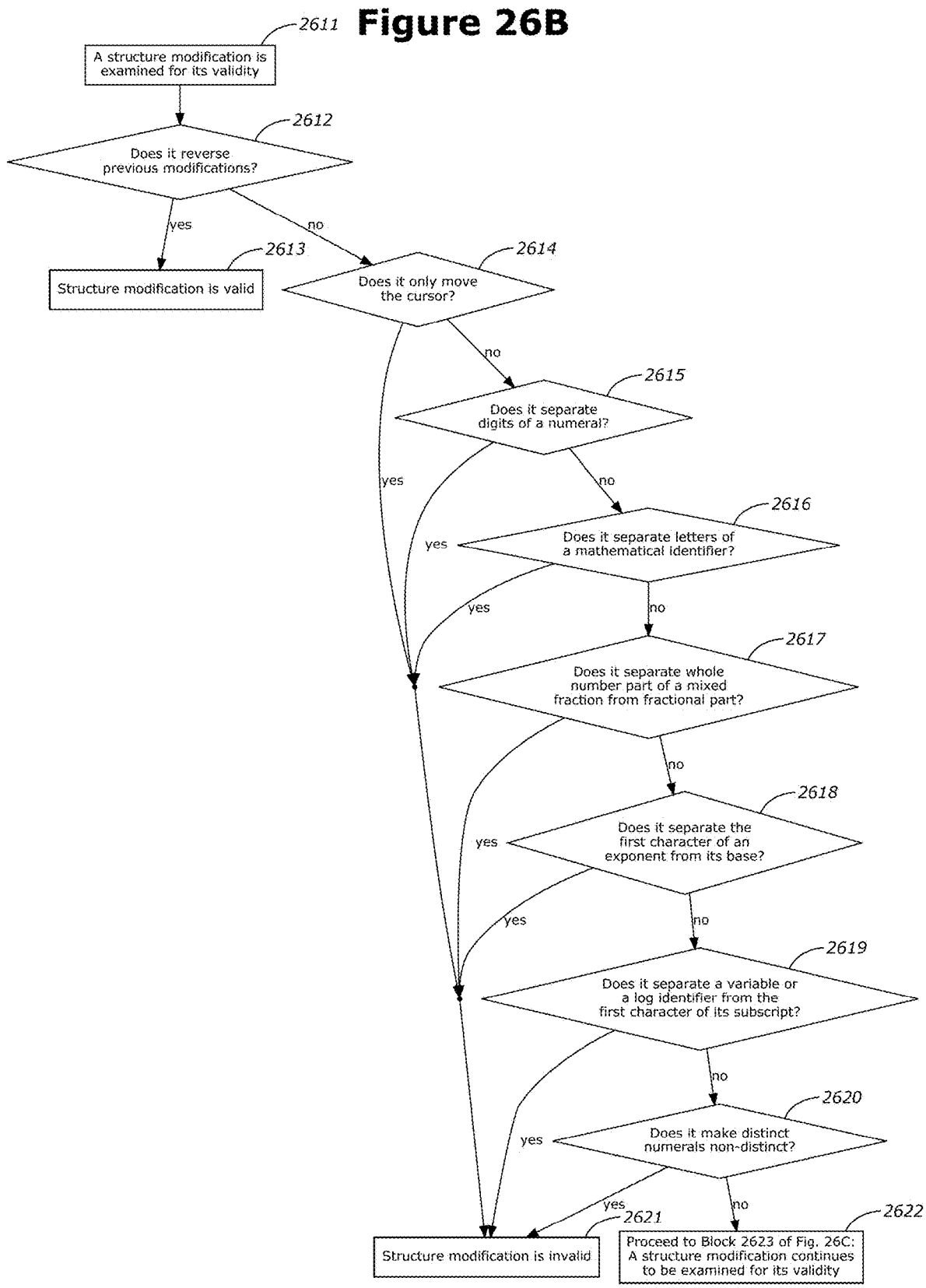
FIGS. 26B and 26C are flowcharts that together illustrate evaluating a structure modification's validity, according to an embodiment.
Figure 26C:
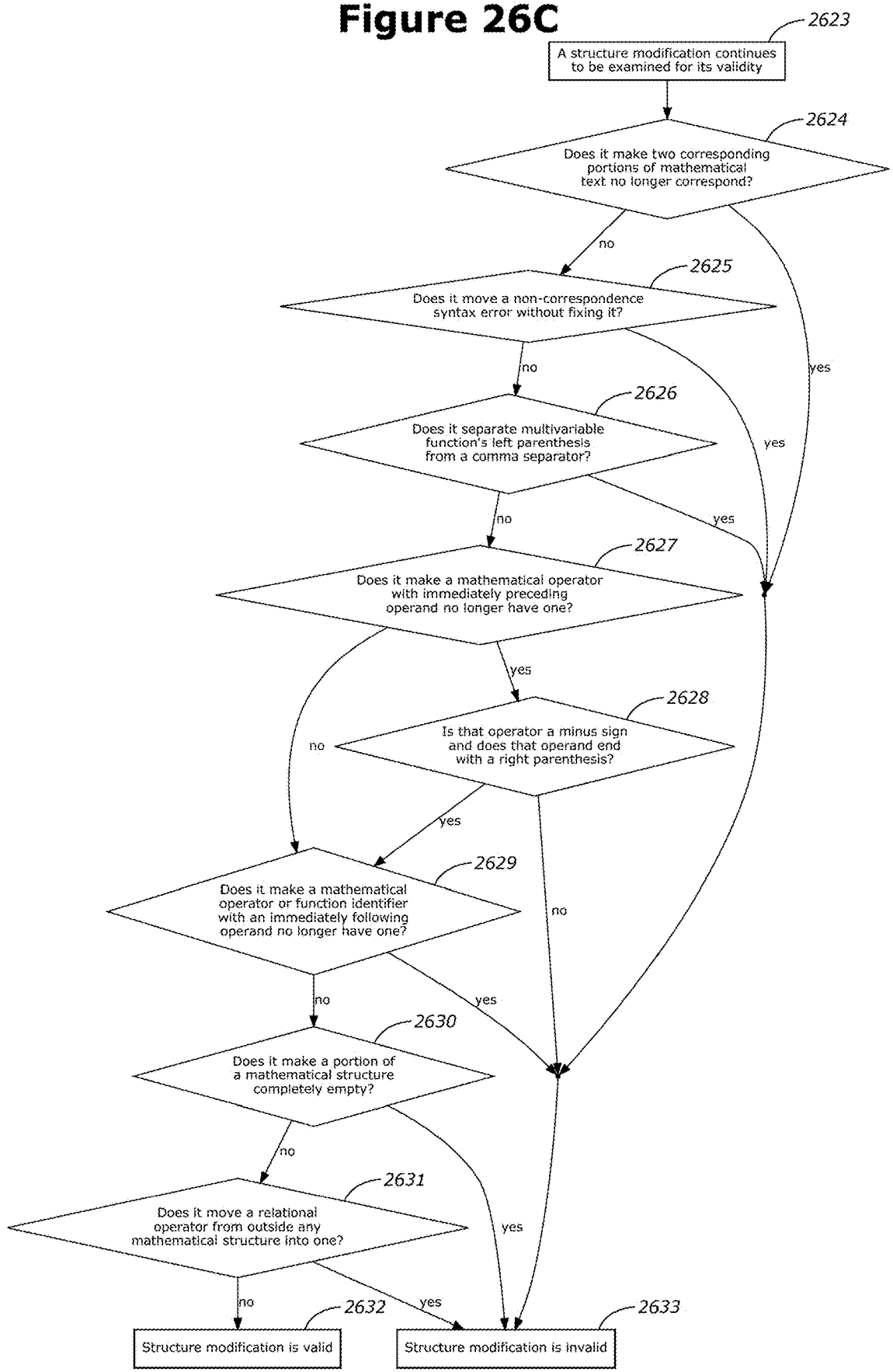

FIGS. 26B and 26C are flowchart that together illustrate the above-described process of evaluating a structure modification's validity. The process begins in Block 2611 of FIG. 26B, which states, "A structure modification is examined for its validity" and proceeds to Block 2612, which asks, "Does it reverse previous modifications?" If the answer is yes, then the structure modification is valid (Block 2613). If the answer is no, the evaluation process continues with a series of seven questions. In each case, if the answer to the question is yes, then the structure modification is invalid (Block 2621). If the answer is no, the process continues with the next question until all questions have been answered (Blocks 2614-2620). If the answer to all seven questions is no, then the evaluation process continues with Block 2623 of FIG. 26C (Block 2622).

FIG. 26C begins at Block 2623, which states, "A structure modification continues to be examined for its validity." The evaluation process continues with a series of three questions. In each case, if the answer to the question is yes, then the structure modification is invalid (Block 2633). If the answer is no, the process continues with the next question (Blocks 2624-2626). If the answer to all three questions is no, then the evaluation process continues with Block 2627, which asks, "Does it make a mathematical operator with immediately preceding operand no longer have one?" If the answer to the question in Block 2627 is yes, then the process continues with Block 2628, which asks, "Is that operator a minus sign and does that operand end with a right parenthesis?" If the answer is no, then the structure modification is invalid (Block 2633). But if either the answer to the question in Block 2627 is no or if the answer to the question in Block 2628 is yes, then the process continues a series of three questions starting in Block 2629 (Blocks 2629-2631). In each case, if the answer to the question is yes, then the structure modification is invalid (Block 2633). If the answer to all three questions is no, then the structure modification is valid (Block 2632).

Other structure modifications that cause a mathematical expression to contain a new syntax error, and that may thus be invalid in some embodiments, may be evident to those of ordinary skill in the art.

Normal and Abnormal Structure Modifications

In the present specification, a structure modification is said to be "normal" if and only if it is a valid structure modification and it is not "abnormal" according to any of the criteria specified in the following paragraphs.

In an embodiment, a structure modification that is an improper structure modification as defined above is abnormal. For example, in an embodiment, a numerator expansion that converts $$\sqrt{\frac{3}{4}+5} \text{ to } \frac{\sqrt{3}}{4}+5$$

is abnormal (although a structure contraction that has the same effect is normal).

In an embodiment, when a minus sign is immediately preceded by an operand that ends with a right parenthesis, a structure modification is abnormal if it moves the minus sign into a fraction's numerator without moving the operand that preceded the minus sign.

For purposes of the following paragraph, "consecutive factors" are any two or more expressions such that the expressions are adjacent to one another with no intervening operators in such a way that the rules of mathematical parsing dictate that the expressions are to be multiplied by each other, except that for purposes of the following paragraph, a mathematical structure does not count as a consecutive factor for purposes of a structure modification that moves mathematical text into or out of that mathematical structure. For example, in the expression $\sqrt{2}x(y-4)\cdot z$, the three expressions $\sqrt{2}$, x, and (y−4) are all consecutive factors, except that the expression $\sqrt{2}$ does not count as a consecutive factor for purposes of a structure modification that moves mathematical text into or out of that square root; the expression z is not a consecutive factor under any circumstances because it is separated from the other expressions by an intervening dot operator.

In an embodiment, a structure modification is abnormal if it splits up a set of two or more consecutive factors by moving one or more of the consecutive factors into or out of a fraction or a square root or other radical without moving the entire set of consecutive factors into or out of the mathematical structure. For example, in such an embodiment, a structure modification that converts $\sqrt{2}x(y-4)\cdot z$ to $\sqrt{2x}(y-4)\cdot z$ is abnormal because it splits up the two consecutive factors x and (y−4) by moving one of them into a square root without moving both of them into the square root. As another example, a structure modification that converts $\sqrt{2x}$ to $\sqrt{2}x$ is abnormal. In an embodiment, as an exception, a structure modification is normal if it splits up a set of two or more consecutive factors by moving one or more of the consecutive factors out of a fraction's denominator without moving the entire set of consecutive factors out of the fraction's denominator if the result is that the fraction contains no letters and the fraction is immediately followed by a letter; for example, in an embodiment, a structure modification that converts $$\frac{1}{2x} \text{ to } \frac{1}{2}x$$

is normal.

In an embodiment, a structure modification is abnormal if it moves mathematical text into or out of a fraction's numerator in such a way that the resulting fraction is immediately preceded by a trigonometric function identifier and the resulting fraction contains in its numerator a trigonometric function identifier or a degree symbol or both. For example, in such an embodiment, a structure modification that converts $$\sin x + \frac{\sin y}{2} \text{ to } \sin\frac{x + \sin y}{2}$$

is abnormal.

In an embodiment, a structure modification is abnormal if by moving mathematical text out of a portion of a mathematical structure it causes the portion of a mathematical structure to contain nothing except the input cursor.

FIG. 26A is a flowchart that illustrates the process of evaluating a structure modification that is described above. The process begins in Block 2601, which states, "A structure modification is examined for its normality" and proceeds to Block 2602, which asks, "Is it valid?" (See FIG. 26B for an illustration of the process of evaluating a structure modification's validity.) If the answer is no, the structure modification is abnormal (Block 2609). If the answer is yes, the evaluation process continues with Block 2603, which asks, "Is it an improper structure modification?" If the answer is yes, the structure modification is abnormal (Block 2609). If the answer is no, the evaluation process continues with Block 2604, which asks, "Does it move into a numerator a minus sign that was preceded by a right parenthesis?" Once again, if the answer is yes, then the structure modification is abnormal (Block 2609). If the answer is no, the evaluation process continues with Block 2605, which asks, "Does it separate consecutive factors?" If the answer is yes, the process continues with Block 2606, which asks, "Does it do so by moving all letters out of a denominator?" If the answer to the question in Block 2606 is no, then then the structure modification is abnormal (Block 2609).

Continuing with the explanation of FIG. 26A, if the answer to the question in Block 2605 is no or if the answer to the question in Block 2606 is yes, then the evaluation process continues with Block 2607, which asks, "Does it cause a fraction to be preceded by a trig function identifier and contain in its numerator a trig function identifier or degree symbol?" If the answer is yes, then the structure modification is abnormal (Block 2609). If the answer is no, the last evaluation question is asked in Block 2608, "Does it make a portion of a mathematical structure contain nothing but the input cursor?" If the answer to this question is yes, then the structure modification is abnormal (Block 2609). If the answer is no, then the structure modification is normal (Block 2610).

Prefix Structures and Fractions

In an embodiment, for purposes of structure modification features described herein, a "prefix structure" is a mathematical structure such that it is syntactically invalid for the mathematical structure to be at the end of a numerator. In particular, the base of a logarithm is a prefix structure, because an expression such as $$\frac{\log_2}{2}$$

is syntactically invalid: to ne syntactically valid, the logarithm function identifier must be immediately followed by an operand. For similar reasons, the three letters lim with appropriate mathematical text below them constitute a prefix structure, a definite integral symbol with its accompanying limits constitutes a prefix structure, and a Sigma mathematical structure constitutes a prefix structure. Other prefix structures will be evident to those of ordinary skill in the art.

In an embodiment, when the last portion of a prefix structure contains nothing except a single fraction, if an interchanging structure contraction of the prefix structure occurs or if an interchanging numerator expansion of the fraction occurs, then immediately after applying the usual effects of the interchanging structure modification, the interface will move the prefix structure out of the fraction's numerator, to the left of the fraction. For example, in an embodiment, an interchanging structure contraction or interchanging numerator expansion in the expression $$\log_{\frac{2}{\Box}}$$

will yield $$\log_2 \frac{\Box}{\Box}.$$

In an embodiment, this is a valid structure modification. After such a structure modification, no further numerator expansion of that fraction's numerator is valid, since any further numerator expansion would cause the prefix structure to be at the end of a numerator, which is syntactically invalid. In an embodiment, immediately after such an interchanging structure modification, for purposes of the user's next action a second interchanging structure modification may reverse the effects of the first interchanging structure modification as though the prefix structure had not been moved out of the fraction's numerator, and such an interchanging structure modification is valid and normal; for example, after an interchanging numerator expansion of the fraction in the expression $\log_{2/\Box}$ yields $$\log_2 \frac{\Box}{\Box},$$

the user s next action may cause a numerator contraction that yields $\log_{2/\Box}$.

Structure Editing Improvements

Expelling Characters from Structures

In an embodiment, when a user types a character that is the last character within the last portion of a mathematical structure, if moving that character out of the mathematical structure would constitute a normal structure modification as defined above, then that character is "expulsion-eligible" for purposes of the interface behaviors described below.

Similarly, in an embodiment, if the input cursor is within and at the end of the last portion of a mathematical structure when a user actuates the fraction bar key, and if expanding the numerator of the new fraction so as to cause it to contain the mathematical structure would constitute a valid numerator expansion, then this actuation of the fraction bar key constitutes "typing an expulsion-eligible fraction bar" for purposes of the interface behaviors described below. For example, in an embodiment, if the input cursor is within the square root and after the 4 in the expression √4 when a user actuates the fraction bar key, then this constitutes typing an expulsion-eligible fraction bar, but if the input cursor is within the square root and after the plus sign in the expression √4+ when the user actuates the fraction bar key, then this does not constitute typing an expulsion-eligible fraction bar, because when a user has typed the expression $$\sqrt{4+\frac{\square}{\square}},$$

there is no valid numerator expansion that expands the numerator of the new fraction so as to cause it to contain the square root.

In an embodiment, when a character is expulsion-eligible, if it is syntactically invalid for that character to be included in the mathematical structure (and would be even if it were followed by an operand) and it would be syntactically valid for that character to be immediately after the mathematical structure, then that character is also "expulsion-mandatory." For example, in an embodiment, an equals sign that is the last character within the last portion of a square root mathematical structure is expulsion-mandatory, because it is not syntactically valid for an equals sign to be included in a square root (if it is not within a Sigma mathematical structure that is within the square root, or within some other similar type of mathematical structure that is within the square root). As another example, in an embodiment, if the input cursor is within the square root and after the 4 in the expression (1+√4 when the user types a right parenthesis, that right parenthesis is expulsion-mandatory because it is not syntactically valid for the right parenthesis to be in the square root where it would not be considered to correspond to the left parenthesis, and it would be syntactically valid for that right parenthesis to be immediately after the square root.

In an embodiment, in certain circumstances that are described below, an actuation of the fraction bar key may constitute "typing an expulsion-mandatory fraction bar."

In an embodiment, when a user types an expulsion-eligible character within the last portion of a mathematical structure, in certain circumstances the interface may decide to immediately "expel" that character, which means that the interface moves the character out of the mathematical structure so that it is the first character after the mathematical structure. Because the interface will as usual position the input cursor immediately after the character the user just typed, expelling the character will also cause the interface to move the input cursor out of the mathematical structure. The circumstances in which the interface will expel an expulsion-eligible character are explained below.

Similarly, in an embodiment, when a user types an expulsion-eligible fraction bar, in certain circumstances the interface may decide to immediately "expel the fraction bar," which means that the interface performs the smallest normal numerator expansion that would cause the new fraction's numerator to contain the mathematical structure. For example, if the input cursor is within the square root and after the 4 in the expression √4 when a user actuates the fraction bar key, and if the interface decides to immediately expel the fraction bar, then the interface will immediately convert the result from $$\sqrt{\frac{4}{\square}} \text{ to } \frac{\sqrt{4}}{\square}.$$

The circumstances in which the interface will decide to expel a fraction bar are explained below.

In an embodiment, when a user types an expulsion-eligible character that the interface automatically expels as described above, the interface will not show an intermediate result in which the expulsion-eligible character is included within the mathematical structure, but will only show the result in which the expulsion-eligible character is after the mathematical structure. In such an embodiment, when a user types an expulsion-eligible character that the interface immediately expels, it may seem to the user that the interface exited the mathematical structure before processing the character the user typed. Similarly, in an embodiment, when a user types an expulsion-eligible fraction bar that the interface automatically expels as described above, the interface will not show an intermediate result, and it may seem to the user that the interface exited the mathematical structure before creating the new fraction.

In fact, although the interface behavior that constitutes expelling a character from a mathematical structure is described above in terms of first inserting a character at the input cursor location and then moving both the character and the input cursor out of the mathematical structure, the exact same behavior may instead be implemented in terms of first moving the input cursor out of the mathematical structure and then inserting the character of the input cursor location, which is how such behavior is described in U.S. Pat. No. 8,788,548. In some places, such behavior is referred to herein in terms of "automatically exiting" a mathematical structure rather than in terms of expelling a character. Likewise, in some places the interface behavior that constitutes expelling a fraction bar is referred to herein in terms of automatically exiting a mathematical structure. The reason that this behavior is described above in terms of expelling a character or fraction bar is that such an explanation makes it more clear that undoing or altering the decision to expel a character or fraction bar may move the character or fraction bar back into the mathematical structure.

In an embodiment, when the interface expels a character or fraction bar, its decision to do so constitutes an interface intervention as defined in the specification, so if the user's next action is an actuation of the Undo key then the interface may return the character or fraction bar to within the mathematical structure, as explained in the specification. In an alternative embodiment, when a user types an expulsion-eligible character and the interface immediately expels that character, for purposes of undo functionality this will actually be treated as though the interface first made the decision to automatically move the input cursor out of the mathematical structure and then inserted the character into the user's input at the new cursor location, which means that if the user's next action is an actuation of the Undo key then the interface may undo the entry of the character rather than undoing its expulsion from the mathematical structure.

Automatic Structure Exiting

In an embodiment, when a user types a character or actuates the fraction bar key, if prior to that the user's most recent action was a cursor navigation action, then the interface will not expel the character or fraction bar. In particular, if the interface is in a bipositional entry mode as described below when a user actuates the left arrow key in order to cause the interface to exit the bipositional entry mode, and if the user's next action is typing a character, then the interface will not expel that character even if it is an expulsion-mandatory character.

In an embodiment, except as specified in the preceding paragraph, when a user types a character or fraction bar that is expulsion-mandatory, the interface will decide to expel that character or fraction bar. In an embodiment, this decision will be an alterable decision with a very low probability of alteration.

In an embodiment, when a user performs an action that causes the interface to create a new mathematical structure, if the same action also causes the input cursor to become located in the last portion of the new mathematical structure, then the new mathematical structure becomes "expulsion-eligible." Such an embodiment will be said to have the "automatic structure exiting feature." For example, if an actuation of the fraction initialization key causes the interface to create a new fraction and to move the cursor into the denominator of the new fraction, then the new fraction becomes expulsion-eligible. In an embodiment, whenever the input cursor is fully outside of the last portion of a mathematical structure that was expulsion-eligible, the structure ceases to be expulsion-eligible.

In an alternative embodiment that does not have the automatic structure exiting feature, for purposes of the interface behaviors that are described below, mathematical structures are never expulsion-eligible.

In an embodiment, except as specified above, when a user types a character that is expulsion-eligible within a mathematical structure that is expulsion-eligible, the interface will decide to expel that character. For example, in an embodiment, when a user has typed $\sqrt{(1+3)}$, the input cursor is within and at the end of the square root, the square root is expulsion-eligible, and the user's most recent action was not a cursor navigation action, if the user's next action is an actuation of the plus key then the plus sign character is expulsion-eligible because moving the plus sign out of $\sqrt{(1+3)}+$ would constitute a normal structure modification, so the interface will expel the plus sign, yielding $\sqrt{(1+3)}+$.

Similarly, in an embodiment, except as specified above, when a user types an expulsion-eligible fraction bar, if the input cursor is within and at the end of the last portion of a mathematical structure that is expulsion-eligible, then the interface will (after creating the new fraction) immediately decide to expel the fraction bar as described above. For example, in an embodiment, when a user has typed $\sqrt{(1+3)}$, the input cursor is within and at the end of the square root, the square root is expulsion-eligible, and the user's most recent action was not a cursor navigation action, if the user's next action is an actuation of the fraction bar key, then the interface will first create a new fraction, at which point the result will be $$\sqrt{\frac{(1+3)}{\Box}},$$

and then the interface will immediately decide to expel the fraction bar, yielding $$\frac{\sqrt{(1+3)}}{\Box}.$$

In an embodiment, whenever the input cursor is within the last portion of an expulsion-eligible mathematical structure and it is the case that typing a plus sign would cause the interface to expel the plus sign as described above, the interface will be in a "bipositional entry mode," and the interface will display the input cursor in a special location in order to visually indicate that the next character that is entered may or may not be placed within a mathematical structure, just as the multimode math input interface described in U.S. Pat. No. 8,788,548 does when that interface is in a bipositional entry mode. However, when the interface is in a bipositional entry mode, if this causes the interface to display the input cursor in such a way that the cursor appears to be only partially within the expulsion-eligible mathematical structure, then the input cursor will still be considered to be entirely within the last portion of the expulsion-eligible mathematical structure for purposes of the behaviors that are described herein. In an embodiment, if a user actuates the left arrow key when the input cursor is displayed in such a special location, then the mathematical structure will cease to be expulsion-eligible and the interface will exit bipositional entry mode, so it will no longer be the case that typing a plus sign would cause the interface to automatically exit the mathematical structure, and so the input cursor will no longer be displayed in a special location; pressing the left arrow key in such circumstances will have no other effect.

The multimode math input interface that is disclosed in U.S. Pat. No. 8,788,548 has a feature such that when the input cursor is within and at the end of the last portion of a mathematical structure, in certain circumstances the interface will enter a special bipositional entry mode such that if the user's next action is typing a character, depending on the particular bipositional entry mode that the interface is in and the particular character the user types, the interface may or may not automatically move the input cursor out of the mathematical structure before inserting the character into the user's input. The automatic structure exiting feature described above causes the same interface behavior as that previously described feature in most circumstances, but causes different behavior in certain circumstances, and is described above using different terminology than was used in U.S. Pat. No. 8,788,548 so as to facilitate explaining other interface improvements that are described herein.

Alterable Structure Exiting

In an embodiment, whenever a user types a character or fraction bar that is expulsion-eligible but not expulsion-mandatory within a mathematical structure, the interface's decision whether or not to expel the character from the mathematical structure will be an alterable decision. Such an embodiment will be said to have "the alterable structure exiting feature." When such an alterable decision is in response to typing a character that is expulsion-eligible but not expulsion-mandatory, it is an "alterable structure exiting decision." When it is in response to typing a fraction bar that is expulsion-eligible but not expulsion-mandatory, it is an "alterable fraction initialization decision" that is an "alterable fraction bar expulsion decision"; other types of alterable fraction initialization decisions are explained farther below.

In an embodiment, as an exception, when a user types a character or fraction bar that is expulsion-eligible within a mathematical structure, if the user's most recent previous action either was a cursor navigation action that moved the input cursor into the mathematical structure or was an actuation of the left arrow key that caused the mathematical structure to cease to be expulsion-eligible, then the interface's decision not to expel the character from the mathematical structure will not be an alterable decision unless the character is expulsion-mandatory.

In an embodiment, if the input cursor is at the end of the alterable block of an alterable structure exiting decision when altering the decision causes the interface to move that alterable block into the last portion of the relevant mathematical structure, the interface will move the input cursor itself into the mathematical structure also if this is necessary in order for the movement of the alterable block to constitute a valid structure modification, but will not move the input cursor into the mathematical structure otherwise. An example of this distinction is given in the following paragraph.

In an embodiment, the alterable block of an alterable structure exiting decision will initially contain only the expulsion-eligible character the user typed, but such a decision is an alterable input state decision as defined farther above and so in certain circumstances its alterable block may continue to grow. For example, in an embodiment, the keystroke sequence [square root] 4+ yields $\sqrt{4}+$. At this point, the alterable block of the alterable structure exiting decision contains only the plus sign. If the user alters the decision at this point, the interface will move the plus sign into the square root, and it will also move the input cursor into the square root because this is necessary in order for the movement of the alterable block to constitute a valid structure modification. If the user does not alter the decision at this point but instead presses the 5 key, then the result will be $\sqrt{4}+5$, and the numeral 5 will also become contained in the alterable block. Altering the alterable structure exiting decision at this point will yield $\sqrt{4+5}$, and will not cause the interface to move the input cursor into the square root because the movement of the alterable block constitutes a valid structure modification regardless.

In an embodiment, an alterable structure exiting decision may become a multi-alternative alterable input state decision, as follows: if the input cursor is at the end of the alterable block of an alterable structure exiting decision when a user types a character that then becomes contained in the alterable block, then if that character would be expulsion-eligible but not expulsion-mandatory if it were the last character in the relevant mathematical structure, then the alterable structure exiting decision will gain an alternate option such that if the option becomes selected then everything in the alterable block before that character will be included in the mathematical structure, but that character and everything after it will not be included in the mathematical structure. For example, in an embodiment that has the automatic structure exiting feature, if a user types the keystroke sequence [square root] 1+3+5, the interface will yield $\sqrt{1}+3+5$. During that keystroke sequence, the first time the user presses the plus key the interface makes an alterable structure exiting decision that initially has a single alternate option; later, the alterable block of the decision grows, so that first alternate option eventually becomes $\sqrt{1+3+5}$. The second time the user presses the plus key, the resulting plus sign character would have been expulsion-eligible but not expulsion-mandatory if it had been the last character in the square root, so the alterable structure exiting decision gains a second alternate option, which eventually becomes $\sqrt{1+3}+5$. Similarly, in an embodiment that does not have the automatic structure exiting feature, if a user types the keystroke sequence [square root] 1+3+5, the interface will yield $\sqrt{1+3+5}$, and an alterable structure exiting decision will exist that has the two alternate options $\sqrt{1}+3+5$ and $\sqrt{1+3}+5$. (The specification explains features that may facilitate selecting a particular desired option of a multi-alternative alterable input state decision, and in that explanation, a multi-alternative alterable input state decision with the three options $\sqrt{1}+3+5$, $\sqrt{1+3+5}$, and $\sqrt{1+3}+5$ is used as an example in several places.)

In an embodiment, if the input cursor is at the end of the alterable block of an alterable structure exiting decision when a user types a character that would be expulsion-mandatory if it were the last character in the relevant mathematical structure, then that character will not be included in the alterable block of the alterable structure exiting decision and so that alterable block will permanently cease to grow (if it had not already ceased to grow). For example, in an embodiment, the keystroke sequence [square root] 1+234=will yield $\sqrt{1}+234=$, and the alterable block of the alterable structure exiting decision will include the plus sign and the numeral 234 but not include the equals sign.

If an embodiment with the alterable structure exiting feature also has the automatic structure exiting feature as described above, then the interface will be quite similar to the multimode math input interface described in U.S. Pat. No. 8,788,548, but when the interface automatically exits the mathematical structure, its decision to do so will in most cases be alterable. Conversely, if an embodiment with the alterable structure exiting feature does not have the automatic structure exiting feature as described above, then the interface will not automatically exit a mathematical structure unless a user types a character that is expulsion-mandatory, but in many cases its decision to not automatically exit a mathematical structure will be alterable. For example, in an embodiment that has the alterable structure exiting feature, the keystroke sequence [square root] 4+5 will initially yield $\sqrt{4}+5$ if the interface has the automatic structure exiting feature or will initially yield $\sqrt{4+5}$ if it does not, but in either case an alterable structure exiting decision will exist such that the two options of the decision are $\sqrt{4}+5$ and $\sqrt{4+5}$. The alterable structure exiting feature may thus be a useful mistake correction feature whether or not the interface also has the automatic structure exiting feature.

The Fraction Initialization Key

In various interfaces, including the multimode math input interface disclosed in U.S. Pat. No. 8,788,548, actuating a certain key will cause the interface to create a new fraction and may also cause the interface to move previously typed input into the new fraction's numerator. Such a fraction creation key is a "fraction bar key" as defined in the specification. Typically, in an interface that has a fraction bar key, when the fraction bar key is actuated, the interface will determine what if anything would constitute the dividend of the division operator if a division operator were inserted into the user's input at the input cursor location, and if such a potential dividend exists, then the interface will include that potential dividend in the numerator of the new fraction, and will move the input cursor into the denominator of the new fraction. For example, in various interfaces the keystroke sequence 1/will yield the result $$\frac{1}{\square}.$$

(In the preceding sentence, and throughout the present specification, a forward slash character in a keystroke sequence represents the fraction bar key.)

In an embodiment of the present invention, the computing device has a fraction initialization key such that a first actuation of the key will cause the interface to create a new fraction, but in certain circumstances multiple consecutive actuations of the key will cause the interface to create only one fraction: each consecutive actuation of the fraction initialization key after the first actuation will if possible modify the numerator of the fraction that was created in response to the first actuation, as described below.

In an embodiment, when the interface creates a new fraction in response to an actuation of the fraction initialization key, the interface will initialize the new fraction as follows: First, the interface will insert an empty fraction template at the input cursor location and move the input cursor into the new fraction's numerator. Second, the interface will determine whether a normal simple expansion of the new fraction's numerator is possible, and if a normal simple expansion of the new fraction's numerator is possible then the interface will perform the smallest normal simple numerator expansion. In an embodiment, after thus initializing the new fraction, in certain circumstances the interface may expel the fraction bar, as is described above.

In an embodiment, when in response to an actuation of the fraction initialization key the interface creates a fraction and performs the smallest normal simple numerator expansion, the result that would have obtained if the interface had left the new fraction's numerator empty (rather than performing the smallest normal simple numerator expansion) will constitute a "skipped expansion result" for purposes of the alterable fraction initialization decisions that are described below. Also, in such circumstances, the interface will remember as a skipped expansion result any result that would have obtained if it had performed a smaller numerator expansion of the fraction's numerator that would have been a valid but abnormal numerator expansion. For example, the keystroke sequence x+yz/ will yield the result $$x + \frac{yz}{\Box};$$

alter such a Keystroke sequence, the interface will remember the skipped expansion result $$x + yz\frac{\Box}{\Box}$$

and the skipped expansion result $$x + y\frac{z}{\Box}.$$

As another example, the keystroke sequence x+/ will yield the result $$x + \frac{\Box}{\Box}$$

because no normal simple expansion of the fraction's numerator in the expression $$x + \frac{\Box}{\Box}$$

is possible, and after such a Keystroke sequence the interface will not remember any skipped expansion result.

In an embodiment, as an exception, when the interface creates a fraction, if the mathematical expression the user has typed thus far includes a space character that is not immediately after a function identifier, then after the interface inserts an empty fraction template at the input cursor location, if moving everything between the space character and the empty fraction template into the new fraction's numerator would constitute a valid simple numerator expansion, then the interface will do so, rather than creating a fraction as described in the preceding paragraph. In an embodiment, when the interface does so, it will remember as a skipped expansion result any result that would have obtained if it had performed a smaller numerator expansion of the fraction's numerator that would have been a valid numerator expansion. In an embodiment, the interface will then delete the space character. For example, in an embodiment, the keystroke sequence x+y+z/ will yield $$x + \frac{y+z}{\Box};$$

the keystroke sequence 2 3/4 will yield $$2\frac{3}{4}.$$

In an embodiment, if the input cursor is in the numerator of an empty fraction template when a numerator expansion causes that numerator to become nonempty, then the interface will move the input cursor into the fraction's denominator. Subsequently, until the user performs an action that does not cause a numerator expansion or numerator contraction of that particular numerator, any action that causes a numerator contraction that makes that numerator empty again will also cause the interface to move the input cursor back into the fraction's numerator. For example, in an embodiment, if the user types 2 and then actuates the fraction initialization key, the interface will create a new empty fraction template and immediately move the numeral 2 into its numerator, so the interface will move the input cursor into the fraction's denominator. If the user then immediately alters an alterable fraction initialization decision so as to cause the newly created fraction to have an empty numerator, then the interface will move the input cursor back into the fraction's numerator.

Numerator Cycling

In an embodiment, as a special case, after a first actuation of the fraction initialization key causes the interface to expel a fraction bar, if the user's next action is a second consecutive actuation of the fraction initialization key, then in response to that actuation of the fraction initialization key, rather than creating a new fraction, the interface will undo the expulsion of the fraction bar. Further consecutive actuations of the fraction initialization key may then cause the interface to cycle the numerator as described below. For example, in an embodiment, if the input cursor is within the square root and after the 4 in the expression 2+√4 when a user actuates the fraction initialization key, and the interface decides to expel the fraction bar and so this yields the result $$2 + \frac{\sqrt{4}}{\square},$$

then if the user then actuates the fraction initialization key a second consecutive time this will yield the result $$2 + \sqrt{\frac{4}{\square}}.$$

If the user then actuates the fraction initialization key a third and fourth consecutive time, these additional consecutive actuations will cause the interface to cycle the numerator as described below, yielding $$2 + \frac{\sqrt{4}}{\square}$$

again and then yielding $$\frac{2 + \sqrt{4}}{\square}.$$

In an embodiment, except in the circumstances described in the preceding paragraph, in response to an actuation of the fraction initialization key that is at least the second consecutive actuation of that key, rather than creating a new fraction, the interface will "cycle the numerator" of the fraction that was created the first consecutive time the fraction initialization key was actuated.

In an embodiment, when the interface cycles the numerator of a fraction, the interface will determine whether a normal expansion of the fraction's numerator is possible, and if so, then the interface will perform the smallest such numerator expansion, and the interface will remember as a skipped expansion result any result that would have obtained if it had performed a smaller numerator expansion of the fraction's numerator that would have been a valid but abnormal numerator expansion. For example, in an embodiment, after the keystroke sequence x+y+z/ yields the result $$x + y + \frac{z}{\square},$$

a second consecutive actuation of the fraction initialization key will convert the result to $$x + \frac{y + z}{\square},$$

and a third consecutive actuation of the fraction initialization key will convert it to $$\frac{x + y + z}{\square}.$$

In an embodiment, when the interface cycles the numerator of a fraction, if a normal expansion of the fraction's numerator is not possible, then the interface will determine whether a valid contraction of the fraction's numerator is possible, and if so, then the interface will perform the largest such valid numerator contraction, and the interface will remember as a skipped expansion result any result that would have obtained if it had performed a valid but abnormal numerator expansion. For example, cycling the numerator of the fraction in the expression $$\frac{x + y + z}{\square}$$

will yield the result $$x + y + \frac{z}{\square}.$$

In an embodiment, when the interface cycles the numerator of a fraction, if the interface performs a numerator contraction as described in the preceding paragraph, then the interface will enter a special slower numerator cycling mode for that fraction. As soon as the user performs any action that does not cause the interface to cycle the numerator of the same fraction, the interface will exit this special mode. While the interface is in this special mode, when the interface cycles the numerator of the fraction, the interface will determine whether a valid expansion of the fraction's numerator is possible, and if so, then the interface will perform the smallest such numerator expansion even if it is an abnormal numerator expansion: it will not skip any valid but abnormal numerator expansion. If a valid expansion of the fraction's numerator is not possible, then the interface will perform the largest valid contraction of the fraction's numerator, as described in the preceding paragraph. For example, in an embodiment, the keystroke sequence a+bcd/ will yield $$a + \frac{bcd}{\square},$$

after which a second consecutive actuation of the fraction initialization key will yield $$\frac{a + bcd}{\square},$$

a third consecutive actuation of the fraction initialization key will yield $$a + bc\frac{d}{\square},$$

and a fourth consecutive actuation of the fraction initialization key will yield $$a + b\frac{cd}{\square}.$$

Essentially, in such an embodiment, a user can pull into a new fraction's numerator as much or as little of the previously typed mathematical input as desired by actuating the fraction initialization key a certain number of times consecutively, provided that the desired result is syntactically valid.

In an embodiment, if a user actuates the fraction initialization key when the input cursor is positioned on a fraction bar, the interface will cycle the numerator of that fraction. For example, in an embodiment, the keystroke sequence x+y+z/w will yield $$x + y + \frac{z}{w},$$

and if the user then positions the input cursor on the fraction bar of the fraction z/w and actuates the fraction initialization key twice, the result will be $$\frac{x + y + z}{w}.$$

In an embodiment, after one or more consecutive actuations of the fraction initialization key that cause the interface to cycle the numerator of a fraction, if the user's next action is an actuation of the Escape key, then in response to that action, the interface will return the user's input to the state it was in immediately prior to the first of the consecutive actuations of the fraction initialization key that caused the interface to cycle the numerator of the fraction. Thus, if a user actuates the fraction initialization key two or more consecutive times and the first of these consecutive actuations causes the interface to create a new fraction and all the other consecutive actuations cause the interface to cycle that fraction's numerator, then if the user's next action is an actuation of the Escape key, the interface will return the user's input to the state it was in immediately after the actuation that caused the fraction to be created. If a user positions the input cursor on a fraction bar and actuates the fraction initialization key one or more consecutive times, and each of these actuations of the fraction initialization key cause the interface to cycle the fraction's numerator as described in the preceding paragraph, then if the user's next action is an actuation of the Escape key, the interface will return the user's input to the state it was in immediately before these actuations of the fraction initialization key.

Figure 27:
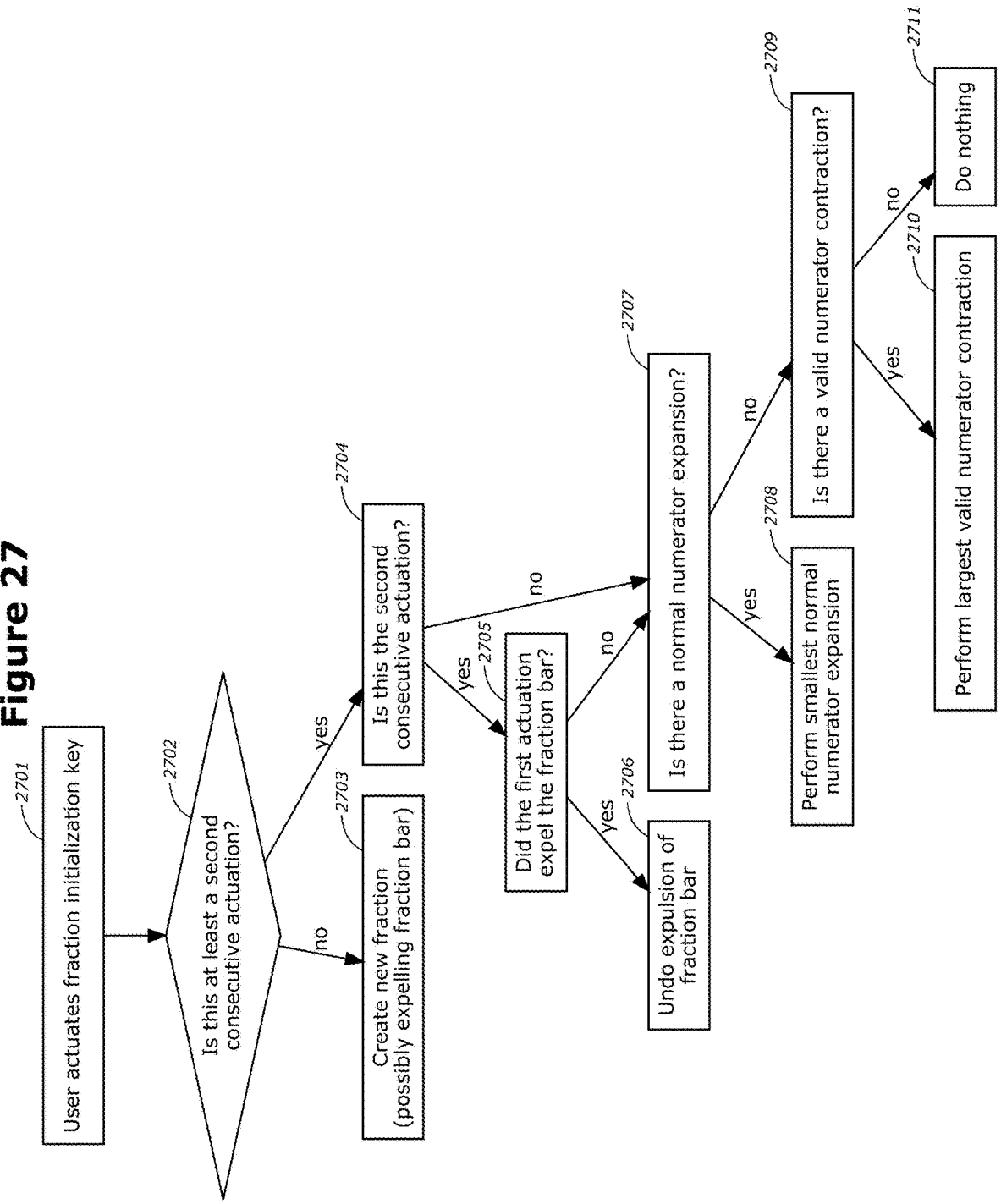
FIG. 27 is a flowchart that illustrates the results that occur when the user presses the fraction initialization key, in an embodiment that has a relatively simple version of the fraction initialization key, according to an embodiment.

FIG. 27 is a flowchart that illustrates the results that occur when the user presses the fraction initialization key, in an embodiment that has a relatively simple version of the fraction initialization key. The process beings with Block 2701, which says, "User actuates fraction initialization key" and proceeds to Block 2702, which asks, "Is this at least a second consecutive actuation?" If the answer is no, the interface creates a new fraction, which may cause the interface to move previously typed input into the new fraction's numerator, and may even cause the interface to expel the fraction bar as described above, thus moving a previously typed structure into the new fraction's numerator. If the answer is yes, the process continues with Block 2704, which asks, "Is this the second consecutive actuation?" If the answer is yes, the next question is in Block 2705, "Did the first actuation expel the fraction bar?" If the answer to this question is yes, then the interface will undo the expulsion of the fraction bar (Block 2706). If the answer to the question in Block 2704 or in Block 2705 is no, the process will continue with Block 2707, which asks, "Is there a normal numerator expansion?" If the answer is yes, then the interface will perform the smallest normal numerator expansion (Block 2708). If the answer is no, the process continues with Block 2709, which asks, "Is there a valid numerator contraction?" If the answer is yes, then the interface will perform the largest valid numerator contraction (Block 2710). If the answer is no, than the interface will do nothing (Block 2711).

Altering Fraction Initialization

In an embodiment, as is described above, when the interface makes an alterable decision whether or not to expel a fraction bar, such a decision is an "alterable fraction initialization decision" that is an "alterable fraction bar expulsion decision."

In an embodiment, after one or more consecutive actuations of the fraction initialization key, if the most recent of these actuations of the fraction initialization key caused the interface to remember one or more skipped expansion results as explained above, then the interface's decision to skip such expansion results is an alterable decision such that each of the skipped expansion results is an alternate option of this decision. Such a decision is an "alterable fraction initialization decision" that is an "alterable expansion decision." In an embodiment, any alternate option that consists of a skipped expansion result such that the newly created fraction would have an empty numerator will have a very low probability of alteration, lower than any other skipped expansion result. For example, in an embodiment, the keystroke sequence x+yz/ will yield the result $$x + \frac{yz}{\square},$$

and then an immediate actuation of the alteration key will convert the result to $$x + y\frac{z}{\square};$$

a second consecutive actuation of the alteration key will convert the result to $$x + yz\frac{\square}{\square}.$$

Because consecutive actuations of the fraction initialization key have a special effect, the fraction initialization key is a multi-click key. In an embodiment, after two or more consecutive actuations of the fraction initialization key, the interface's decision to respond to the last of the consecutive actuations of the fraction initialization key with its special multi-click effect is an alterable decision with a low probability of alteration. Such a decision is an "alterable fraction initialization decision" that is an "alterable multi-click decision." Altering such a decision will undo the key's special multi-click effect, which was a structure modification, and invoke the key's non-multi-click effect, which is the creation of a new fraction at the input cursor location. For example, in an embodiment, the keystroke sequence x+yz// will yield the result $$\frac{x+yz}{\Box},$$

and then altering the multi-click decision will convert the result to $$x+\frac{yz}{\frac{\Box}{\Box}}.$$

In an embodiment, three different types of alterable fraction initialization decisions are possible as described in the three preceding paragraphs. A first actuation of the fraction initialization key may cause the interface to make both an alterable fraction bar expulsion decision and an alterable expansion decision; an actuation of the fraction initialization key that is at least a second consecutive actuation may cause the interface to make both an alterable multi-click decision and an alterable expansion decision. In an embodiment, if in response to an actuation of the fraction initialization key the interface makes two types of alterable fraction initialization decisions, then the interface will combine these two alterable decisions into a single multi-alternative alterable decision. For example, in an embodiment, after a user types $\sqrt{4}$ and then actuates the fraction bar key, and the interface expels the fraction bar and so yields the result $$\frac{\sqrt{4}}{\Box},$$

the alternate options of the combined fraction initialization decision are $$\sqrt{\frac{4}{\Box}}$$

(which was the alternate option of an alterable fraction bar expulsion decision) and $$\sqrt{4\frac{\Box}{\Box}}$$

(which was the alternate option of an alterable expansion decision). As another example, in an embodiment, after the keystroke sequence xy+z// yields the result $$\frac{xy+z}{\Box},$$

the alternate options of the combined fraction initialization decision are $$x\frac{y+z}{\Box}$$

(which was the alternate option of an alterable expansion decision) and $$xy+\frac{z}{\frac{\Box}{\Box}}$$

(which was the alternate option of an alterable multi-click decision).

In an embodiment, after one or more consecutive actuations of the fraction initialization key cause an alterable fraction initialization decision to exist, if the user's next action is another consecutive actuation of the fraction initialization key, then the previously existing alterable fraction initialization decision will cease to exist. In other words, after any sequence of two or more consecutive actuations of the fraction initialization key, if any alterable fraction initialization decision exists, then it will pertain to the last of those consecutive actuations of the fraction initialization key. For example, in an embodiment, after a user inputs $$x+\frac{yz}{\Box}$$

by means of the keystroke sequence x+yz/ an alterable fraction initialization decision will exist such that altering the decision would yield the result $$x+y\frac{z}{\Box},$$

but if the user does not alter that decision and instead presses the fraction initialization key a second consecutive time, then that decision will be deleted; the result will be $$\frac{x+yz}{\Box},$$

and a new alterable fraction initialization decision will exist such that altering the decision would yield the result $$x+\frac{yz}{\frac{\Box}{\Box}}.$$

In an embodiment, after one or more consecutive actuations of the fraction creation key, as soon as the user performs an action that is not an actuation of the fraction creation key and does not pertain to alteration functionality, the interface will create an alterable fraction initialization decision that has one alternate option corresponding to each distinct result that can be obtained by continuing to repeatedly cycle the fraction's numerator. Such interface behavior may be advantageous whether or not the fraction creation key is a fraction initialization key as described above. For example, in an embodiment, the keystroke sequence x+y+z/w will yield $$x+y+\frac{z}{w},$$

and then by altering the fraction initialization decision the user can achieve the result $$x + \frac{y+z}{w}$$

or the result $$\frac{x+y+z}{w}.$$

If no new result can be obtained by cycling the fraction's numerator, then the interface will not cause such an alterable fraction initialization decision to exist; for example, when the user has typed only the keystroke sequence 1/2, no alterable fraction initialization decision will exist.

In an embodiment, after one or more consecutive actuations of the fraction initialization key, if the user's next action is a destructive action, then for purposes of the automatic decision variation feature, the interface may still cause an alterable fraction initialization decision to exist that is as described in the preceding paragraph before processing the destructive action and possibly causing the decision to be immediately deleted. For example, in an embodiment, the keystroke sequence x+y+z/ will yield $$x + y + \frac{z}{\Box},$$

and if the user then deletes the fraction bar, then the interface will cause an alterable fraction initialization decision to exist that has the alternate options $$x + \frac{y+z}{\Box} \text{ and } \frac{x+y+z}{\Box}$$

before processing the destructive action and deleting the alterable decision; the alterable decision may then become a remembered alterable decision for purposes of the automatic decision variation feature. Therefore, in an embodiment that has option-specific alterable blocks for purposes of the automatic decision variation feature, if a user causes the interface to initialize a fraction that has a different numerator than the user intended, the user may be able to correct such a mistake by deleting and retyping the portion of input that does not match what the user intended. For example, in an embodiment, if a user intends to type $$x + \frac{y+z}{\Box}$$

but uses the keystroke sequence x+y+z/ and thus receives the result $$x + y + \frac{z}{\Box},$$

then the user may ye Lane to correct this mistake by backspacing until all that remains is x+ and then again typing the keystroke sequence y+z/, whereupon the automatic decision variation feature may cause the interface to yield the desired result instead of repeating the same undesired result.

In an embodiment, after one or more consecutive actuations of the fraction initialization key, as soon as the user performs an action that is not an actuation of the fraction initialization key and does not pertain to alteration functionality, if an alterable fraction initialization decision already existed as a result of the last of the consecutive actuations of the fraction initialization key, then rather than creating a new alterable fraction initialization decision, the interface will add any additional alternate options to the alterable fraction initialization decision that already existed. For example, in an embodiment, after a user inputs $$x + \frac{yz}{\Box}$$

by means of the keystroke sequence x+yz/ an alterable fraction initialization decision will exist such that altering the decision would yield the result $$x + y\frac{z}{\Box};$$

if the user's next keystroke is w, then that alterable fraction initialization decision will still have an alternate option such that selecting the option would cause the interface to move the letter y out of the fraction's numerator (which would now yield the result $$x + y\frac{z}{w}),$$

and it will now also have an alternate option such that selecting the option would cause the interface to cycle the fraction's numerator, yielding the result $$\frac{x+yz}{w}.$$

However, in an embodiment, after two or more consecutive actuations of the fraction initialization key, as soon as the user performs an action that is not an actuation of the fraction initialization key and does not pertain to alteration functionality, the interface will reduce the probability of alteration of any alterable fraction initialization decision pertaining to those consecutive actuations of the fraction initialization key; in an embodiment, it will reduce such a probability of alteration quite substantially unless the deliberation score of the last of the consecutive actuations of the fraction initialization key was very low. Essentially, in such an embodiment, the interface will assume that a second consecutive actuation of the fraction initialization key typically indicates that a user is paying careful attention to the numerator of the new fraction, and probably will not need to correct it later. However, in such an embodiment, if a user actuates the fraction initialization key only once and then the user's next action is not another consecutive actuation of the fraction initialization key and does not pertain to alteration functionality, then the interface will not perform any such special reduction of the probability of alteration of any alterable fraction initialization decision pertaining to that single actuation of the fraction initialization key.

Smart Fraction Initialization

In an embodiment, if a user actuates the fraction bar key when the input cursor is at the end of a subscript that is immediately after the letter C or the letter P in an expression that represents combinations or permutations, then that constitutes typing an expulsion-mandatory fraction bar. Therefore, for example, if the input cursor is within the subscript and immediately to the right of the numeral 2 in the expression $_5C_2$ when a user actuates the fraction bar key, the result will be a fraction with $_5C_2$ as its numerator.

In an embodiment, if a user actuates the fraction bar key when the input cursor is at the end of any portion of a Sigma mathematical structure, then that portion of the Sigma mathematical structure will be treated as the last portion of the Sigma mathematical structure and the user's action will constitute typing an expulsion-mandatory fraction bar. In an embodiment, the Sigma mathematical structure is a prefix structure as defined in the preceding section, so expelling the fraction bar will also cause the interface to move the Sigma mathematical structure out of the fraction's numerator. Therefore, for example, if the input cursor is immediately to the right of either the numeral 1 or the numeral 5 in the expression $$\sum_{i=1}^{5}$$

when a user actuates the fraction bar key, the result will be $$\sum_{i=1}^{5}\frac{\square}{\square}.$$

In certain math textbooks, a "stacked fraction" is defined to be a fraction that contains another fraction in its numerator or denominator. For example, is a fraction $$\frac{\frac{1}{2}}{3}$$

that contains ½ in its numerator, and is thus a stacked fraction. In math textbooks, it is not unusual to encounter a stacked fraction such as $$\frac{\frac{1}{2}}{3}$$

that contains a fraction in its numerator or denominator, and it is not unusual to encounter a stacked fraction such as $$\frac{\frac{1}{\frac{2}{3}}}{4}$$

that contains both a fraction in its numerator and a fraction in its denominator, but it is relatively unusual to encounter a fraction such as $$\frac{\frac{1}{\frac{2}{3}}}{4}$$

that contains another stacked fraction in its numerator or denominator.

In an embodiment, if a user actuates the fraction bar key when the input cursor is in the denominator of a fraction that contains a fraction in its numerator, then even if the fraction is an expulsion-eligible mathematical structure and the interface is in a bipositional entry mode as defined above, the interface will respond as though the fraction were not an expulsion-eligible mathematical structure. Therefore, for example, in such an embodiment, if the keystroke sequence 1/2/3 has yielded $$\frac{\frac{1}{2}}{3}$$

and the interface is in a bipositional entry mode such that the next key actuation could cause the interface to automatically exit the stacked fraction's denominator, then actuating the fraction bar key nevertheless will not cause the interface to expel the fraction bar; the result of such an actuation will be $$\frac{\frac{1}{2}}{\frac{3}{\square}}.$$

In such an embodiment, if the keystroke sequence 1/2/3 yields the result $$\frac{\frac{1}{2}}{3},$$

then the keystroke sequence 1/2/3/4 will yield the result $$\frac{\frac{1}{2}}{\frac{3}{4}}.$$

Animating Numerator Changes

In various math input interfaces, when a fraction bar key (as defined farther above) is actuated, the interface will create a new fraction and will either leave the new fraction's numerator empty or will move previously typed input into the new fraction's numerator. In an embodiment of the present invention, when a user actuates a fraction bar key, if the interface will move previously typed input into the new fraction's numerator, then the interface will not do so instantaneously: instead, the interface will first insert an empty fraction template into the user's input and then move previously typed input into the new fraction's numerator, and the movement of previously typed input will be animated, as explained farther above. In an embodiment, if the interface distinctively highlights different types of interface-specified changes in different ways, then such movement of previously typed input will be highlighted as a multi-click change if the fraction bar key is a fraction initialization key as defined above, or will be highlighted as an autocorrection change otherwise.

In an embodiment, when an actuation of the fraction initialization key causes the interface to move input into or out of a previously existing fraction's numerator, this movement will be animated. In an embodiment, if the interface distinctively highlights different types of interface-specified changes in different ways, then such movement will be highlighted as a multi-click change.

Structure Inclusion Toggling

The interface behaviors described in the following paragraph are referred to as "the structure inclusion toggling feature" in the present specification.

In an embodiment, if a user actuates the plus key when the input cursor is immediately after a plus sign operator, or if a user actuates the minus key when the input cursor is immediately after a minus sign operator, and if the sign operator that was already present is either the last character within a mathematical structure or the first character after a mathematical structure, then rather than inserting a second consecutive sign operator into the user's input, the interface will respond to the key actuation by moving the sign operator that was already present: if that sign operator was the last character within a mathematical structure, then the interface will move that sign operator out of the mathematical structure so that it is the first character after the mathematical structure; if that sign operator was the first character after a mathematical structure, the interface will move that sign operator into the mathematical structure so that it is the last character within the mathematical structure. When the interface thus moves a character, it will also move the input cursor so that the cursor will then be positioned immediately after the character in its new location. For example, if a user has typed $\sqrt{4}+$ and the cursor is immediately after the plus sign operator, then if the user actuates the plus key, the input will be converted from $\sqrt{4}+$ to $\sqrt{4+}$. If the user then actuates the plus key again, the input will be converted from $\sqrt{4+}$ back to $\sqrt{4}+$.

In an embodiment that has the automatic structure exiting feature that is explained farther above, it will frequently be the case that the input cursor will be within the last portion of an expulsion-eligible mathematical structure and at the end of the mathematical structure and that the interface will thus be in a bipositional entry mode, and that the user will then actuate either the plus key or the minus key, and that this actuation of the plus key or the minus key will cause the interface to expel the plus sign or minus sign, and will additionally cause the interface to exit the special bipositional entry mode and return to default entry mode. In an embodiment, if such an event occurs, and if an immediately subsequent consecutive actuation of the same sign operator key causes the interface to move the sign operator back into the mathematical structure that it was just expelled from (as described in the preceding paragraph), then in addition to moving the sign operator back into the mathematical structure, the interface will also make the mathematical structure expulsion-eligible again and will thus re-enter the special bipositional entry mode that the interface was in before the initial actuation of the sign operator key. If the embodiment is one where a bipositional entry mode is associated with a special cursor location, such as partly within a mathematical structure, then the interface will thus also return the cursor to the appropriate special location. For example, in an embodiment, if a user types the keystroke sequence 1/2 and the interface is in a bipositional entry mode, and the user then actuates the plus key once, then the interface will expel the plus sign from the denominator and the result will be ½+; if the user then actuates the plus key a second time, the result will be $$\frac{1}{2+}$$

and the interface will again be in a bipositional entry mode such that a subsequent actuation of the plus key will cause the interface to expel a plus sign from the denominator again. Thus, in such an embodiment, a user can input the expression $$\frac{1}{2+3}+4$$

by means of the keystroke sequence 1/2++3+4, without ever actuating an arrow key or parenthesis key.

In an embodiment, as an exception, if a user presses an arrow key to move the input cursor into or out of a mathematical structure and then actuates the plus key twice consecutively or actuates the minus key twice consecutively, then the mathematical structure that the input cursor just moved into or out of will not exist for purposes of the structure inclusion toggling feature. In other words, if a user presses the right arrow key to move the input cursor out of a mathematical structure and then actuates the plus key twice consecutively or actuates the minus key twice consecutively, then the interface will not move the sign operator into that mathematical structure in response to the second consecutive actuation of the sign operator key; if a user presses the left arrow key to move the input cursor into a mathematical structure and then actuates the plus key twice consecutively or actuates the minus key twice consecutively, then the interface will not move the sign operator out of that mathematical structure in response to the second consecutive actuation of the sign operator key.

If a user actuates the plus key when the input cursor is immediately after a plus sign operator, or if the user actuates the minus key when the input cursor is immediately after a minus sign operator, it is possible that the sign operator that was already present may simultaneously be both the last character within a mathematical structure and the first character after a mathematical structure. For example, the plus sign in the expression $$\frac{1}{\sqrt{2}+}$$

is both the last character within a fraction mathematical structure and the first character after a square root mathematical structure. In such a case, it is not possible for the interface simultaneously to move the sign operator out of the mathematical structure that it was in (thus moving the operator to the right) and to move the sign operator into the mathematical structure that it was after (thus moving the operator to the left). Such a case will be referred to in the following paragraphs as "an ambiguous case." In an embodiment, the structure inclusion toggling feature will still take effect in an ambiguous case, and will either move the sign operator to the right (out of the mathematical structure that it was in) or to the left (into the mathematical structure that it was after).

In an embodiment, if a user actuates either the left arrow key or the right arrow key and then actuates a sign operator key twice consecutively so that the first actuation of the sign operator key causes the entry of a sign operator into the user's input and the second actuation of the sign operator key invokes the structure inclusion toggling feature in an ambiguous case, then the mathematical structure that the input cursor just moved into or out of will not exist for purposes of the structure inclusion toggling feature, so the interface will move the sign operator in the same direction as the direction of the most recently actuated arrow key. For example, if the user's input is $$\frac{1}{\sqrt{2}}$$

and the input cursor is immediately after the fraction, and the user then actuates the left arrow key to move the cursor into the fraction's denominator and then actuates the plus key twice, then the second actuation of the plus key will cause the interface to move the plus sign left (into the square root), not right (out of the fraction's denominator).

In an embodiment, if a user invokes the structure inclusion toggling feature in an ambiguous case and this invocation of the structure inclusion toggling feature is at least the second consecutive invocation of the structure inclusion toggling feature, then this invocation of the structure inclusion toggling feature will cause the interface to move the sign operator in the same direction that the immediately prior invocation did, rather than causing the interface to reverse the effect of the immediately prior invocation; thus, for example, a user can convert the expression $$\frac{1}{\sqrt{2}}+$$

into the expression $$\frac{1}{\sqrt{2+}}$$

or vice versa by invoking the structure inclusion toggling feature twice consecutively. In an embodiment, otherwise, if the structure inclusion toggling feature is invoked in an ambiguous case, then the interface will move the sign operator to the right by default; in an alternative embodiment, otherwise, if the structure inclusion toggling feature is invoked in an ambiguous case, the interface will move the sign operator to the left by default.

In an embodiment, when an actuation of the plus key or the minus key causes the structure inclusion toggling feature to be invoked, the invocation of the structure inclusion toggling feature is implemented as an alterable interface decision such that altering this decision will cause the user's input to appear as though that key actuation had been processed without causing the structure inclusion toggling feature to be invoked. For example, in an embodiment, if a user types the fraction ½ and then actuates the minus key once, the interface will yield the expression ½−; if the user then actuates the minus key a second consecutive time, the structure inclusion toggling feature will be invoked and the interface will yield the expression $$\frac{1}{2-};$$

and if the user then actuates the alteration key, the interface will yield the expression ½−−.

In an alternative embodiment, in addition to or instead of behaving as described in the preceding paragraph, the interface will allow a user to actually input two consecutive sign operators by means of actuating the plus key or the minus key sufficiently many times consecutively. In particular, in an embodiment, when a user actuates the plus key or the minus key sufficiently many consecutive times that an invocation of the structure inclusion toggling feature would cause the user's input to return to the state it was in after the first of the consecutive actuations of that key, the interface will return to that state and will then immediately append an additional plus sign or minus sign, and will thus yield the same result as though the user had actuated the plus key or the minus key exactly twice consecutively without invoking the structure inclusion toggling feature. In an embodiment, after this occurs, if the user actuates the same key another consecutive time, then the interface will delete the plus sign or minus sign that was just appended and so the user's input will return to the state that it was in after the first of the consecutive actuations of that key. For example, in an embodiment, if a user types the fraction ½ and then actuates the minus key once, the interface will yield the expression ½−; if the user then actuates the minus key a second consecutive time, the structure inclusion toggling feature will be invoked and the interface will yield the expression $$\frac{1}{2-};$$

if the user then actuates the minus key a third consecutive time, the interface will yield the expression ½−−; if the user then actuates the minus key a fourth consecutive time, the interface will again yield the expression ½−; and so on.

In an embodiment, the structure inclusion toggling feature also applies to certain other operators in addition to the plus sign operator and the minus sign operator, such as the division operator ÷ and the multiplication operators · and x. Other possible operators to which the structure inclusion toggling feature may be applied will be evident to those of ordinary skill in the art.

Figure 28A:
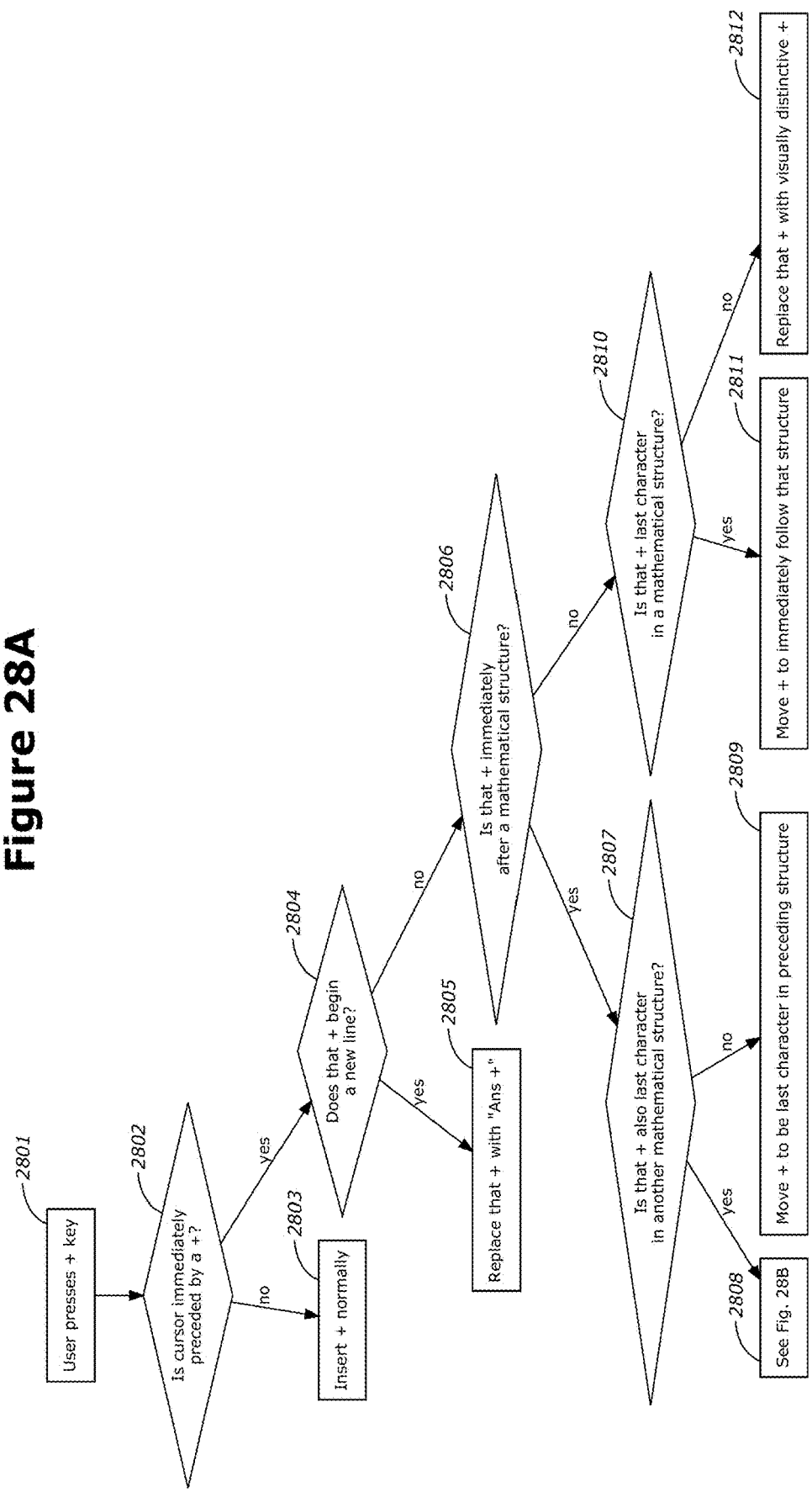
FIG. 28A is a flowchart that illustrates various features that may be invoked when a user double-clicks the plus key, according to an embodiment.

FIG. 28A is a flowchart that illustrates various features that may be invoked when a user double-clicks the plus key, in an embodiment. It is to be understood that in an embodiment, parallel behaviors are applicable when a user double-clicks the minus key instead of the plus key. For the plus key, the process starts with Block 2801, which states, "User presses + key" and proceeds to Block 2802, which asks, "Is cursor immediately preceded by a +?" If the answer is no, then the interface will insert a plus sign as normal (Block 2803). If the answer is yes, the process continues with Block 2804, which asks, "Does that + begin a new line?" If the answer is yes, the interface will replace that plus sign with "Ans +" (Block 2805), as described in the specification in the explanation of the double-click Ans prefixing feature. If the answer is no, then the process will continue with Block 2806, which asks, "Is that + immediately after a mathematical structure?"

Figure 28B:
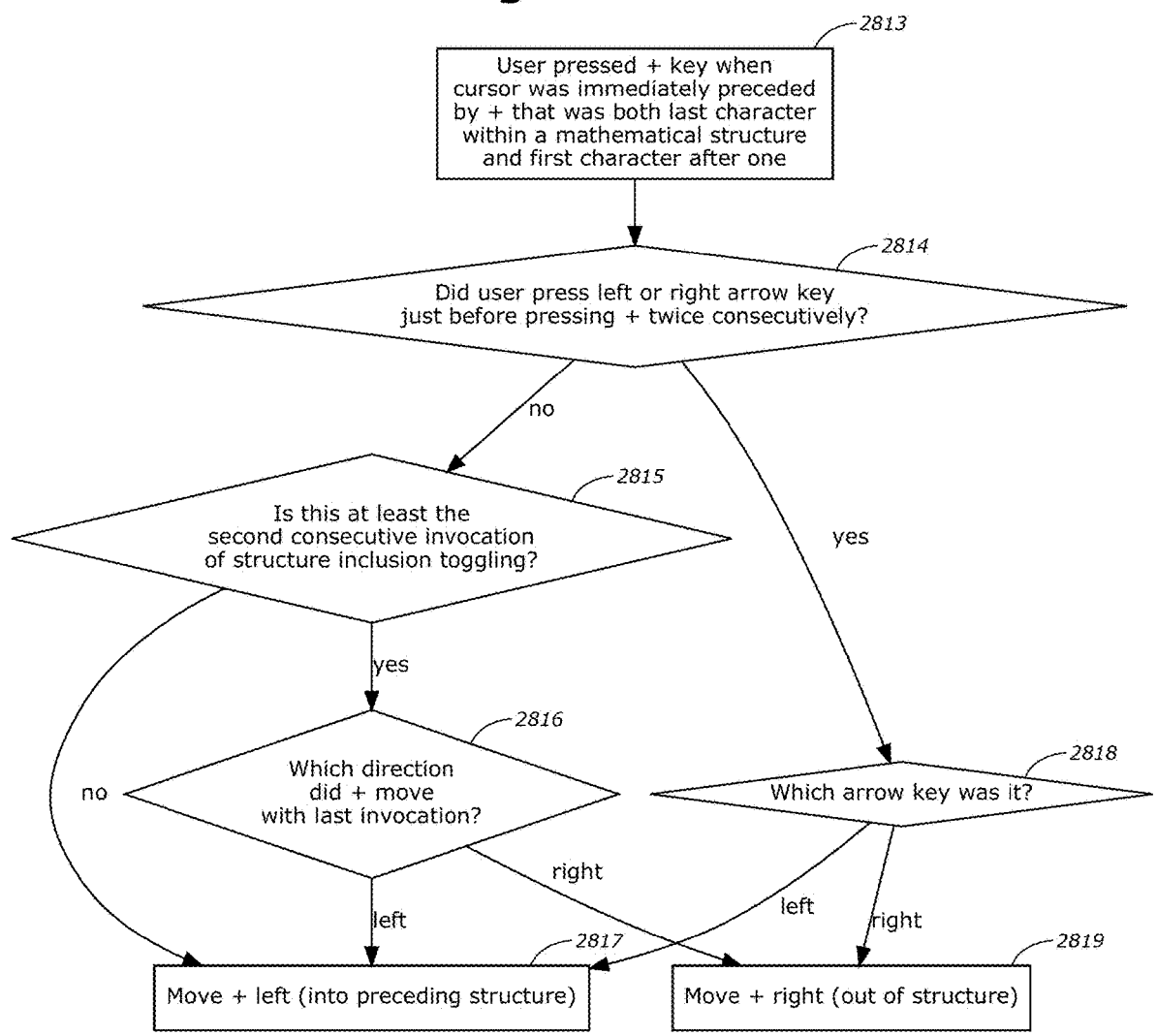
FIG. 28B is a flowchart that illustrates an example process that occurs in an ambiguous case where a previously typed plus sign is both the last character within a mathematical structure and the first character after a mathematical structure.
Figure 29A:
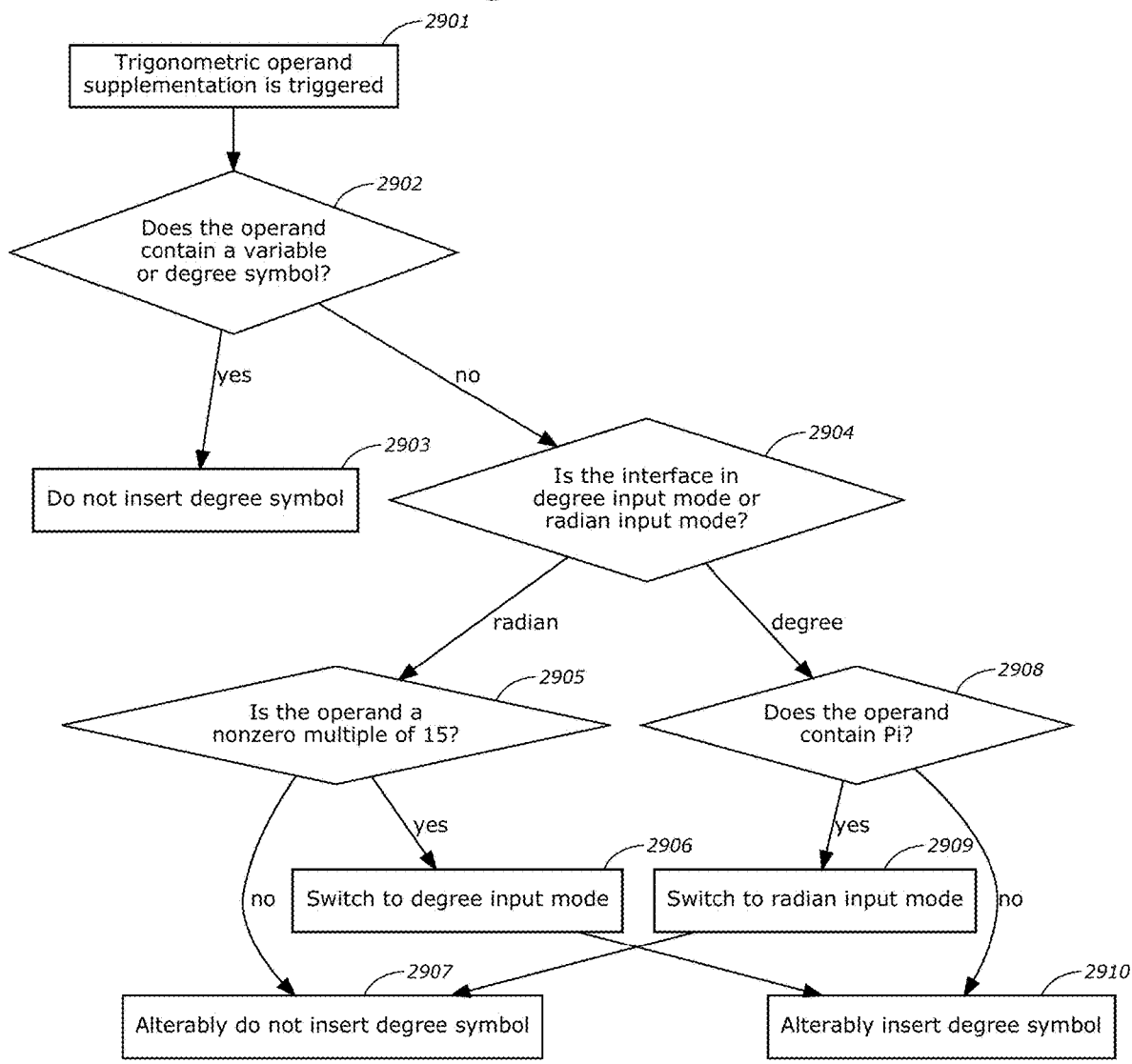
FIG. 29A is a flowchart that illustrates an example method for making smart adaptive angle measure mode decisions.
Figure 29C:
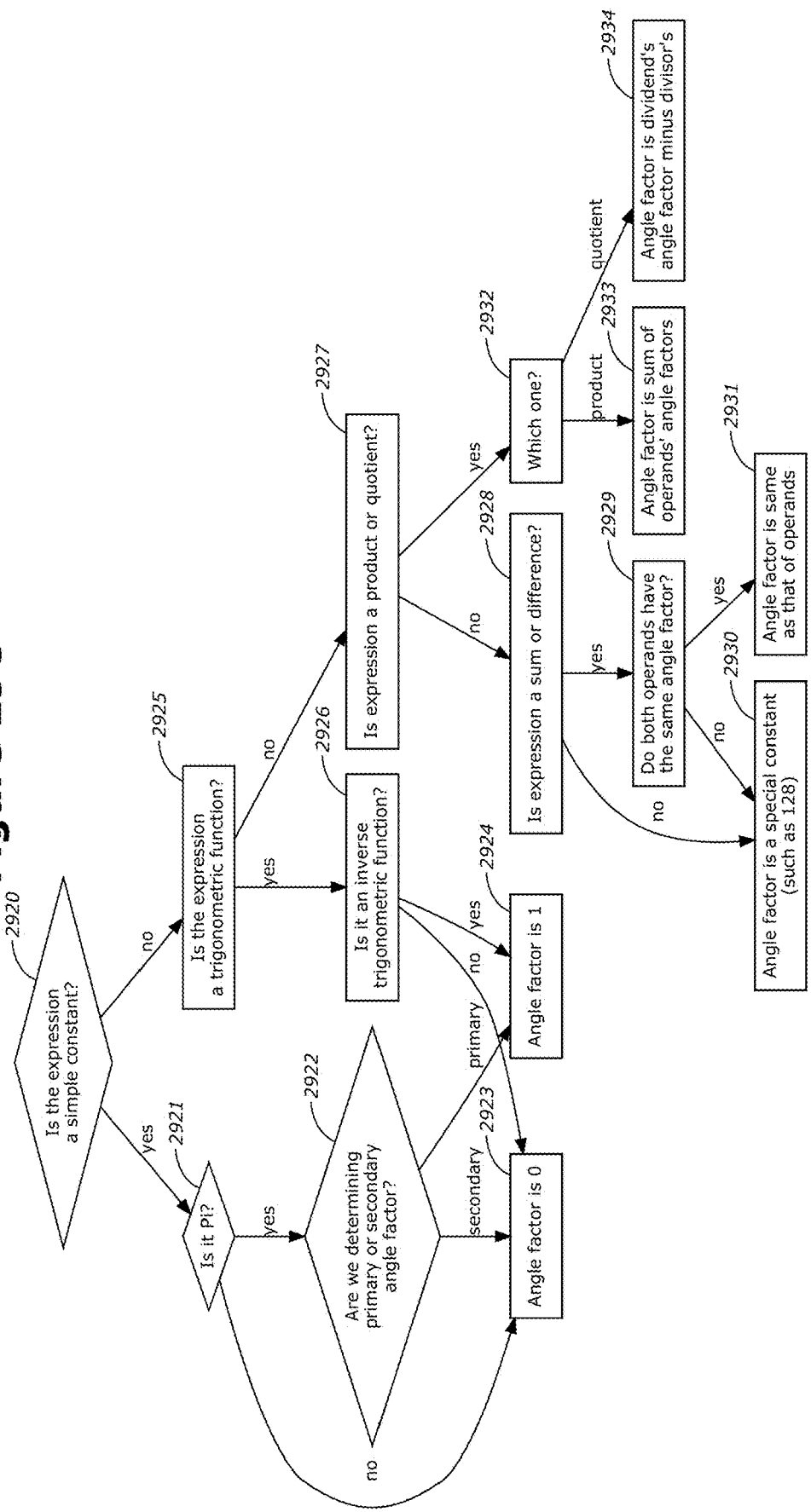
FIG. 29C is a flowchart that illustrates an algorithm that determines, for a mathematical expression, an angle factor, which may be either a primary angle factor or a secondary angle factor, according to an embodiment.

If the answer to the question in Block 2806 is yes, then the process continues with Block 2807, which asks, "Is that + also last character in another mathematical structure?" If the answer is yes, then the process continues in FIG. 28B, beginning at Block 2808. If the answer is no, then the interface moves the plus sign to be the last character in the preceding mathematical structure (Block 2809).

If the answer to the question in Block 2806 is no, then the process continues with Block 2810, which asks, "Is that + last character in a mathematical structure?" If the answer is yes, then interface moves the plus sign to immediately follow the structure (Block 2811). If the answer is no, then the interface replaces that plus sign with a visually distinctive plus sign (Block 2812) as described below.

FIG. 28B is a flowchart that illustrates the process that occurs in the ambiguous case where the previously typed plus sign is both the last character within a mathematical structure and the first character after a mathematical structure. The process starts with Block 2813, which states, "User pressed + key when curor was immediately preceded by + that was both last character within a mathematical structure and first character after one" and proceeds with Block 2814, which asks, "Did user press left or right arrow key just before pressing + twice consecutively?" If the answer is yes, the interface will determine which arrow key it was (Block 2818) and move the plus sign left into the preceding structure (Block 2817) if the left arrow key was pushed or right out of the structure (Block 2819) if the right arrow key was pushed.

If the answer to the question in Block 2814 is no, then the process continues with Block 2815, which asks, "Is this at least the second consecutive invocation of structure inclusion toggling?" If the answer is no, then the interface will move the plus sign left, into the preceding structure (Block 2817). If the answer is yes, then the process continues with Block 2816, which asks, "Which direction did + move with last invocation?" Subsequently, the interface will move the plus sign left into the preceding structure again (Block 2817) if the left arrow key was pushed the previous time or right out of the structure again (Block 2819) if the right arrow key was pushed the previous time.

Advantages of Various Embodiments

Other Embodiments Will be Evident

Various other embodiments will be apparent to those of ordinary skill in the art in view of the disclosure herein. In particular, various combinations, omissions, substitutions and modifications will be apparent to the skilled artisan in view of the disclosure herein. It is contemplated that various aspects and features of the invention described can be practiced separately, combined together, or substituted for one another, and that a variety of combination and subcombinations of the features and aspects can be made and still fall within the scope of the invention. Furthermore, the systems described above need not include all of the modules and functions described in the preferred embodiments. In fact, those of ordinary skill in the art will recognize that numerous embodiments can be constructed that use only a small minority of the novel features that are disclosed herein, and yet still fall within the scope of the invention and still represent a potentially significant advantage over prior art. Accordingly, the present invention is not intended to be limited by the recitation of the embodiments that are explicitly described herein, but is to be defined by reference to the appended claims.

In some embodiments, the systems, devices, and methods described herein are implemented using a computing system. In some embodiments, the systems, devices, and methods described herein can be embodied in hardware or firmware, or to a collection of software instructions, possibly having entry and exit points, written in a programming language, such as, for example, Java, C, or C++, among others. A software module may be compiled and linked into an executable program, installed in a dynamic link library, or may be written in an interpreted programming language such as, for example, BASIC, Perl, or Python, among others. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing system may comprise a central processing unit ("CPU"), which may comprise a microprocessor. The computing system may comprise a computer readable medium, such as a memory, for example, random access memory ("RAM") for temporary storage of information and/or a read only memory ("ROM") for permanent storage of information, and a mass storage device, such as a hard drive, diskette, or optical media storage device. Typically, the modules of the computing system are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system may comprise one or more commonly available input/output (I/O) devices and interfaces, such as a keyboard, mouse, touchpad, touchscreen, and printer. In one embodiment, the I/O devices and interfaces comprise one or more display devices, such as a screen or monitor, that allows the visual presentation of data to a user. More particularly, a display device provides for the presentation of GUIs, application software data, and multimedia presentations, for example. In one or more embodiments, the I/O devices and interfaces comprise a microphone and/or motion sensor that allow a user to generate input to the computing system using sounds, voice, motion, gestures, or the like. In some embodiments, the I/O devices and interfaces also provide a communications interface to various external devices. The computing system may also comprise one or more multimedia devices, such as speakers, video cards, graphics accelerators, and microphones, for example.

The computing system may run on a variety of computing devices, such as, for example, a personal computer, a laptop computer, a tablet computer, a cell phone, a smartphone, a personal digital assistant, a kiosk, an audio player, an e-reader device, and so forth. The computing system is generally controlled and coordinated by operating system software, such as Windows, Linux, BSD, SunOS, Solaris, Android, iOS, BlackBerry OS, or other compatible operating systems. In Macintosh systems, the operating system may be any available operating system, such as MAC OS X. In other embodiments, the computing system may be controlled by a proprietary operating system. Conventional operating systems control and schedule computer processes for execution, perform memory management, provide file system, networking, and I/O services, and provide a user interface, such as a graphical user interface ("GUI"), among other things.

In some embodiments, the computing system is coupled to a network, such as a LAN, WAN, or the Internet, for example, via a wired, wireless, or combination of wired and wireless, communication link. The network communicates with various computing devices and/or other electronic devices via wired or wireless communication links. In some embodiments, the network is communicating with one or more computing systems and/or one or more data sources.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A computing device having an interface with expedited mathematical alteration, the device comprising:
    an input device comprising keys configured to allow a user to input at least various mathematical expressions, wherein a mathematical expression comprises at least one of a sequence of characters that denotes a numeral or a mathematical operation applied to one or more operands that themselves are mathematical expressions;
    a display configured to display a user input, and further configured to display at least one type of mathematical expression as a mathematical structure, wherein a mathematical structure comprises a mathematical expression that includes one or more portions such that characters within a portion of the mathematical expression are visually distinguished from characters not within the portion of the mathematical expression;
    at least one non-transitory computer readable medium having stored thereon executable instructions; and
    at least one processor in communication with the at least one non-transitory computer readable medium and configured to execute the instructions to cause the system to:
        in response to an actuation of a key of the input device, either cause a contiguous portion of input that is adjacent to but not within a mathematical structure to become contained within the mathematical structure or cause a contiguous portion of input that is within a mathematical structure to become excluded from the mathematical structure, and to accordingly update the display to visually indicate whether or not the contiguous portion of input is now within the mathematical structure.

2. The computing device of claim 1, wherein:

the display is configured to display a fraction as a mathematical structure with a vinculum so that characters within the fraction's numerator are visually distinguished from any characters not within the fraction's numerator by means of the vinculum; and the system is configured to, in response to an actuation of a key of the input device when a portion of the user input is immediately to the left of a fraction, cause a contiguous portion of input immediately to the left of a fraction to become contained within and at the beginning of the fraction's numerator, and to accordingly update the display to visually indicate that the contiguous portion of input is now within and at the beginning of the fraction's numerator.

3. The computing device of claim 2, wherein:

the input device comprises at least one fraction creation key such that a first actuation of the fraction creation key causes the computing device to create and display a fraction; and the system is configured to, in response to an at least second consecutive actuation of the fraction creation key when a portion of input is immediately to the left of the fraction that was created in response to the first of the consecutive actuations of the fraction creation key, cause a contiguous portion of input immediately to the left of the fraction to become contained within and at the beginning of the fraction's numerator, and to accordingly update the display so that the contiguous portion of input now appears within the fraction's numerator.

4. The computing device of claim 3, wherein if a polynomial immediately followed by a plus sign operator or a minus sign operator is the rightmost contiguous portion of input that is immediately to the left of the fraction that was created in response to the first of the consecutive actuations of the fraction creation key, then the contiguous portion of input that becomes contained within the fraction's numerator consists of the last term of the polynomial followed by the sign operator.

5. The computing device of claim 2, wherein the input device comprises at least an alteration key, and wherein the at least one processor in communication with the at least one non-transitory computer readable medium is further configured to execute the instructions to cause the system to at least:

identify one or more portions of the user input as one or more alterable decisions;

for each of the one or more alterable decisions, store, in a memory, information about one or more alternative options for the alterable decision;

upon creating a fraction such that a portion of the user input is immediately to the left of the newly created fraction, identify as an alterable fraction creation decision a portion of the user input comprising both the newly created fraction and a contiguous portion of the user input that is immediately to the left of the newly created fraction, and to store, in a memory, information associating the newly created fraction with the alterable fraction creation decision;

identify one of the one or more alterable decisions as the currently alterable decision;

when the currently alterable decision is an alterable fraction creation decision, in response to an actuation of the alteration key of the input device, cause a contiguous portion of input that is immediately to the left of the fraction that is associated with the currently alterable decision to become contained within the fraction's numerator and to accordingly update the display so that the contiguous portion of input now appears within the fraction's numerator.

6. The computing device of claim 1, wherein the input device comprises at least an alteration key, and wherein the at least one processor in communication with the at least one non-transitory computer readable medium is further configured to execute the instructions to cause the system to at least:

identify one or more portions of the user input as one or more alterable decisions;

for each of the one or more alterable decisions, store, in a memory, information about one or more alternative options for the alterable decision;

upon entry of a sign operator character that is either the last character within the last portion of a mathematical structure or the first character immediately after a mathematical structure, make an alterable decision wherein the alternative options of the alterable decision include at least one option such that the sign operator character is included within the last portion of the mathematical structure and at least one option such that the sign operator character is not included within the mathematical structure;

identify one of the one or more alterable decisions as the currently alterable decision;

upon actuation of the alteration key, alter the currently alterable decision to another of the one or more alternative options for the currently alterable decision, and to accordingly display, on the display, the altered currently alterable decision to the user.

7. The computing device of claim 6, wherein the mathematical structure is one of: a fraction, a square root, and an exponent.

8. The computing device of claim 6, wherein:

the system is further configured to, when an actuation of the alteration key causes a sign operator character that is immediately followed by an operand of the sign operator to become included within the last portion of a mathematical structure, also cause the operand of the sign operator to become included within the last portion of the mathematical structure; and when an actuation of the alteration key causes a sign operator character that is immediately followed by an operand of the sign operator to become excluded from a mathematical structure, also cause the operand of the sign operator to become excluded from the mathematical structure.

9. The computing device of claim 1, wherein:

the input device comprises at least one sign operator key, wherein a sign operator key comprises one of a plus key and a minus key;

the system is configured to, in response to a first actuation of a sign operator key, add the corresponding sign operator character to the user input; and the system is configured to, in response to an at least second consecutive actuation of a sign operator key when the sign operator character that was added to the user input in response to the first of the consecutive actuations of the key is in a position such that for exactly one mathematical structure the sign operator character is either the last character within the last portion of the mathematical structure or the first character after the mathematical structure, toggle the inclusion of the sign operator character within the mathematical structure so that if the sign character was the last character within the last portion of the mathematical structure then it becomes the first character after the mathematical structure and if the sign character was the first character after the mathematical structure then it becomes the last character within the last portion of the mathematical structure, and to accordingly update the display to visually indicate whether or not the sign character is now within the mathematical structure.

10. A computing device having an interface with expedited format alteration, the device comprising:
an input device configured to allow a user to enter input and to allow a user to select a format for application to a portion of the user's input;
a display configured to display each portion of user input according to its selected format;
at least one non-transitory computer readable medium having stored thereon executable instructions; and
at least one processor in communication with the at least one non-transitory computer readable medium and configured to execute the instructions to cause the system:
in response to an entry of a portion of input, to make a determination as to whether or not at least two potentially desirable applicable formats exist wherein each of the potentially desirable applicable formats is a format that a user may desire to be applied to the entered portion of input, and to, after determining that at least two such potentially desirable applicable formats do exist, provide a means for expedited format alteration, wherein the means of expedited format alteration is a means of selection of at least one of the at least two potentially desirable applicable formats for application to the entered portion of input.

11. The computing device of claim 10, wherein the user input comprises a mathematical expression, and wherein formatting delineates the extent of a mathematical structure, and wherein the system is configured to, in response to an entry of a portion of input that is at the boundary of a mathematical structure, make a determination as to whether or not at least two potentially desirable applicable formats exist wherein at least one of the potentially desirable applicable formats consists of a format denoting inclusion in the mathematical structure and at least one of the potentially desirable applicable formats consists of a format denoting exclusion from the mathematical structure.

12. The computing device of claim 10, wherein the user input comprises a sequence of characters, and wherein the formats comprise at least one of font family, font size, font color, background color, bold attribute status, italic attribute status, underlining attribute status, and superscript attribute status.

13. The computing device of claim 10, wherein the system is additionally configured so that when it provides a means for expedited selection of at least one of the at least two potentially desirable applicable formats for application to the entered portion of input, it distinctively highlights the entered portion of input.

14. The computing device of claim 10, wherein the input device comprises at least an alteration key, and wherein the at least one processor in communication with the at least one non-transitory computer readable medium is further configured to execute the instructions to cause the system to at least:
identify one or more portions of the user input as one or more alterable decisions;
for each of the one or more alterable decisions, store, in a memory, information about one or more alternative options for the alterable decision;
in response to an entry of a portion of input, upon determining that at least two potentially desirable applicable formats exist for that portion of input, to identify that portion of input as an alterable format decision, and to store, in a memory, information associating with that alterable format decision at least one potentially desirable applicable format that is not the format currently applied to the portion of input;
identify one of the one or more alterable decisions as the currently alterable decision;
when the currently alterable decision is an alterable format decision, in response to an actuation of the alteration key of the input device, apply to the alterable format decision's portion of input one of the associated potentially desirable applicable formats that is not the format that was already applied to the portion of input.

15. The computing device of claim 10, wherein the input device comprises at least a means to allow a user to select a location for the insertion of subsequently entered input, and wherein the system is configured to, in response to an entry of a portion of input when the user's most recent action prior to the entry of the portion of input was a selection of a location for the insertion of the entered portion of input and said location was between and immediately adjacent to two portions of input with distinct formats, to make the determination that the two distinct formats of the two adjacent portions of input are potentially desirable applicable formats.

16. The computing device of claim 15, wherein the user input comprises the contents of a spreadsheet, and wherein the system is configured to, in response to an insertion of a new spreadsheet row when the user's most recent action prior to the insertion of the new spreadsheet row was a selection of a location for the insertion of the new spreadsheet row and said location was between and immediately adjacent to two spreadsheet rows with distinct formats, to make the determination that the two distinct formats of the two adjacent spreadsheet rows are potentially desirable applicable formats.

17. The computing device of claim 15, wherein the user input comprises a sequence of characters, and wherein the system is configured to, in response to an entry of a character when the user's most recent action prior to the entry of the new character was a selection of a location for the entry of the new character and said location was between and immediately adjacent to two characters with distinct formats, to make the determination that the two distinct formats of the two adjacent characters are potentially desirable applicable formats.

18. The computing device of claim 10, wherein the system is configured so that when in response to an entry of a portion of input the system makes a determination that at least two potentially desirable applicable formats exist for that portion of input, if the user's immediately subsequent action consists of an entry of a character that is immediately following that portion of input, then in at least some circumstances in response to that entry of a character the system will incorporate said newly entered character into said previously entered portion of input that the character is immediately following and for which the system has already made a determination that at least two potentially desirable applicable formats exist, so that the system's determination that at least two potentially desirable applicable formats exist becomes applicable to the portion of input consisting of the previously entered portion of input plus the newly entered character and the means of expedited format alteration becomes applicable to the portion of input consisting of the previously entered portion of input plus the newly entered character.

19. The computing device of claim 18, wherein the system is configured so that when in response to an entry of a portion of input the system makes a determination that at least two potentially desirable applicable formats exist, the system provides a means for expedited format alteration as soon as that determination is applicable to a portion of input that would not have the exact same appearance in all of the at least two potentially desirable applicable formats.

20. A method of expedited input alteration, the method comprising:
- determining an alterable input by input-contemporaneous evaluation of both interconnected and disparate subsets, classifications, or manifestations of user input;
- indicating the determined alterable input as actively alterable via visual distinction within an input field; and
- activating the alterable input by a single user action applicable to multiple alterable input classifications as well as a variety of alteration presentation, implementation, and effect options.

* * * * *